US012625774B2

(12) United States Patent
Madan et al.

(10) Patent No.: US 12,625,774 B2
(45) Date of Patent: May 12, 2026

(54) SERVICING FILE RESTORATIONS IN A DEDUPLICATION FILESYSTEM USING A READ-AHEAD CACHE

(71) Applicant: Dell Products L.P., Round Rock, TX (US)

(72) Inventors: Nitin Madan, San Jose, CA (US); Kedar Godbole, Pune (IN); Aditi Tejas Gosavi, Pune (IN); Srikant Viswanathan, Pune (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/782,482

(22) Filed: Jul. 24, 2024

(65) Prior Publication Data

US 2026/0030115 A1    Jan. 29, 2026

(51) Int. Cl.
*G06F 11/14*        (2026.01)
*G06F 11/1446*      (2026.01)

(52) U.S. Cl.
CPC ...... *G06F 11/1453* (2013.01); *G06F 2201/80* (2013.01)

(58) Field of Classification Search
CPC .......................... G06F 11/1453; G06F 2201/80
See application file for complete search history.

(56) References Cited

U.S. PATENT DOCUMENTS

| | | | |
|---|---|---|---|
| 5,963,963 A | 10/1999 | Schmuck | |
| 9,189,414 B1 * | 11/2015 | Shim ........................ | G06F 12/08 |
| 12,271,625 B1 | 4/2025 | Astolfi | |
| 2011/0276744 A1 | 11/2011 | Sengupta | |
| 2014/0075034 A1 | 3/2014 | Vasudevan | |
| 2015/0205680 A1 * | 7/2015 | Kimmel .............. | G06F 11/1417 707/649 |
| 2023/0133361 A1 | 5/2023 | Shilane | |
| 2023/0133530 A1 * | 5/2023 | Madan ................ | G06F 11/1453 707/643 |

* cited by examiner

*Primary Examiner* — Tony Wu
(74) *Attorney, Agent, or Firm* — Staniford Tomita LLP

(57)                ABSTRACT

An access object (AOB) service receives a restore stream from a client for a file managed by a deduplication filesystem. The file is represented by a segment tree including segments in an upper level referencing chunks of the file. The upper level segments are grouped into similarity groups and the similarity groups are assigned to deduplication object (DOB) services. The upper level segments are iterated over to open multiple internal read-ahead streams from the AOB service to the DOB service to populate a read-ahead cache maintained at the AOB service. The restore stream is serviced using the read-ahead cache.

9 Claims, 29 Drawing Sheets

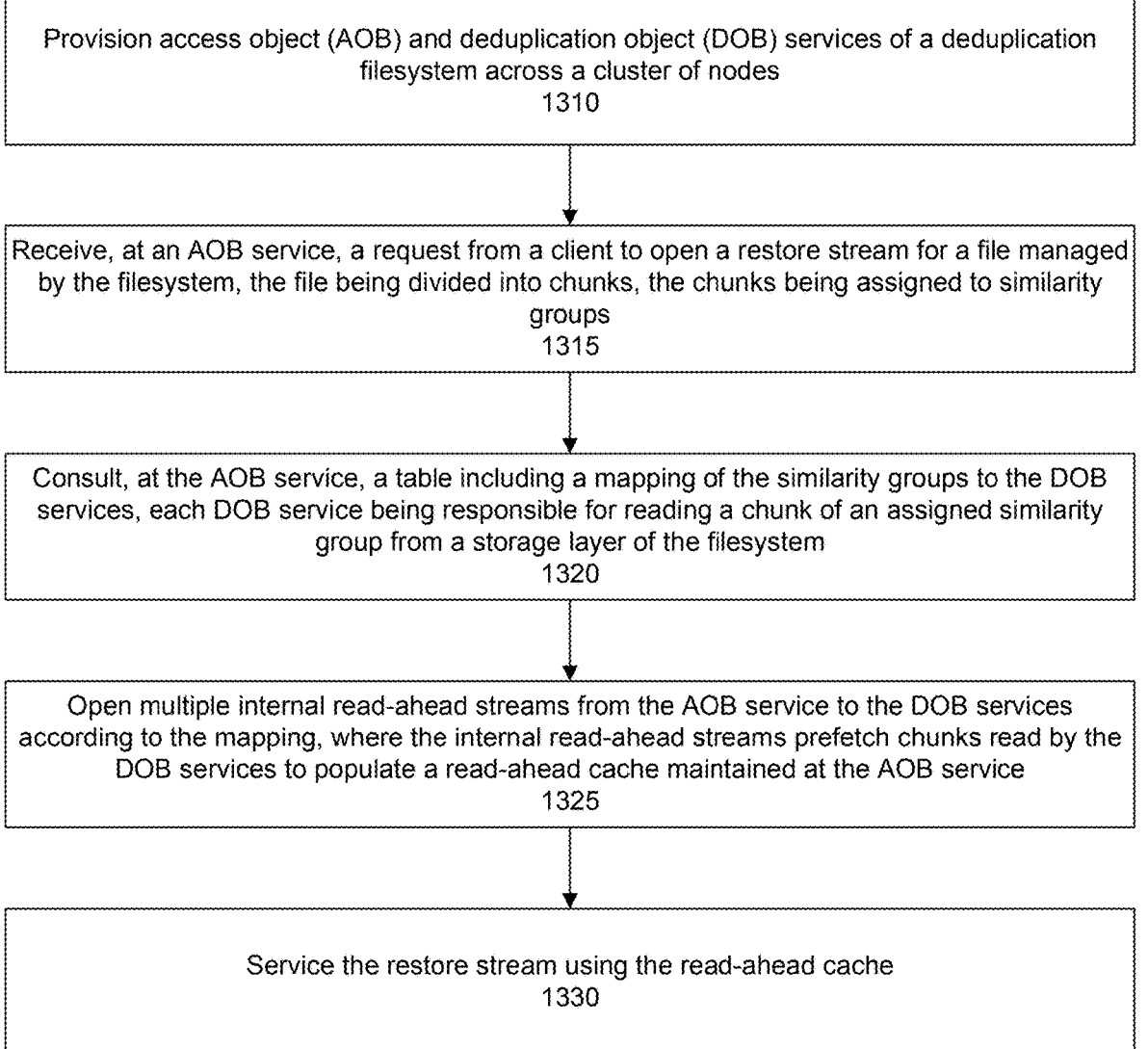

Provision access object (AOB) and deduplication object (DOB) services of a deduplication filesystem across a cluster of nodes
1310

Receive, at an AOB service, a request from a client to open a restore stream for a file managed by the filesystem, the file being divided into chunks, the chunks being assigned to similarity groups
1315

Consult, at the AOB service, a table including a mapping of the similarity groups to the DOB services, each DOB service being responsible for reading a chunk of an assigned similarity group from a storage layer of the filesystem
1320

Open multiple internal read-ahead streams from the AOB service to the DOB services according to the mapping, where the internal read-ahead streams prefetch chunks read by the DOB services to populate a read-ahead cache maintained at the AOB service
1325

Service the restore stream using the read-ahead cache
1330

FIG. 13

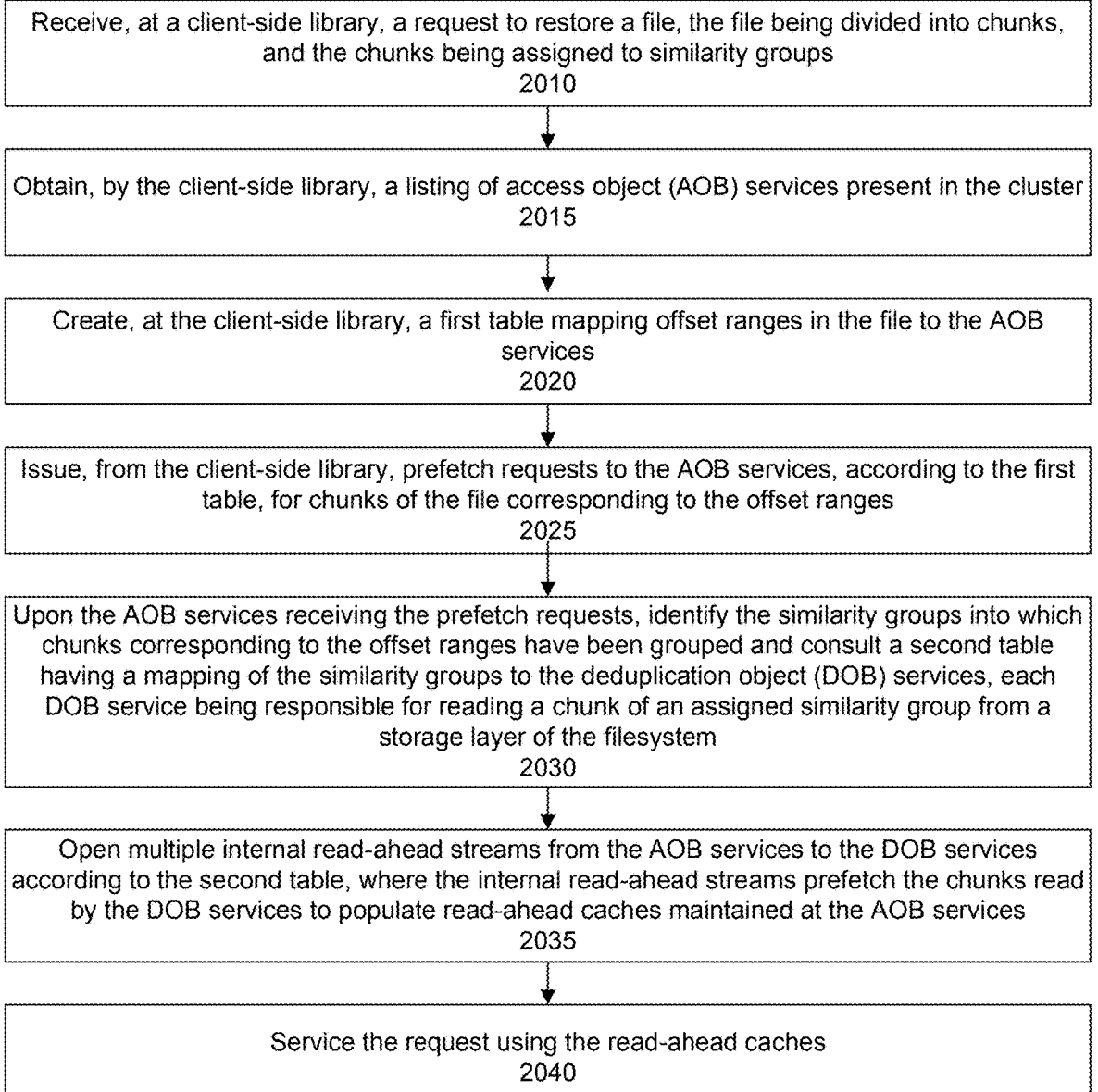

Receive, at a client-side library, a request to restore a file, the file being divided into chunks, and the chunks being assigned to similarity groups
2010

Obtain, by the client-side library, a listing of access object (AOB) services present in the cluster
2015

Create, at the client-side library, a first table mapping offset ranges in the file to the AOB services
2020

Issue, from the client-side library, prefetch requests to the AOB services, according to the first table, for chunks of the file corresponding to the offset ranges
2025

Upon the AOB services receiving the prefetch requests, identify the similarity groups into which chunks corresponding to the offset ranges have been grouped and consult a second table having a mapping of the similarity groups to the deduplication object (DOB) services, each DOB service being responsible for reading a chunk of an assigned similarity group from a storage layer of the filesystem
2030

Open multiple internal read-ahead streams from the AOB services to the DOB services according to the second table, where the internal read-ahead streams prefetch the chunks read by the DOB services to populate read-ahead caches maintained at the AOB services
2035

Service the request using the read-ahead caches
2040

FIG. 20

| Simgrps | Owner |
|---------|-------|
| 0-255 | DOB1 |
| 256-511 | DOB2 |
| 512-767 | DOB3 |
| 768-1023 | DOB4 |

2210

2305

| file | 10 | 300 | 600 | 100 | 900 | 350 | 1000 | 10 | 750 | ... |

0MB   4MB   8MB   12MB   16MB   20MB   24MB   28MB   32MB   36MB

| offset range | Simgrp |
|--------------|--------|
| 0-4MB | 10 |
| 4-8MB | 300 |
| 8-12MB | 600 |
| 12-16MB | 100 |
| 16-20MB | 900 |
| 20-24MB | 350 |
| 24-28MB | 1000 |
| 28-32MB | 10 |
| 32-36MB | 750 |

2405

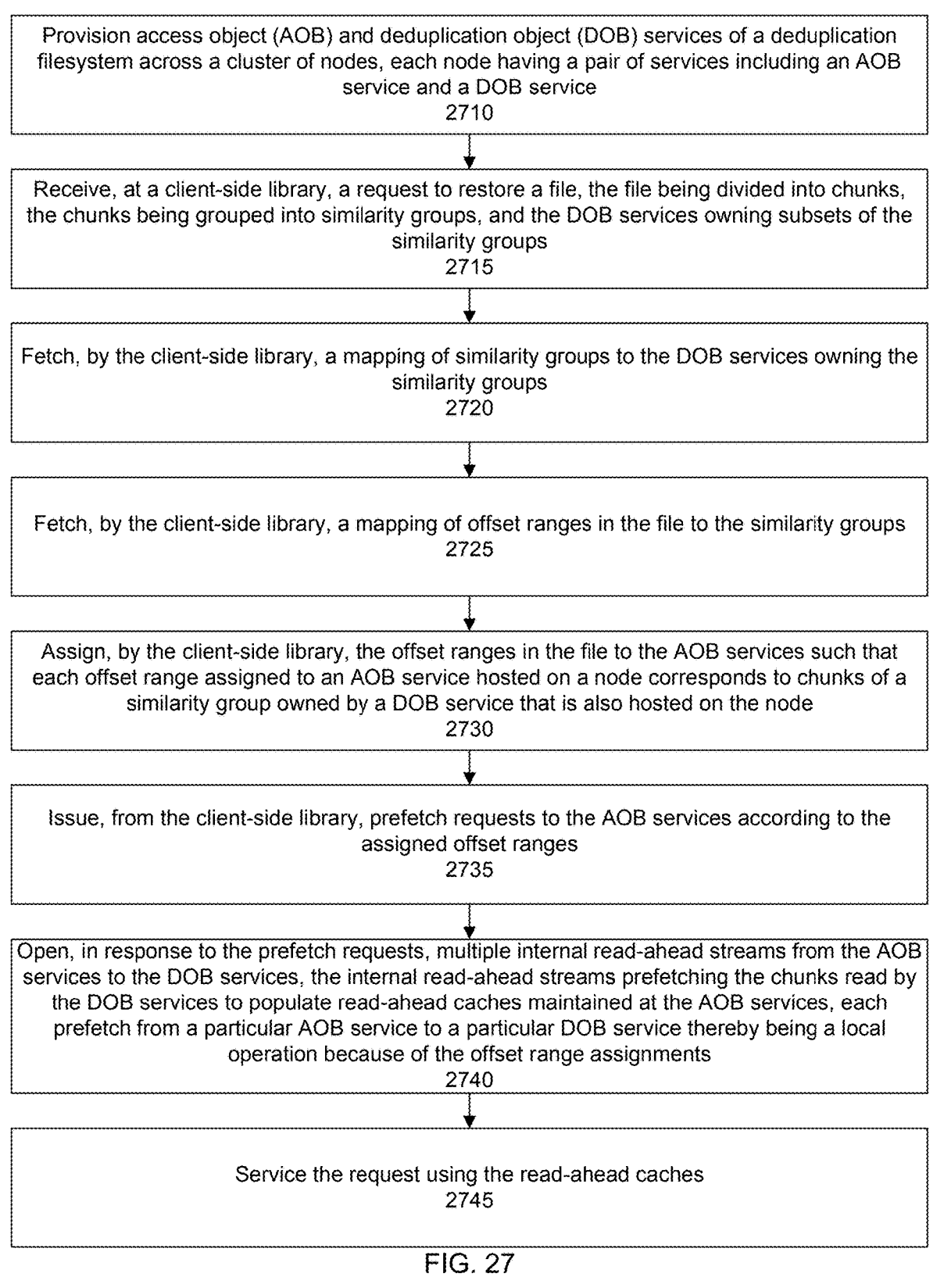

Provision access object (AOB) and deduplication object (DOB) services of a deduplication filesystem across a cluster of nodes, each node having a pair of services including an AOB service and a DOB service
2710

Receive, at a client-side library, a request to restore a file, the file being divided into chunks, the chunks being grouped into similarity groups, and the DOB services owning subsets of the similarity groups
2715

Fetch, by the client-side library, a mapping of similarity groups to the DOB services owning the similarity groups
2720

Fetch, by the client-side library, a mapping of offset ranges in the file to the similarity groups
2725

Assign, by the client-side library, the offset ranges in the file to the AOB services such that each offset range assigned to an AOB service hosted on a node corresponds to chunks of a similarity group owned by a DOB service that is also hosted on the node
2730

Issue, from the client-side library, prefetch requests to the AOB services according to the assigned offset ranges
2735

Open, in response to the prefetch requests, multiple internal read-ahead streams from the AOB services to the DOB services, the internal read-ahead streams prefetching the chunks read by the DOB services to populate read-ahead caches maintained at the AOB services, each prefetch from a particular AOB service to a particular DOB service thereby being a local operation because of the offset range assignments
2740

Service the request using the read-ahead caches
2745

FIG. 27

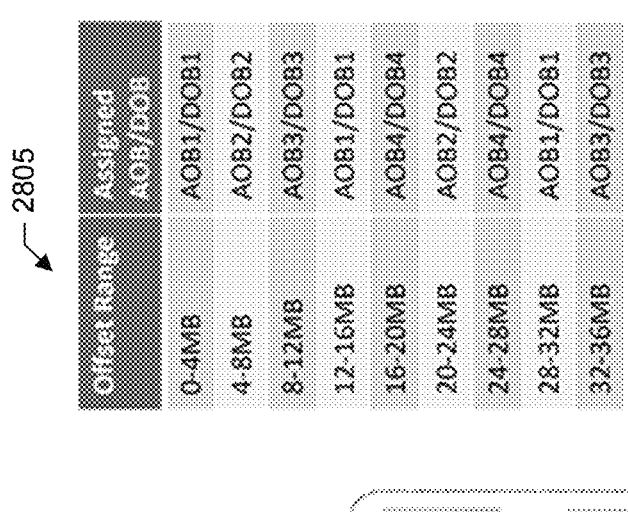
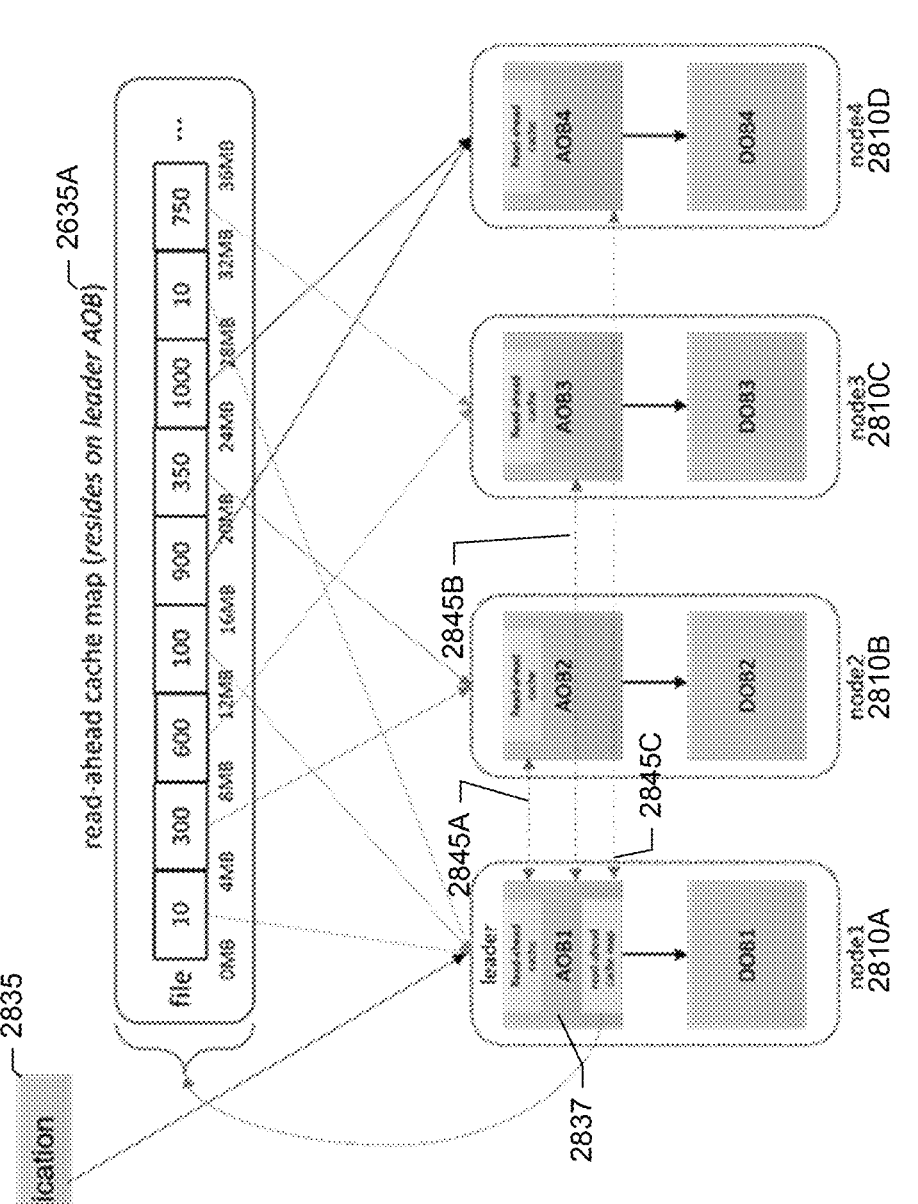
FIG. 28

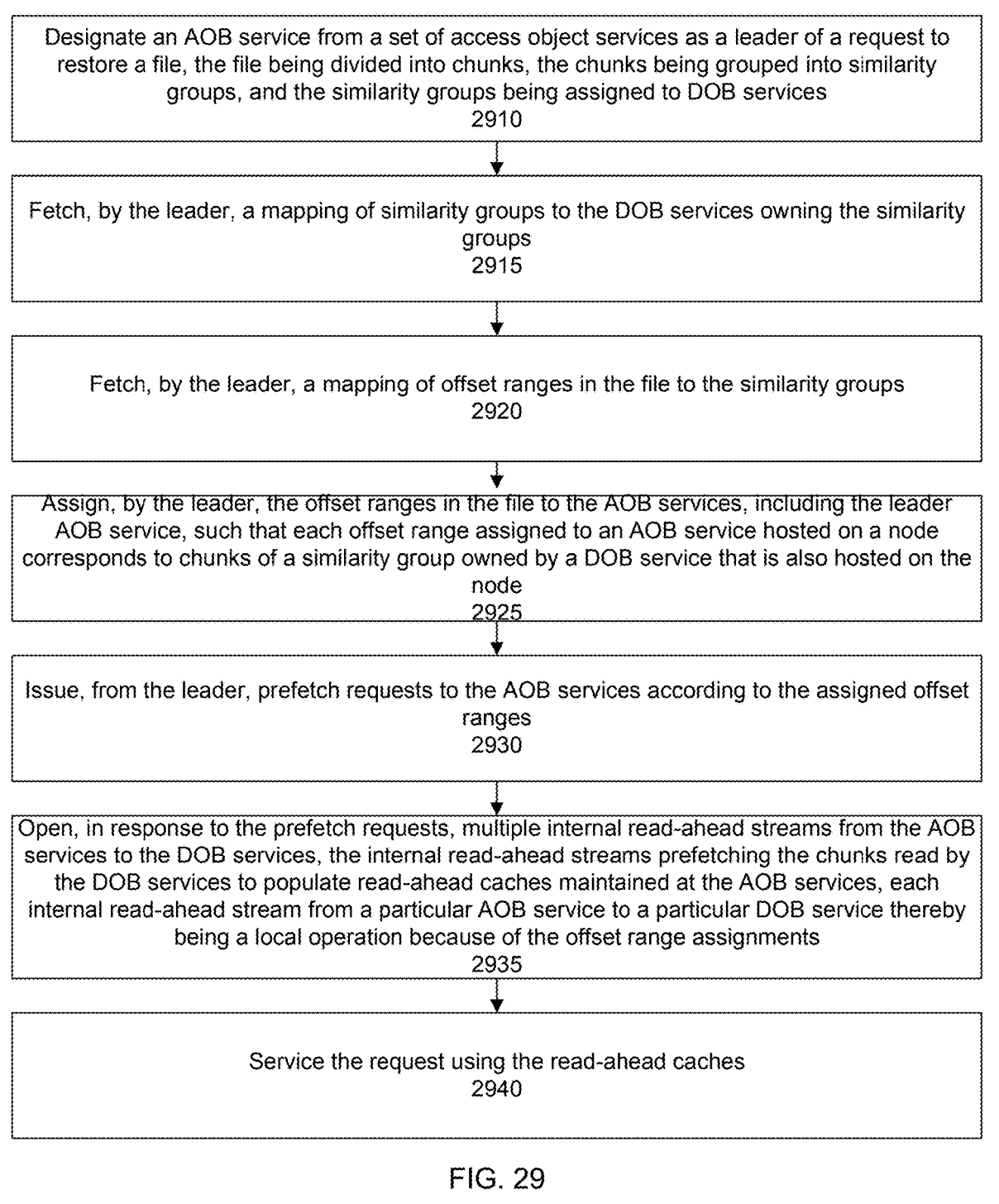

Designate an AOB service from a set of access object services as a leader of a request to restore a file, the file being divided into chunks, the chunks being grouped into similarity groups, and the similarity groups being assigned to DOB services
2910

Fetch, by the leader, a mapping of similarity groups to the DOB services owning the similarity groups
2915

Fetch, by the leader, a mapping of offset ranges in the file to the similarity groups
2920

Assign, by the leader, the offset ranges in the file to the AOB services, including the leader AOB service, such that each offset range assigned to an AOB service hosted on a node corresponds to chunks of a similarity group owned by a DOB service that is also hosted on the node
2925

Issue, from the leader, prefetch requests to the AOB services according to the assigned offset ranges
2930

Open, in response to the prefetch requests, multiple internal read-ahead streams from the AOB services to the DOB services, the internal read-ahead streams prefetching the chunks read by the DOB services to populate read-ahead caches maintained at the AOB services, each internal read-ahead stream from a particular AOB service to a particular DOB service thereby being a local operation because of the offset range assignments
2935

Service the request using the read-ahead caches
2940

FIG. 29

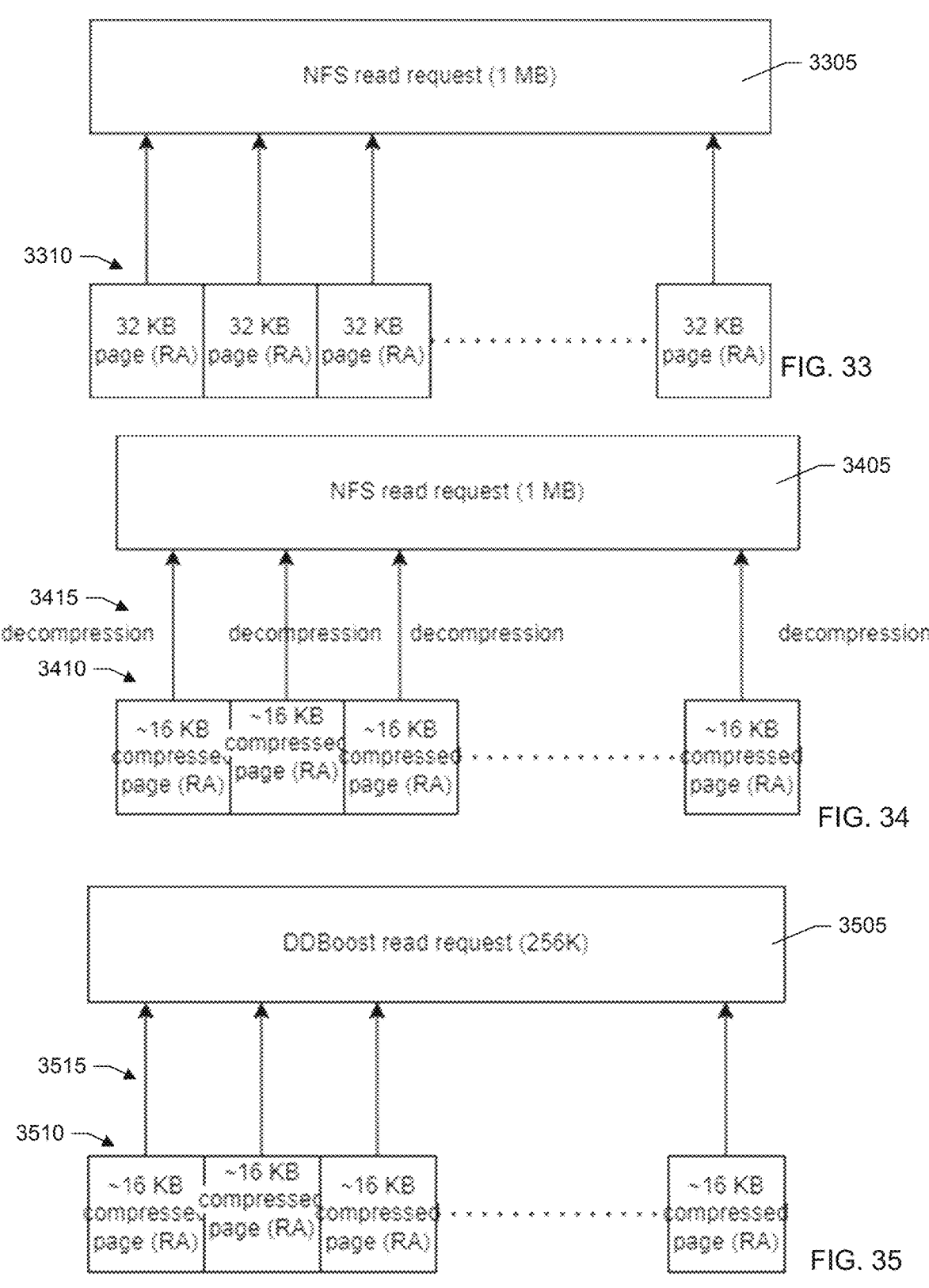

NFS read request (1 MB) —— 3305

3310 —▸

| 32 KB page (RA) | 32 KB page (RA) | 32 KB page (RA) | · · · · · · · · · · | 32 KB page (RA) |

FIG. 33

NFS read request (1 MB) —— 3405

3415 —▸ decompression      decompression  decompression                decompression

3410 —▸

| ~16 KB compressed page (RA) | ~16 KB compressed page (RA) | ~16 KB compressed page (RA) | · · · · · · · · · · | ~16 KB compressed page (RA) |

FIG. 34

DDBoost read request (256K) —— 3505

3515 —▸

3510 —▸

| ~16 KB compressed page (RA) | ~16 KB compressed page (RA) | ~16 KB compressed page (RA) | · · · · · · · · · · | ~16 KB compressed page (RA) |

FIG. 35

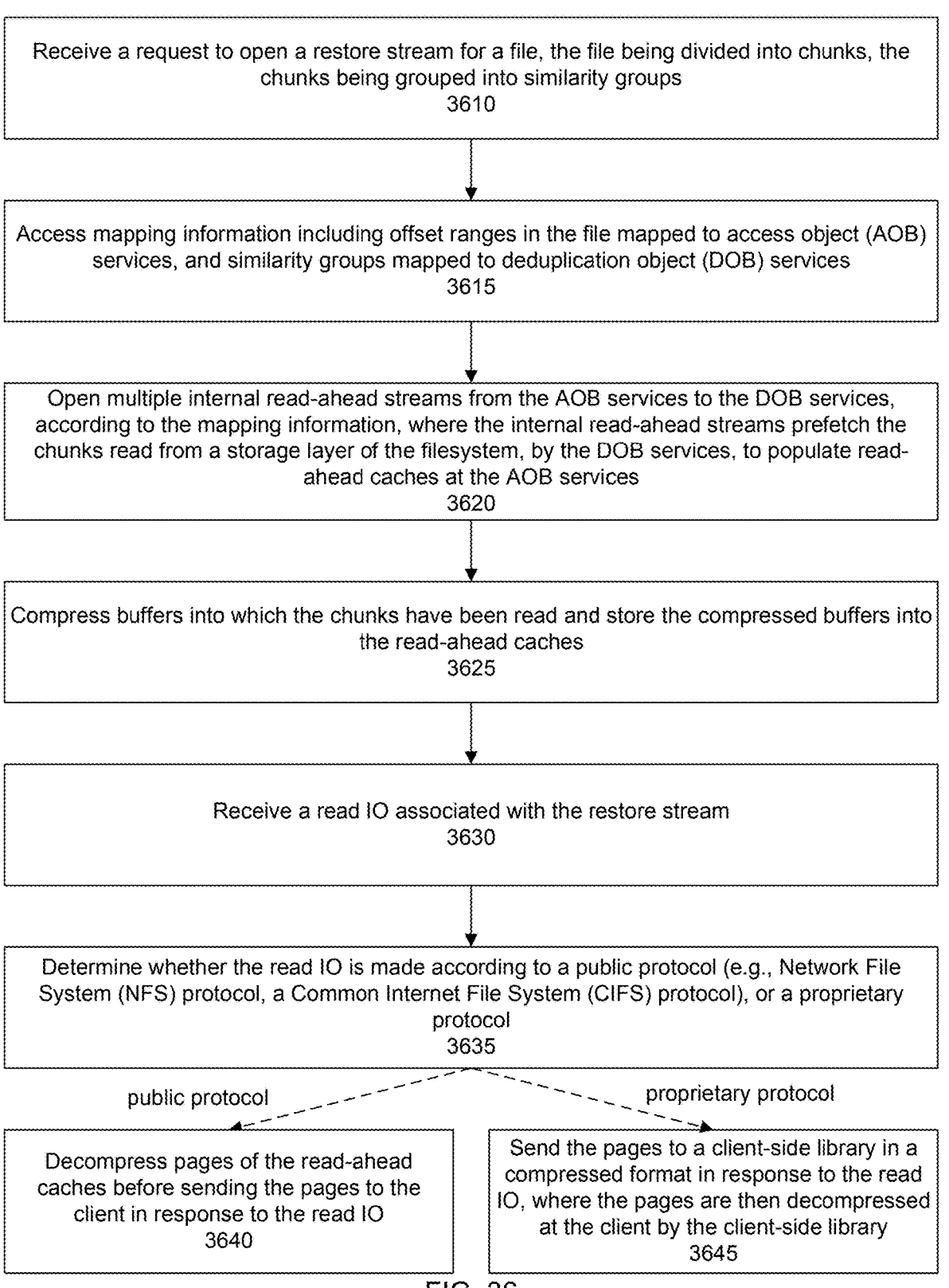

Receive a request to open a restore stream for a file, the file being divided into chunks, the chunks being grouped into similarity groups
3610

Access mapping information including offset ranges in the file mapped to access object (AOB) services, and similarity groups mapped to deduplication object (DOB) services
3615

Open multiple internal read-ahead streams from the AOB services to the DOB services, according to the mapping information, where the internal read-ahead streams prefetch the chunks read from a storage layer of the filesystem, by the DOB services, to populate read-ahead caches at the AOB services
3620

Compress buffers into which the chunks have been read and store the compressed buffers into the read-ahead caches
3625

Receive a read IO associated with the restore stream
3630

Determine whether the read IO is made according to a public protocol (e.g., Network File System (NFS) protocol, a Common Internet File System (CIFS) protocol), or a proprietary protocol
3635 public protocol                                                   proprietary protocol Decompress pages of the read-ahead caches before sending the pages to the client in response to the read IO
3640

Send the pages to a client-side library in a compressed format in response to the read IO, where the pages are then decompressed at the client by the client-side library
3645

FIG. 36

SERVICING FILE RESTORATIONS IN A DEDUPLICATION FILESYSTEM USING A READ-AHEAD CACHE

TECHNICAL FIELD

The present invention relates generally to information processing systems, and more particularly to large scale filesystems.

BACKGROUND

A distributed filesystem is a type of filesystem that spans multiple servers, but provides a unified view to clients accessing the filesystem. A deduplicated filesystem is a type of filesystem that seeks to reduce the amount of redundant data that is stored by storing only a single copy of data rather than multiple redundant copies. A deduplicated filesystem can be especially effective in a backup system because of the reduction in the number of duplicate copies of data that are stored. A cluster refers to a group of interconnected servers that work together to run an application as a single system. Clustering can improve performance, enhance availability, and provide scalability.

Underlying the filesystem is a storage layer where file and other data is stored. Restoration of a file involves read input/output (IOs) to fetch data from the storage layer and serve the data to the requesting application. Depending on factors such as the size of the file to restore, number of file generations and backups, and other factors, it can require a considerable amount of time to restore a file. There is a need for improved systems and techniques to reduce the time required to restore a file and increase efficiency.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

An access object (AOB) service receives a restore stream from a client for a file managed by a deduplication filesystem. The file is represented by a segment tree including segments in an upper level referencing chunks of the file. The upper level segments are grouped into similarity groups and the similarity groups are assigned to deduplication object (DOB) services. The upper level segments are iterated over to open multiple internal read-ahead streams from the AOB service to the DOB service to populate a read-ahead cache maintained at the AOB service. The restore stream is serviced using the read-ahead cache.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 13 shows a flow for a multi-stream restore, according to one or more embodiments.

FIG. 20 shows a flow for concurrent read-aheads across access object services, according to one or more embodiments.

FIG. 27 shows a flow of using offset ranges based on similarity group ownership to restore a file, according to one or more embodiments.

FIG. 28 shows a block diagram of designating an access object service as a leader for restoration of a file, according to one or more embodiments.

FIG. 29 shows a flow for restoring a file using a leader access object service, according to one or more embodiments.

FIG. 33 shows a block diagram of responding to a read request, according to one or more embodiments.

FIG. 34 shows a block diagram of responding to a read request when read-ahead buffers have been compressed, according to one or more embodiments.

FIG. 35 shows a block diagram of responding to another read request when read-ahead buffers have been compressed, according to one or more embodiments.

FIG. 36 shows a flow of responding to read requests when read-ahead buffers have been compressed, according to one or more embodiments.

DETAILED DESCRIPTION

Figure 1:
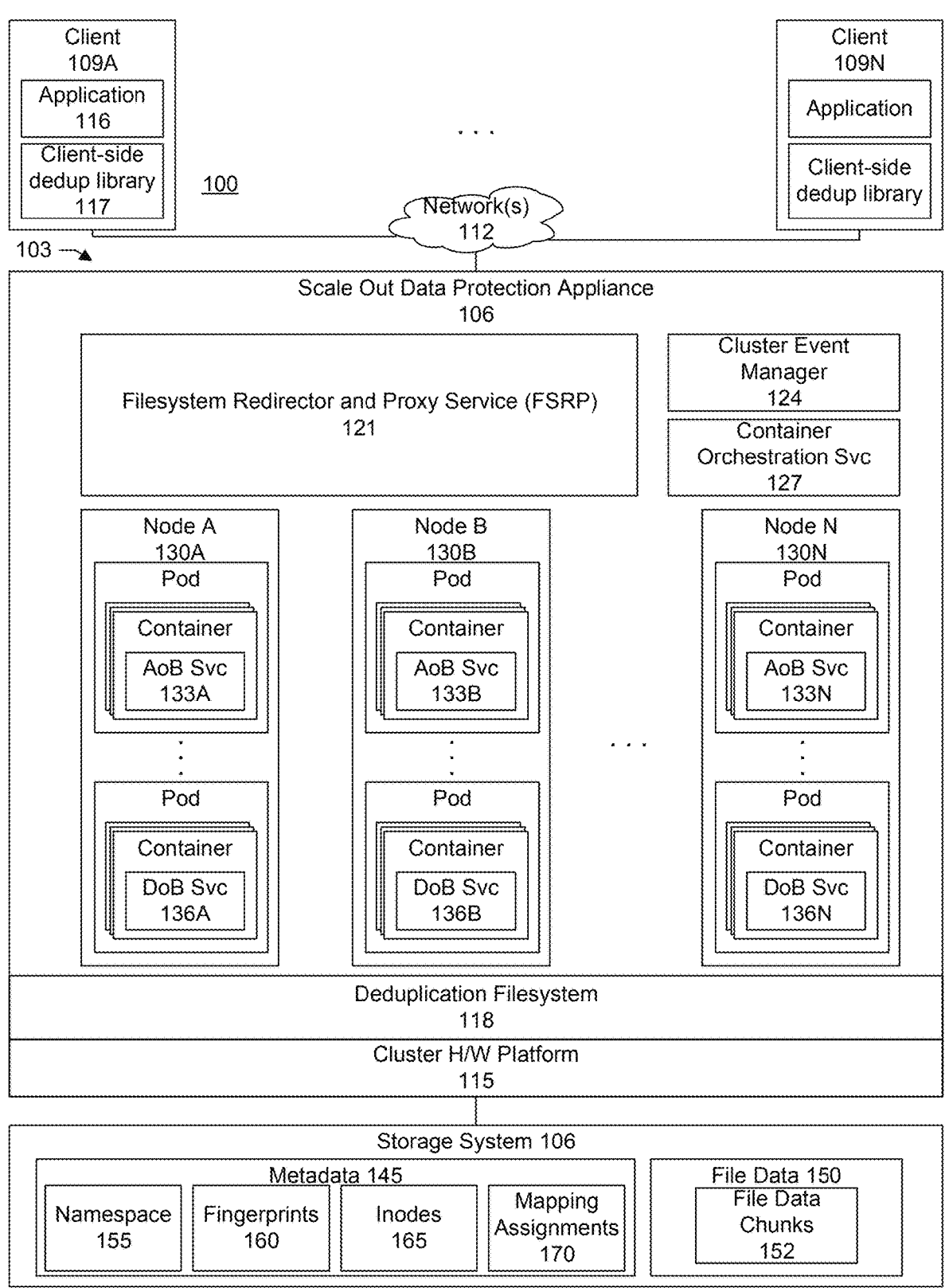
FIG. 1 shows a block diagram of an information processing system having a deduplication filesystem, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two.

FIG. 1 shows a block diagram of an information processing system 100 within which methods and systems for improving sequential restore performance in a scale-out deduplication filesystem may be implemented. The system includes a data protection appliance 103, connected to an underlying storage system 106, and a set of clients 109A-N connected to the data protection appliance via a network 112. The data protection appliance is responsible for managing and storing data (e.g., files) backed up from the clients. The data protection appliance may be referred to as a scale-out data protection system.

The system includes a set of distributed components and services supported by an underlying cluster hardware platform 115. The hardware platform may include memory and processors, among other hardware components. The clients, such as client 109A, may include an application 116 and a client-side deduplication library 117 installed at the clients.

The application may include, for example, a backup application. The client-side deduplication library is positioned between the client application and data protection appliance and exposes an interface to the client application through which services of the data protection appliance may be made available. In an embodiment, the client-side library provides a proprietary protocol that allows the client application (e.g., backup application) to take advantage of storage and network efficiencies offered by the deduplication filesystem during backup and restoration operations. The protocol is custom-built to handle the specific use cases related to backup and restoration. The client-side library may be provided as a plug-in that presents a standard filesystem mount point to the application.

The client-side library, however, is optional and may not be included in some embodiments. In an embodiment, the filesystem supports other file transfer protocols for accessing files through a network. Such protocols include Network File System (NFS) and Common Internet File System (CIFS). These protocols may be referred to as public protocols or standard protocols. Such protocols may be tied to specific organizations or developed through collaboration between organizations.

In an embodiment, the data protection appliance includes a deduplication filesystem 118, filesystem redirector and proxy service (FSRP) 121, cluster event manager (CEM) 124, container orchestration service 127, and nodes 130A-N hosting these and other services of the filesystem. Such services may include access object (AOB) services 133A-N and deduplication object (DOB) services 136A-N. In an embodiment, a node is provisioned with a pair of services including an access object service and a deduplication object service. The nodes may be physical or virtual nodes. A cluster may have a combination of physical and virtual nodes.

The underlying storage system provides persistent storage for the services, files managed by the filesystem, and metadata structures organizing the files. The storage system stores data written to and generated by the filesystem including metadata 145 and client or user file data 150. In an embodiment, the files are divided into chunks or segments 152 and represented using tree data structures. Metadata includes a namespace 155, fingerprints 160, inodes 165, and mapping assignments 170, among other data structures.

Systems and techniques are provided to reduce the time required to restore a file managed by the deduplication filesystem to a client. In an embodiment, an architecture of the deduplication filesystem includes a distributed set of services. The services facilitate support for filesystem properties such as complex namespace and random IO and, unlike a monolithic architecture, can be scaled up or down as required. This allows good performance for clients that may range from tens, hundreds, or even many thousands. The filesystem may hold many millions or even billions of files. In order to conserve storage space, the files may be deduplicated. Traditional techniques for restoring files do not recognize the unique challenges of restoring from a large scale deduplication filesystem.

In an embodiment, systems and techniques are provided to issue prefetch requests or read-aheads for data of a file for which an application has made request for a restoration. Restoring a file generally involves reading data from an underlying storage layer where the filesystem resides above and transmitting the data to the requesting application. In an embodiment, data corresponding to the read-aheads is read from the underlying storage layer and stored in buffers that may be referred to as read-ahead caches or read-ahead buffers. The cache may include memory. When an actual read IO is issued from the application for the data, the read IO can be serviced using the cache rather than having to then fetch the data from the underlying storage layer. The application read IO can terminate at the read-ahead cache rather than having to proceed lower down through the protocol stack into the storage layer because the requested data is, presumably, already present in the read-ahead cache. If the data requested by the read IO cannot be found in the read-ahead cache, the data is fetched from the storage layer.

The mapping assignments identify portions of files and corresponding services (e.g., AOB and DOB services) assigned responsibility or ownership for processing those portions. In other words, a file may be separated or divided into multiple portions and different services or service instances may be assigned different portions of the file to process. This allows for opening multiple internal streams for the different portions with the streams operating concurrently or in parallel to reduce the time required to conduct the restoration.

The filesystem provides a way to organize data stored in a storage system and present that data to clients and applications in a logical format. The filesystem organizes the data into files and folders into which the files may be stored. When a client requests access to a file, the filesystem issues a file handle or other identifier for the file to the client. The client can use the file handle or other identifier in subsequent operations involving the file. The namespace of the filesystem provides a hierarchical organizational structure for identifying filesystem objects through a file path. A file can be identified by its path through a structure of folders and subfolders in the filesystem. A filesystem may hold many hundreds of thousands or even many millions of files across many different folders and subfolders and spanning thousands of terabytes.

Figure 2:
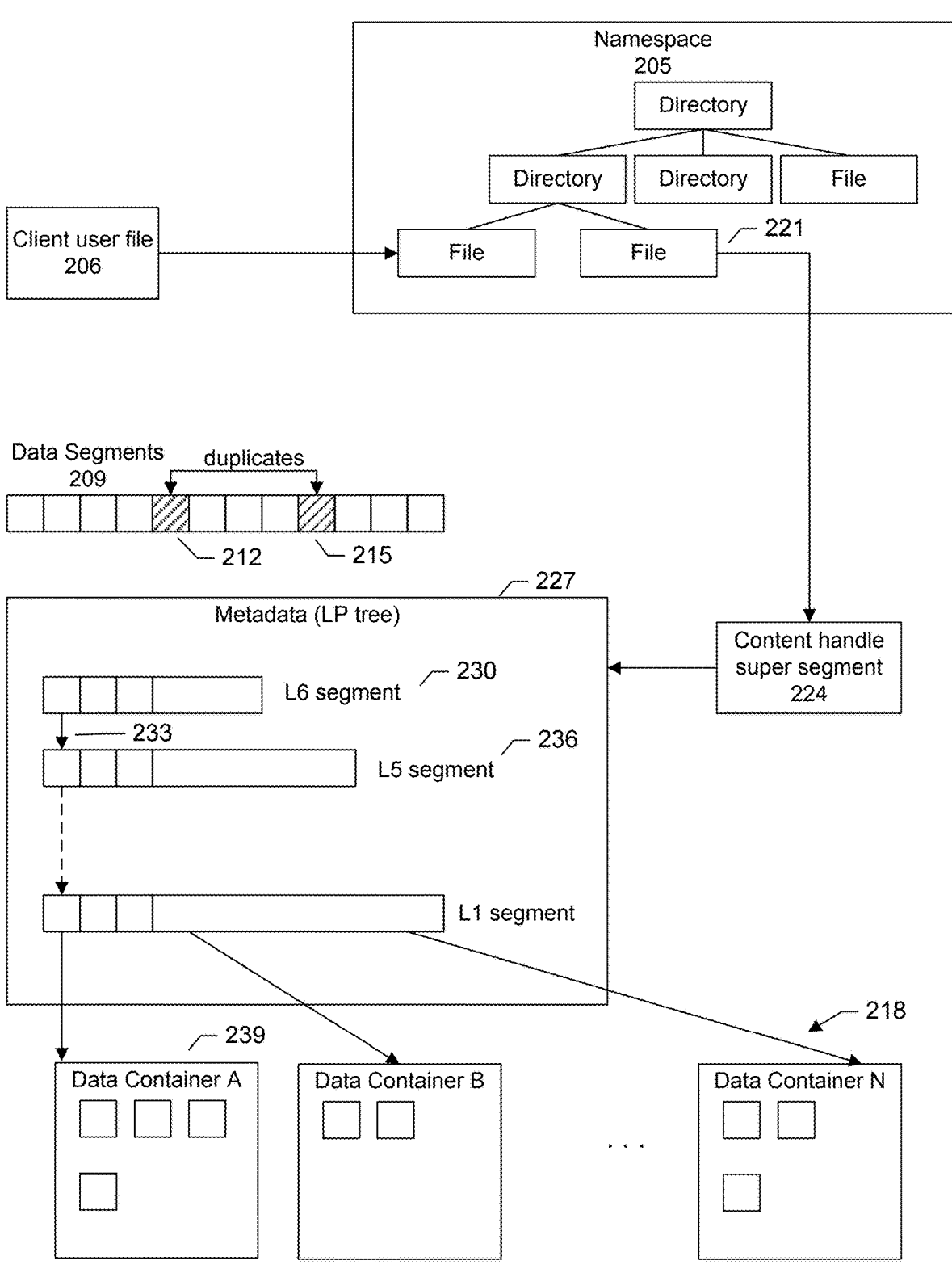
FIG. 2 shows an example of a deduplication process, according to one or more embodiments.

In an embodiment, the filesystem is a deduplicated or deduplication filesystem. FIG. 2 shows a block diagram illustrating a deduplication process of the filesystem according to one or more embodiments. A deduplicated filesystem is a type of filesystem that can reduce the amount of redundant data that is stored. As shown in the example of FIG. 2, the filesystem maintains a namespace 205. Further details of a filesystem namespace are provided in FIG. 3 and the discussion accompanying FIG. 3.

As data, such as incoming client user file 206, enters the filesystem, it is segmented into data chunks or segments 209 and filtered against existing segments to remove duplicates (e.g., duplicate segments 212, 215). The processing an incoming file may be referred to as ingestion. A segment that happens to be the same as another segment that is already stored in the filesystem may not be again stored. This helps to eliminate redundant data and conserve storage space. Metadata, however, is generated and stored that allows the filesystem to reconstruct or reassemble the file using the already or previously stored segment. Metadata is different from user data. Metadata may be used to track in the filesystem the location of the user data within a shared storage pool. The amount of metadata may range from about 2 or 4 percent the size of the user data.

More specifically, the filesystem maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the existing fingerprints in the fingerprint index. Matching fingerprints indicate that corresponding data segments are already stored. Non-matching fingerprints indicate that the corresponding data segments are unique and should be stored.

Unique data segments are packed and stored in fixed size immutable containers 218. There can be many millions of containers tracked by the filesystem. The fingerprint index is updated with the fingerprints corresponding to the newly stored data segments. A content handle 221 of the file is kept in the filesystem's namespace to support the directory hierarchy. The content handle points to a super segment 224 which holds a reference to a top of a segment tree 227 of the file. The super segment points to a top reference 230 that points 233 to metadata 236 and data segments 239.

Thus, in an embodiment, each file in the filesystem is represented by a tree. In a specific embodiment, the tree is a Merkle tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

Figure 3:
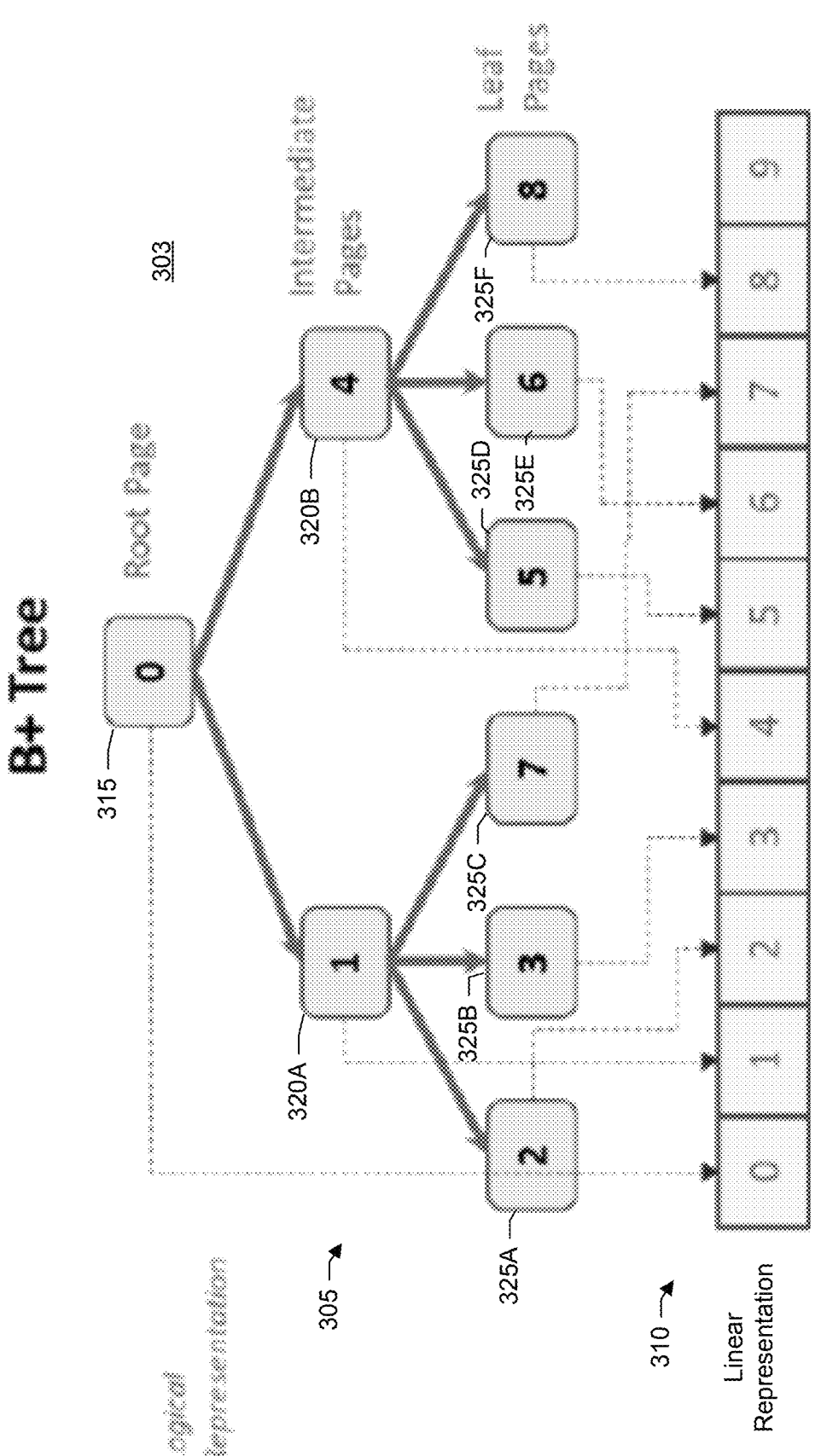
FIG. 3 shows an example of a tree data structure of the namespace, according to one or more embodiments.

An example of a segment tree is shown in FIG. 3. A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes. In an embodiment, segments in the filesystem are identified by 24 byte keys (or the fingerprint of a segment), including the LP segments. Each LP segment contains references to lower level LP segments.

FIG. 3 shows further detail of a namespace of the filesystem. In an embodiment, the namespace is represented by a B+ tree data structure where pages of the tree are written to a key-value store. Page identifiers form the keys of the key-value store and page content form the values of the key-value store. The tree data structure includes the folder and file structure as well as file inodes. FIG. 3 shows an example of a B+ Tree 303 in a logical representation 305 and a linear representation 310. In this example, there is a root page 315, intermediate pages 320A,B, and leaf pages 325A-F. The broken lines shown in FIG. 3 map the pages from their logical representation in the tree to their representation as a linear sequential set of pages on disk, e.g., flattened on-disk layout. In other words, the tree may be represented as a line of pages of data.

The intermediate pages store lookup keys that reference other intermediate or leaf pages. An intermediate page may be referred to as an INT page and references other INT pages or leaf pages by interior keys.

The leaf page contains "key/value" pairs. In an embodiment, a B+ Tree key is a 128-bit number kept in sorted order on the page. It is accompanied by a "value," which is an index to data associated with that key and may be referred to as a "payload." In an embodiment, the 128-bit key includes a 64-bit PID, or parent file ID (the ID of the directory that owns this item), and a 64-bit CID, or child file ID. In an embodiment, the leaf page stores a key for each file in the filesystem. The key references a payload identifying an inode number of the file and thus a pointer to content or data of the file, such as a set of blocks to read. There can be another key for each file that identifies a name of the file.

Referring back now to FIG. 1, in an embodiment, the filesystem includes a set of microservices distributed across multiple nodes of a cluster. The services or microservices include the filesystem redirector and proxy service, access object services, and deduplication object services, among other services, that are hosted across the nodes of the cluster. The services are managed by the container orchestration service. An example of a container orchestration service is Kubernetes. Kubernetes is an open-source container-orchestration system for automating computer application deployment, scaling, and management.

A container is a virtualized computing environment that runs an application program as a service or, more specifically, microservice. Containers are similar to virtual machines (VMs). Unlike VMs, however, containers have relaxed isolation properties to share the operating system (OS) among the containerized application programs. Containers are thus considered lightweight. Containers can be portable across hardware platforms including clouds because they are decoupled from the underlying infrastructure. Applications may be run by containers as microservices with the container orchestration service facilitating scaling and failover. For example, the container orchestration service can restart containers that fail, replace containers, kill containers that fail to respond to health checks, and withhold advertising them to clients until they are ready to serve.

In an embodiment, the filesystem services or microservices run inside the virtualized environment provided by the orchestration service as containers. One or more containers may be grouped into a group that may be referred to as a pod. Pods can run one or more containers that share the same network namespace, storage, and other resources. Each pod may be assigned an IP address and may communicate with each other across nodes or within a particular node. The filesystem services can run on one or multiple physical or virtual nodes (e.g., a virtual machine (VM) running in a cloud or on-premises environment). Nodes may be provisioned with a set of resources (e.g., CPU, memory, or disk space) that are allocated to the pods running on them. The filesystem can be run on premises with dedicated hardware or in a public cloud environment. In an embodiment, the architecture is designed as a shared-nothing (SN) architecture where each node brings its own disk, memory, compute, and so forth. Pods or Kubernetes pods are spawned on the nodes of the cluster and collectively form the filesystem.

Specifically, the cluster event manager communicates with the container orchestration service to monitor the cluster including cluster membership and, more particularly, identifications of AOB instances, DOB instances, or both that are currently active or available in the cluster. The FSRP service may subscribe to cluster event notifications generated by the cluster event manager. Such notifications apprise the FSRP service of membership changes to the cluster such as an instance of an AOB service being added to the cluster or an instance of an AOB service being removed from the cluster. The FSRP service tracks the services including AOB services that are currently available or active in the cluster so that client requests can be properly redirected to an AOB service that is available or active.

In an embodiment, the FSRP service provides an entry point to the cluster for the clients. At a start of an operation, such as a backup or restore operation of a file, a client can communicate with the FSRP service to obtain an Internet Protocol (IP) address of an access object service. The client then makes a connection to the access object service identified by the IP address to continue with the operation.

Figure 4:
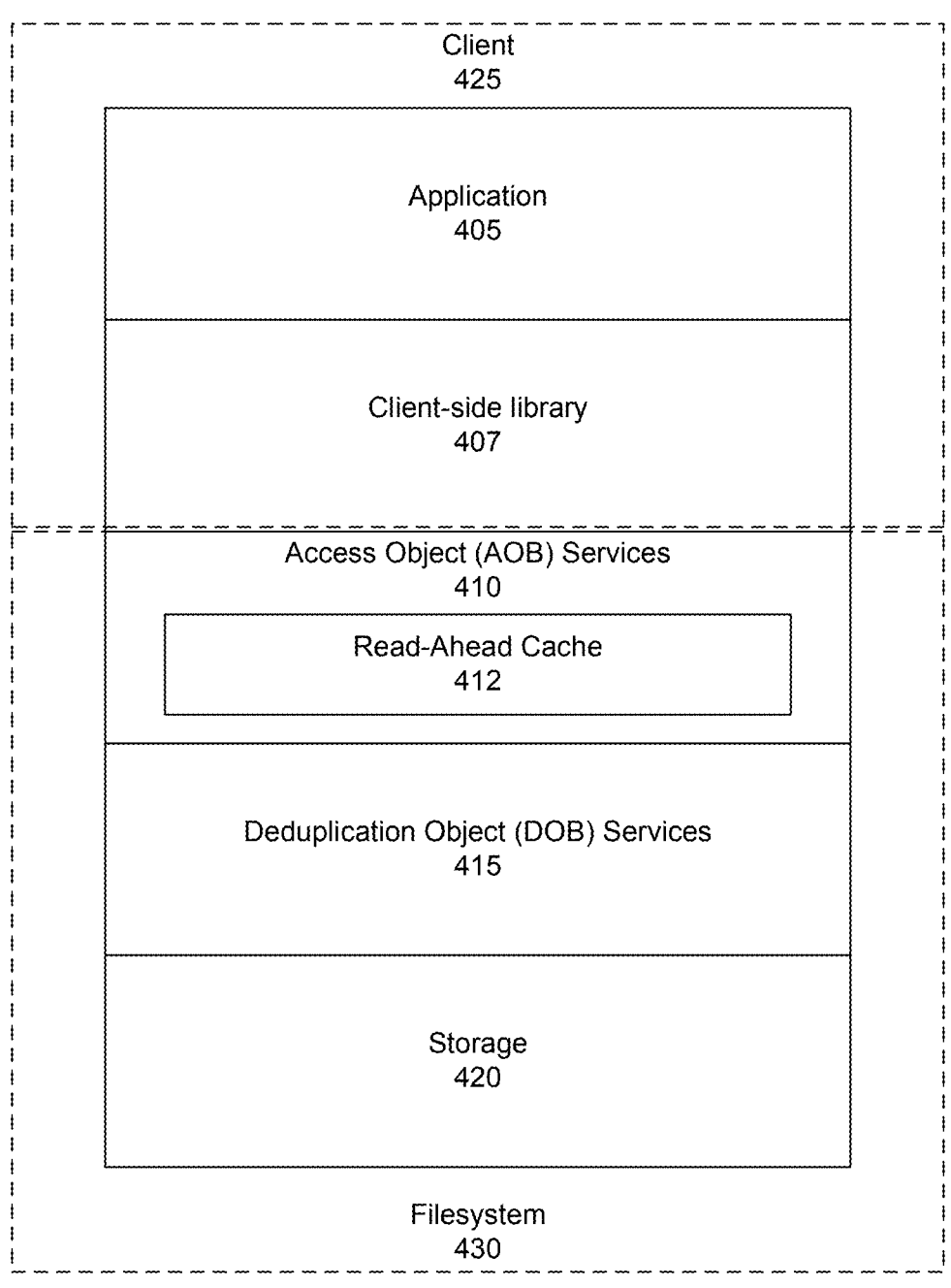
FIG. 4 shows layer diagram of the filesystem, according to one or more embodiments.

FIG. 4 shows a layer diagram of a storage or protocol stack. Layers in the diagram include a top or client application layer 405, followed by a client-side deduplication library layer 407, followed by an access object service layer 410, having a read-ahead cache 412, followed by a deduplication object services layer 415, and finally a storage layer 420. The application and client-side library reside at a client 425. The access object service, deduplication object services, and storage layers are remote from the client and form part of a deduplication filesystem 430. The client application may be considered to reside at a top of the stack. Backup and restoration requests from the application are passed down the stack for processing and results of the processing may be returned back to the application following a reverse order, e.g., back up through stack to the application.

A client application, such as a backup application, can interface with the client-side library to perform backups and restorations of files. The client-side library communicates with the services of the deduplication filesystem to backup and restore files as requested by the application. In an embodiment, the client-side library, in conjunction with the deduplication filesystem, provides a proprietary or custom protocol that may be referred to as DDBoost. During a backup or restoration, a client application can call the client-side deduplication library application programming interfaces (APIs) which, in turn, issue remote procedure calls (RPCs) to the deduplication filesystem. Clients can use the DDBoost backup protocol to conduct backups of client data to the storage system, restore the backups from the storage system to the clients, or perform other data protection operations.

A DDBoost client library exposes application programming interfaces (APIs) to integrate with the storage system. These API interfaces exported by the DDBoost library provide mechanisms to access or manipulate the functionality of the Data Domain Filesystem (DDFS), as provided by Dell Technologies. Embodiments may utilize the DDBoost Filesystem Plug-In (BoostFS), which resides on the client application system and presents a standard filesystem mount point to the application. With direct access to a BoostFS mount point, the application can leverage the storage and network efficiencies of the DDBoost protocol for backup and recovery. Some embodiments are described in conjunction with the DDBoost protocol, PowerProtect Backup Appliance, and Data Domain filesystem as provided by Dell Technologies. It should be appreciated, however, that principles and aspects discussed can be applied to other filesystems, filesystem protocols, and backup storage systems.

The filesystem may instead or additionally expose a RESTful endpoint that allows client applications to access filesystem services and to perform operations on resources via Hypertext Transfer Protocol (HTTP) and methods (e.g., GET, POST, PUT, and DELETE). This allows communication between the deduplicated filesystem and a client application without having to rely on the client-side deduplication library. Requests for filesystem operations such as requests to restore files can bypass the client-side deduplication library.

Access object services, which may be referred to as front-end services, are responsible for namespace operations, building tree structures for files to support random IO, and assigning data to the deduplication object services for deduplication and storage. As discussed, during file ingest, data of a file may be divided into units, referred to as L1s, which may span megabytes of content. An access object service directs L1 segments or chunks to a deduplication object service which, in turn, is responsible for deduplication, compression, and storing the data to the underlying storage layer. The deduplication object services may be referred to as back-end services.

During a restoration of a file, the deduplication object services, upon request by the access object services, prefetch the data from the storage layer and return the data to the access object services. The data is cached in a read-ahead cache maintained at one or more access object services. Thus, if or when the application issues a read IO for the data, the data is presumably already present in the read-ahead cache as a result of the prefetch and can be retrieved from the read-ahead cache, rather than having to then retrieve from the storage layer.

In an embodiment, any access object service can handle namespace operations and file access, but different access object services may be assigned responsibility for different ranges of files. Based on a hash of a file handle, path, or other information or properties associated with a file, the filesystem redirector and proxy service (FIG. 1) attempts to redirect or route associated data protection traffic to a particular access object service in a consistent manner so that future writes and/or reads of the same file are routed consistently to the same access object service. Consistent routing or redirection by the filesystem redirector and proxy service enables the access object services to cache state in memory that may be reused for other accesses. Consistent routing further helps to reduce locking, coordination, and collision issues among different access object services because each access object service can operate on its assigned range of files independent of another access object service that may be assigned a different range of files. An access object service attempts to keep necessary state in memory for efficiency. The state, however, is globally available and can be handled by other access object service instances in case of an instance failure. The files or, more particularly, file handle hash ranges can be dynamically reassigned to the access object services to maintain a balance across currently available access object services.

For namespace operations, an access object service accesses a Btree structure holding the namespace. The Btree includes the folder and file structure of the storage system as well as file inodes. The structures or at least portions of the structures may be cached on an instance of an access object service for performance. The structures, however, are globally accessible in the storage system. Thus, should an instance fail, another instance can take over the file handle hash range previously covered by the now failed instance. During folder and file updates, the tree structure for the namespace is updated. A lock is taken on pages of the tree so that updates may be made.

For a file write, an access object service creates a hierarchical tree structure representing the file. The L1 level nodes of the tree (see e.g., FIG. 2) refer to L0 chunks or segments by a fingerprint. The access object service processes incoming data from a client to generate the chunks or segments that form the L0s of the tree. Upper levels of the tree reference lower levels of the tree.

For reads and random IO, an access object service loads the tree from storage. A random read or write may be handled by finding a position in the tree that refers to the requested data. Updates to the tree may be handled by the access object service. Access object services are responsible for upper levels of the tree (e.g., L6-L2 segment levels) and deduplication object services are responsible for a lower level of the tree (e.g., L1, L0 segment levels).

In an embodiment, incoming files are divided into chunks and an algorithm is applied to the chunks to find similar chunks and group them together. These groupings of similar chunks may be referred to as similarity groups. In other words, the chunks are assigned to similarity groups such that similar chunks, according to the algorithm, are assigned to the same similarity group. In an embodiment, deduplication occurs within a similarity group and an access object service represents an L1 span of data with a similarity group. In other words, in this embodiment, similarity groups are formed at an L1 level. Thus, an L1 chunk, segment, or reference is assigned to a similarity group and, in turn, all L0 level chunks, segments, or references that have been packed into that L1 chunk are also assigned to that same similarity group. That is, in an embodiment, the ingestion process further includes grouping chunks determined to be similar into the same group. Such a group may be referred to as a similarity group.

Similarity groups facilitate spreading an ingest stream of file across the different nodes forming the cluster for processing. Consider, as an example, that are 1000 buckets or bins and the goal is to spread incoming data across the 1000 buckets. In this analogy, the buckets are the similarity groups. An algorithm is applied to the chunks to find or determine similar chunks and group them together. Any competent technique may be used to find similar chunks. Some examples of such algorithms include content-based chunking, fingerprint and hashing, chunking with sliding windows, locality-sensitive hashing (LSH), clustering algorithms, and others.

Similar pieces or chunks of data are assigned to the same bucket or similarity group. In an embodiment, deduplication occurs within a particular similarity group which may be referred to as a deduplication domain. Use of similarity groups allows the filesystem to scale and handle many petabytes of data. In an embodiment, access object services are responsible for chunking a file into variable sized chunks and assigning the chunks to similarity groups. An access object service directs a chunk to a deduplication object service based on a similarity group that the chunk belongs to.

The deduplication object services are assigned responsibility or ownership for subsets of similarity groups. That is, similarity groups are mapped to deduplication object services. For example, a first deduplication object service may be responsible for a first subset of similarity groups (e.g., similarity groups 0-63). A second deduplication object service may be responsible for a second subset of similarity groups (e.g., similarity groups 64-127), and so forth. Thus, responsibility for the similarity groups may be spread across the nodes or deduplication object services of the cluster. For example, in cluster having 4 nodes, each node hosting a deduplication object service, and 1024 similarity groups, each node may handle 256 similarity groups, e.g., 1024 similarity groups divided by 4 nodes equals 256 similarity groups per node.

The access object service uses the similarity group mapping assignments to determine which deduplication object service is responsible for processing a lower level L1 segment or chunk and routes the chunk to a deduplication object service according to the mapping assignments. An L1 level chunk may include hundreds or even thousands of L0 level chunks. The deduplication object service handles the deduplication, compression, and storage of the L0 level chunks.

In order to access data stored in the storage layer, the access object services issue requests that are passed down the layer stack, e.g., to the deduplication object services. The deduplication object services retrieve the requested data from the storage layer and the data begins its journey back up the layer stack and eventually to the requesting application.

More particularly, in an embodiment, a restoration of a file is initiated when a client application makes a request to open a restore stream for the file. The stream may be referred to as an external stream. The request may be made via the client-side library or via a conventional or public protocol such as NFS or CIFS. The request to open the stream begins the process of establishing a connection or pathway for data transfer between the data protection appliance or filesystem (e.g., data source) and client (e.g., data destination). Once the stream has been opened and configured, data can be read from, or written to, the stream. For example, a series of application read requests or read IOs may be issued from the application via the stream to the filesystem. The filesystem, in turn fetches and returns the data responsive to the read IO requests.

In an embodiment, systems and techniques are provided to prefetch data of the file to be restored from the storage layer and store the data in a cache 412 (FIG. 4) maintained at one or more access object services. When the application issues a read request or read IO, the corresponding data can be returned from the cache, rather than having to then fetch the data from the storage layer. Servicing the request with data previously retrieved and stored in the cache can greatly reduce the amount of time required to complete a file restoration.

Figure 5:
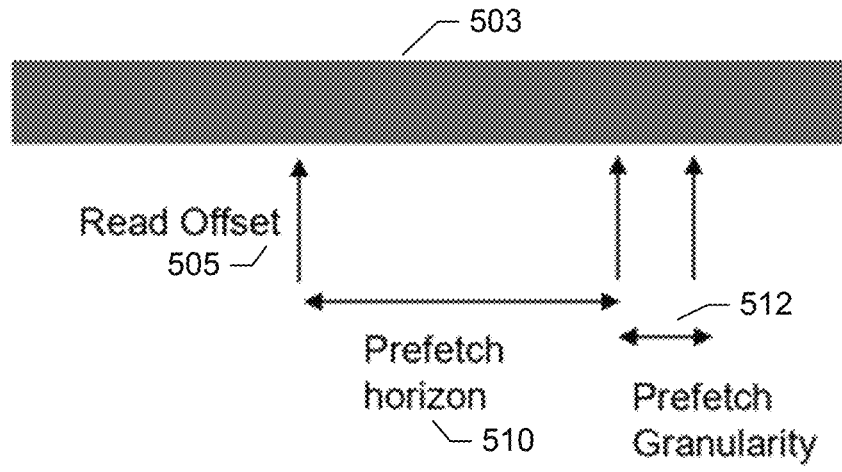
FIG. 5 shows a block diagram of a prefetch operation, according to one or more embodiments.

FIG. 5 shows a block diagram of a prefetching technique. In an embodiment, the restores are aided by a read-ahead (prefetch) mechanism. Prefetching can improve IO performance by proactively loading data of a file to be restored into memory before the data is actually requested by the application. This can reduce the amount of time spent waiting for data to be fetched from the storage layer which may include slower storage devices such as hard disk drives (HDDs) or solid-state drives (SSDs). Prefetching of a chunk 503 includes a prefetch granularity 512, prefetch horizon 510, and read offset 505.

The prefetch granularity refers to the size or granularity of the data units that are prefetched into memory. The prefetch granularity is the amount of data that is fetched in each prefetch operation. For example, a prefetch granularity of 4 kilobytes (KB) means that the filesystem will attempt to prefetch data in chunks of 4 KB. The prefetch granularity may be determined based on factors such as the characteristics of the storage device, access patterns, the available system resources, other factors, or combinations of these.

The prefetch horizon defines the distance ahead of the current read position where the filesystem predicts future accesses and initiates prefetching. The prefetch horizon represents the look-ahead distance or window within which the filesystem attempts to anticipate future data accesses. A larger prefetch horizon means that the filesystem predicts accesses further into the future, potentially improving prefetching effectiveness but also increasing resource utilization.

The read offset refers to the position within a file from which data is currently being read or accessed. The read offset may be used to determine the starting point for prefetching operations. As the application reads data sequentially, the read offset advances, and the filesystem uses this information to initiate prefetching ahead of the current read position.

During prefetching, a read hint may be issued at a certain horizon from the read offset. A single read request may issue a single prefetch request, at an offset calculated from the read offset and a prefetch horizon. As an example, if the read comes in at an offset 0 megabytes (MB), the prefetch request is issued at the 0 MB offset plus a prefetch horizon MB. Typically, the prefetch horizon is a few MB. It may be higher in the scenarios where the underlying storage layer is slower.

This mechanism can be effective when the application read requests mostly find all their data already present in the read-ahead cache, and therefore need not block for IO. This improves read performance considerably.

Since the reads are copying data out from memory while the prefetches are doing the actual work of reading from the storage layer, reads can keep catching up with the prefetches periodically throughout the restoration process. A read request that catches up with a prefetch blocks until the data becomes available, but during this time, the prefetches that have been issued out already by the previous reads get time to perform their IO and load data into memory. This ensures that the subsequent read requests do not block, until a read catches up with a prefetch again. This cycle continues throughout the restore of a file. Since most of the reads may be served out of memory, throughput improvement is significant.

As noted above, the prefetches are at the prefetch horizon, and they bring the data into memory, just as application reads are catching up. However, the application reads may catch up often enough—this is usually because the disk IO is slow, and because, as the age of the file increases, the locality of the file goes bad. This is especially true for deduplicating file systems.

Figure 6:
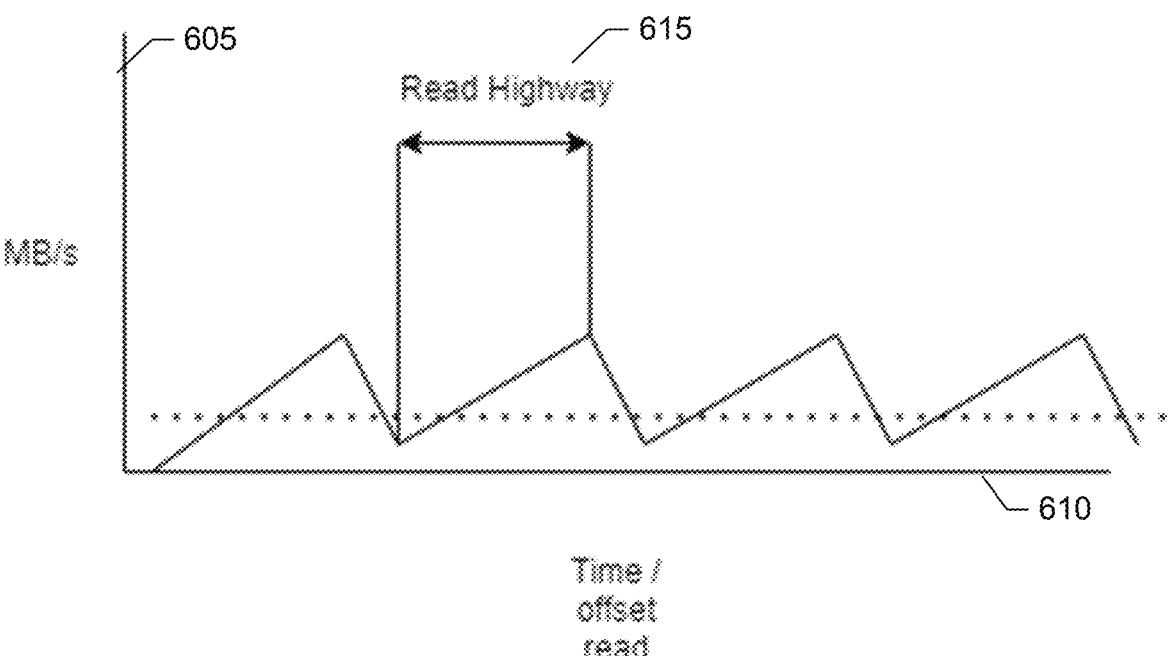
FIG. 6 shows a graph of a read highway, according to one or more embodiments.

The graph between IO being read out of memory and read off the disk, (e.g., fast reads versus slow read) may be plotted as shown in FIG. 6 (graph of read throughput 605 versus time 610). As a result, the average read performance (dotted line) is a fraction of the peak read performance.

The distance between the time spent between the stalls may be referred to as a read highway 615. The restore performance is directly proportional to the length of the read highway. Good sequential read performance can be realized by keeping the read highways long.

Prefetch, by its nature is a hint to the filesystem. This hint is so that the lower layers of the filesystem stack can read-ahead the portion of the file in memory. By its nature, there is no binding associated with the hint. The application can choose to not read the prefetched data.

Conversely, the filesystem if it chooses to, can free up the prefetched data. This is usually done by a process called the memory reclaimer, to make space for something else. The prefetching, therefore, works optimally, only for a limited amount of prefetch horizon.

To summarize, there are two opposing forces in terms of requirements at play here. The first requirement is to improve restore performance by prefetching as much as possible thereby using as much memory from the cache as possible. The second requirement, opposing the first, is to create and maintain free space in the cache by evicting data from it. The eviction pressure prevents the accumulation of an excess amount of data in the cache, thereby limiting the improvement in restore performance.

In a single-node filesystem, the size of the read-ahead cache is constrained by the amount of available memory. Further, the amount of memory available per stream is limited by the number of concurrent streams as concurrent streams compete for the memory.

In a scale out filesystem, each node runs an instance of the filesystem and a group of such nodes forming the cluster provides a unified namespace and storage. In an embodiment, systems and techniques provide an integrated software-based solution that is highly scalable and easy to deploy in both, on-premises and in the public cloud. Some highlights of the architecture shown in FIG. 1 according to a specific embodiment include: 1) Shared-nothing architecture where capacity and performance scaling is achieved by adding storage and compute resources in terms of nodes or pods; 2) Global deduplication across the cluster based on the similarity groups (simgrps); 3) High availability achieved by using an Erasure Coded storage (e.g., ObjectScale) and Kubernetes for service availability; and 4) Flexible deployments such as on-premise and in the public cloud.

To scale capacity and performance, the filesystem includes several microservices which can scale independently. The two services relevant to the core file-system path include the following:

1) Access Object Service (AOB)—This service manages the distributed namespace. It performs anchoring and fingerprinting of incoming data, divides up the data into chunks and determines the simgrp for each chunk of data. A simgrp is a data partition that enables the spreading of the data across multiple nodes and DOBs. The AOB routes the data chunk to the appropriate DOB service based on the simgrp.

Dedup (or deduplication) Object Service (DOB)—A DOB service running on a node in the cluster is responsible for one or more similarity groups. This service is responsible for deduplicating and compressing the incoming data. In an embodiment, the data is packed into containers, and containers are further packed into blobs that are 16 MB objects written to an object storage system or service. Depending upon the types of workloads being processed, at any given time, the number of AOB services may be the same as or different from the number of DOB service instances.

To load-balance file operations across the cluster, the File System Redirector and Proxy (FSRP) service routes files across all the AOB services. The routing is done by calculating a hash on the file handle, which helps to ensure that the same file is routed to the same AOB service.

Figures 7, 8:
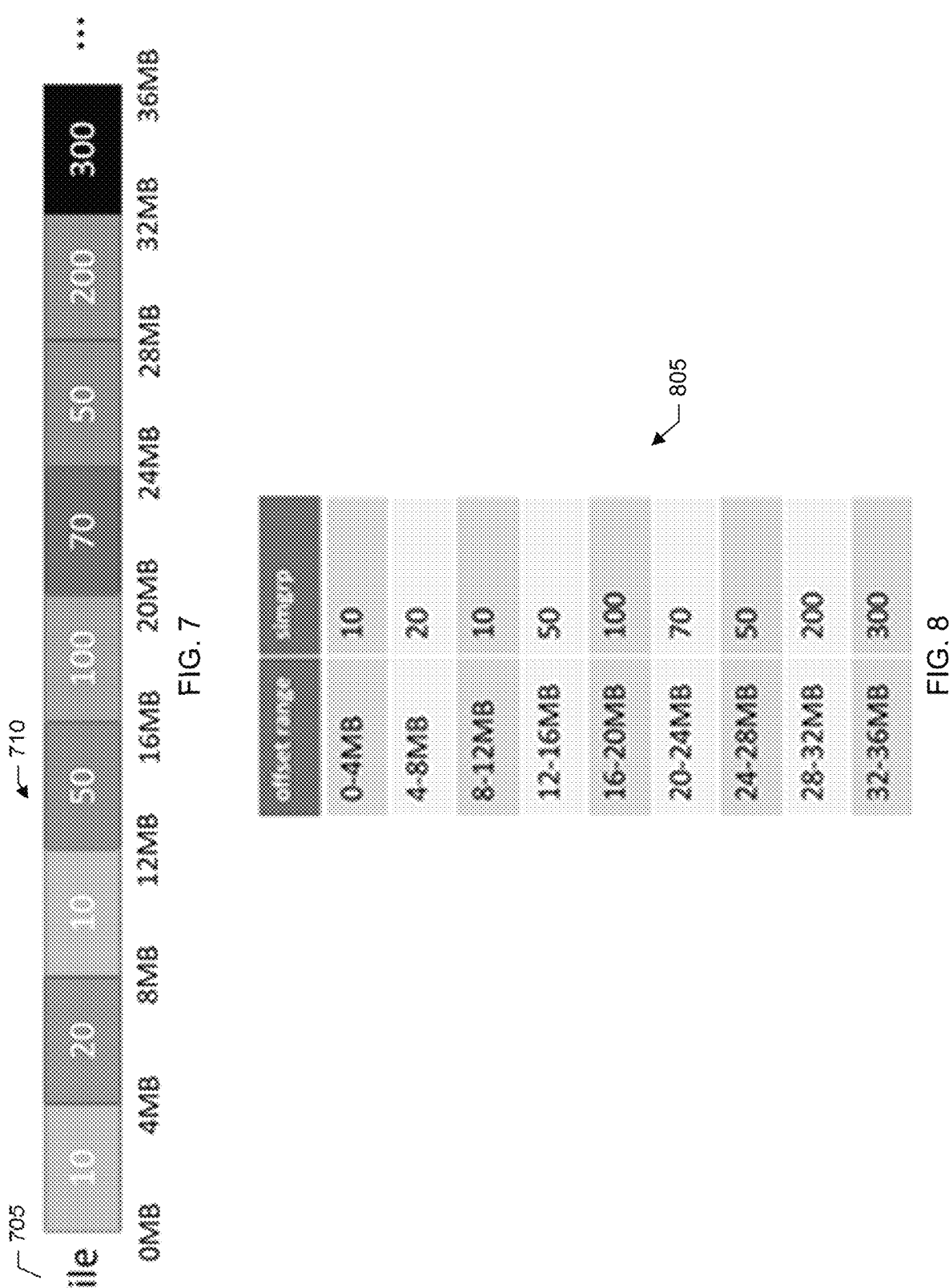
FIG. 7 shows a file having been divided into chunks, according to one or more embodiments.
FIG. 8 shows a table mapping chunks of a file to similarity groups, according to one or more embodiments.

FIG. 7 shows a block diagram of portions of a file 705 mapped to similarity groups (simgrp) 710. As discussed, in an embodiment, a file is divided into fixed-size chunks and each chunk is assigned a simgrp (which is essentially a data partition) from the available set of simgrps. In an embodiment, deduplication occurs within a data partition or simgrp, but not across simgrps.

A single file could potentially get mapped to all simgrps or a subset of simgrps. The simgrp for a file chunk is determined based on the contents of the chunk. The mapping of chunk to simgrp is encoded in the metadata of the file, specifically in the metadata segments forming the Merkle tree for a file. FIG. 7 shows how a file is divided into chunks, and the chunks getting mapped to simgrps.

FIG. 8 shows the information of FIG. 7 in a tabular or table form 805. Specifically, a first column of the table lists offset ranges corresponding to the chunks into which the file has been divided. A second column of the table lists the similarity groups the offset ranges have been mapped to based on the contents of the respective chunks. In this example, upon file ingest, a chunking scheme breaks the incoming file stream into 4 MB chunks, and an algorithm is applied to the chunks to identify and group similar chunks together.

Specifically, a first entry of the table indicates that a first offset range (e.g., 0-4 MB) corresponding to a first chunk has been mapped to similarity group 10. A second entry of the table indicates that a second offset range (e.g., 4-8 MB) corresponding to a second chunk has been mapped to similarity group 20. A third entry of the table indicates that a third offset range (e.g., 8-12 MB) corresponding to a third chunk has been mapped to similarity group 10. A fourth entry of the table indicates that a fourth offset range (e.g., 12-16 MB) corresponding to a fourth chunk has been mapped to similarity group 50, and so forth.

As discussed, deduplication object services are assigned different subsets of similarity groups to handle. Thus, an incoming stream associated with the ingest of a file can potentially be spread out across multiple deduplication object services for processing. For example, chunks of a file belonging to a first similarity group may be sent to a first deduplication object service to handle. Chunks of the file belonging to a second similarity group may be sent to a second deduplication object service, different from the first deduplication object service, to handle.

Figure 9:
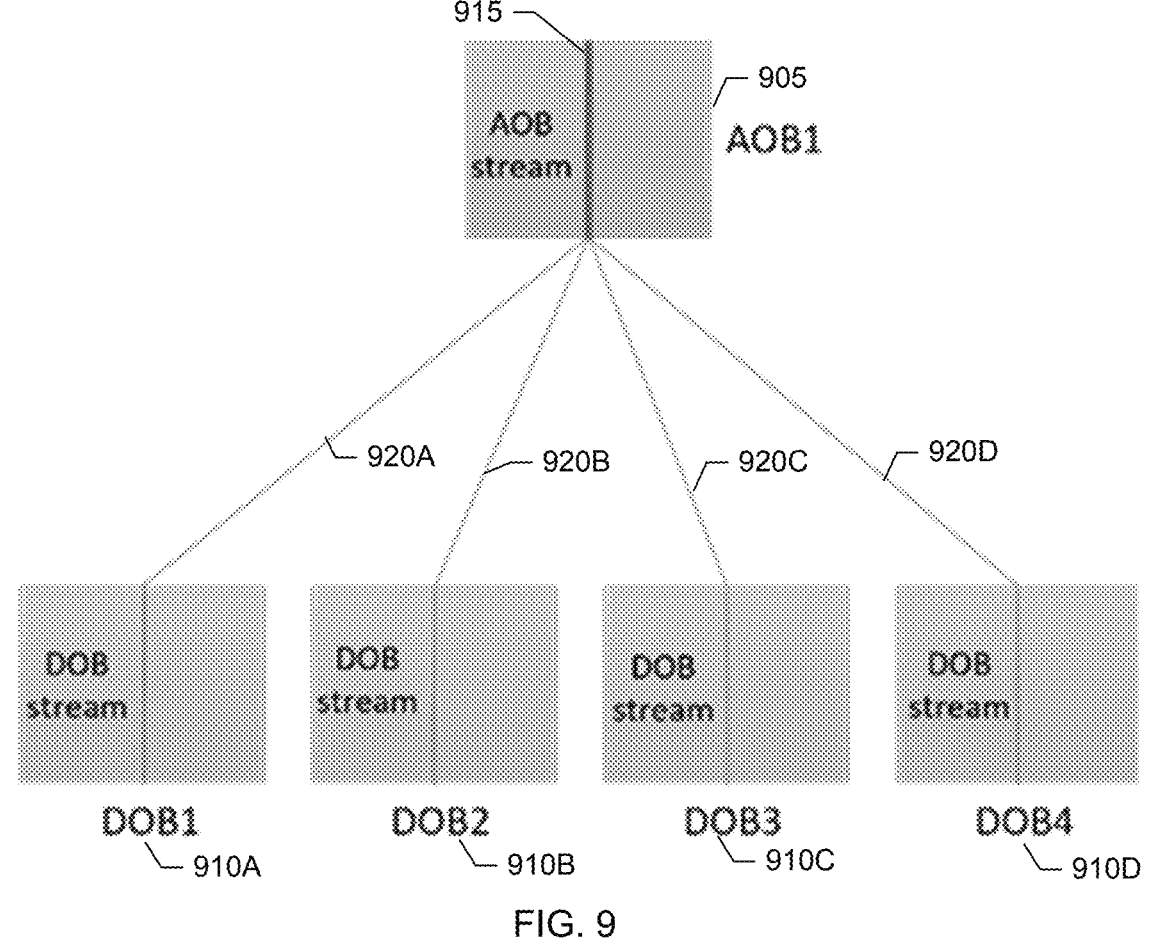
FIG. 9 shows a block diagram of stream mapping between an access object service and a deduplication object service, according to one or more embodiments.

FIG. 9 shows an example of stream mapping between an access object service and a deduplication object service. In an embodiment, a single DOB may handle multiple simgrps, e.g., two or more similarity groups. For example, if there are 1024 simgrps and 4 DOBs, each DOB handles 256 simgrps. Since file data may be spread out across multiple or all the simgrps, servicing the restore of a single file can require accessing data from multiple (e.g., two or more) or all the DOBs.

Corresponding to a restore initiated by an application, a stream is opened on an AOB. Since data needs to be retrieved from DOBs, corresponding to a single AOB stream, there are multiple DOB streams, one per DOB, as shown in FIG. 9.

Specifically, in the example shown in FIG. 9, there is an access object service 905 and deduplication object services 910A-D. A single stream 915 has been opened on the access object service to handle a restoration of a file as requested by an application. As discussed, the file is divided into chunks and the chunks are assigned to similarity groups based on chunk content. The similarity groups, in turn, are mapped to deduplication object services.

In the example shown in FIG. 9, a first chunk corresponding to a first offset range in the file may belong to a first similarity group. The first similarity group may have been assigned to first deduplication object service 910A. A second chunk corresponding to a second offset range in the file may belong to a second similarity group. The second similarity group may have been assigned to second deduplication object service 910B. A third chunk corresponding to a third offset range in the file may belong to a third similarity group. The third similarity group may have been assigned to third deduplication object service 910C. A fourth chunk corresponding to a fourth offset range in the file may belong to a fourth similarity group. The fourth similarity group may have been assigned to fourth deduplication object service 910D. Thus, a single access object service stream to restore a file may result in multiple deduplication object streams 920A-D between the access object service and deduplication object services as different portions, offset ranges, or chunks of the file may map to different similarity groups owned by different deduplication object services.

As discussed, in an embodiment, the FSRP redirects the restore of a file to a single AOB. The AOB employs a prefetching mechanism to populate a read-ahead cache by fetching data from multiple DOBs based on the similarity groups. There can be two locations for maintaining the read-ahead cache. A first location may be on the access object service. A second location may be on the deduplication object service. Various embodiments may include maintaining a read-ahead cache at an access object service, maintaining a read-ahead cache at a deduplication object service, or both.

On the AOB: For a given restore stream, the size of the read-ahead cache is limited by the memory of one AOB. Multiple streams assigned to the same AOB may compete for this cache.

On the DOB: The read-ahead cache is automatically spread across the DOBs, where each DOB hosts data corresponding to the simgrps owned by that DOB. There are two drawbacks to maintaining the read-ahead cache on the DOB. First, servicing an application read request would involve an RPC hop since the data needs to be read from the DOB's cache. Typically, the closer the cache to the application, the better the restore performance.

Second, the DOB cache is contended for by streams from all the AOBs, which could cause thrashing within the available cache size. Further, it makes the cache parameters harder to control and manage. In contrast, on an AOB, the number of streams is limited and therefore the cache is easier to size and manage.

In an embodiment, systems and techniques are provided to manage the read-ahead cache on the access object service. Servicing an application read IO from a read-ahead cache maintained at an access object service results in one less RPC hop as compared to servicing from a read-ahead cache at a deduplication object service because the access object service sits closer in the protocol stack to the application than the deduplication object service. The path length for a read is shorter for the access object service than the deduplication object service. In an embodiment, there is a per-stream cache on the AOB which overcomes the limitations of the RPC hop. However, as discussed earlier, this can limit the cache size for a stream to a single AOB.

Figures 10, 11:
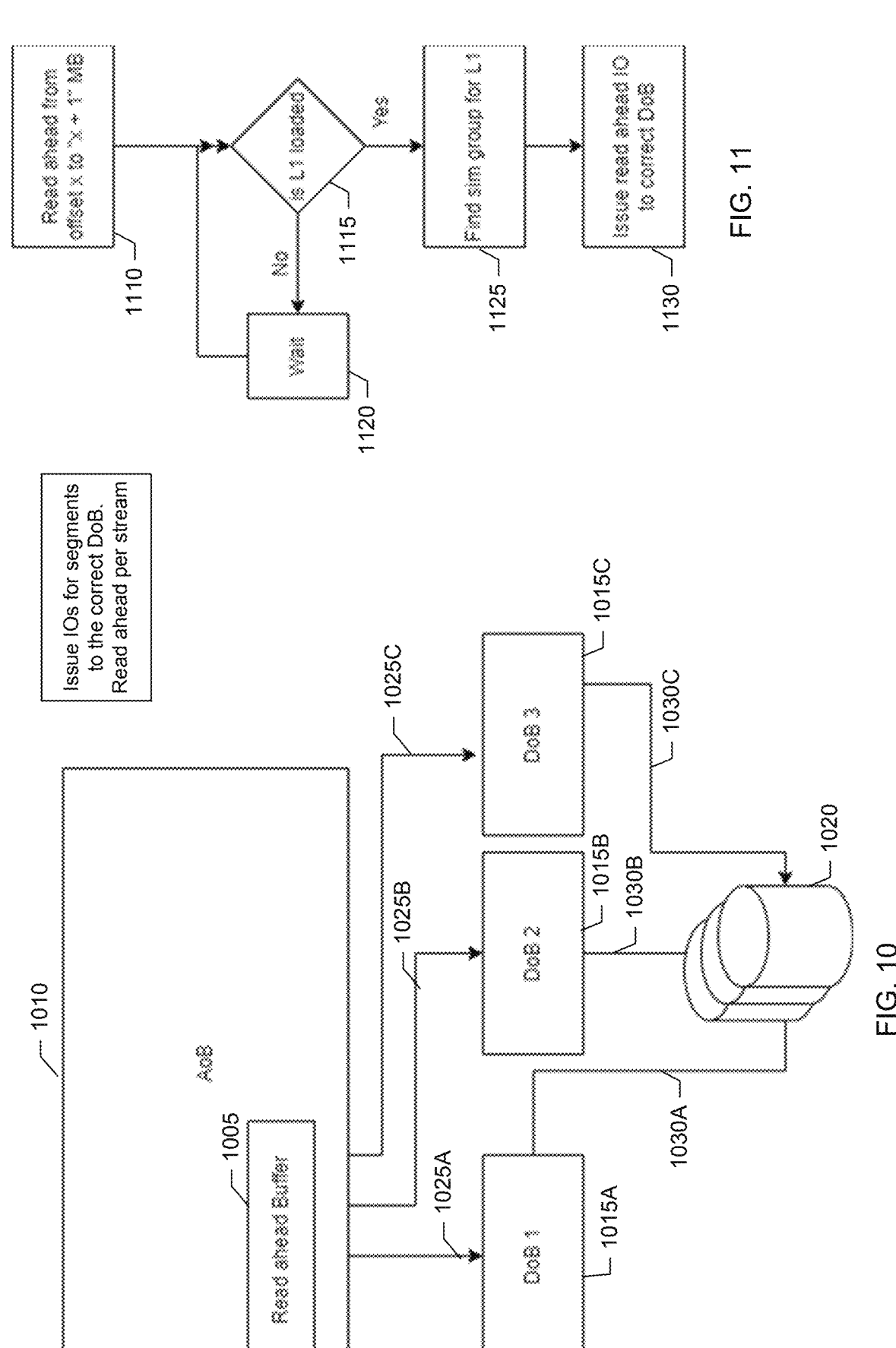
FIG. 10 shows a block diagram of a read-ahead cache at an access object service, according to one or more embodiments.
FIG. 11 shows a flow for populating the read-ahead cache, according to one or more embodiments.

FIG. 10 shows the location of a read-ahead buffer 1005 as residing at an access object service 1010, deduplication object services 1015A-C, and storage 1020. FIG. 11 shows a flowchart outlining the steps involved in issuing read-ahead IOs for segments of a file to be restored to the correct DOB. In an embodiment, a read-ahead buffer at the access object service hosts the prefetched data from the DOB. The application reads are serviced off this read-ahead cache at the access object service.

Specifically, in a step 1110, a read-ahead command for a portion of a file to restore is generated by an access object service, e.g., read-ahead from offset "X" to "X+1" MB. In a step 1115, a determination is made as to whether the access object service has loaded a tree structure representing the file from storage and, more particularly, an upper or L1 level of the tree. In an embodiment, an L1 segment or chunk corresponds to a similarity group. If the tree has yet to be loaded, the access object service waits (step 1120). In a step 1125, once the upper or L1 level of the tree has been loaded, the access object service examines an assignment mapping of similarity groups (e.g., L1 level segments or chunks) to the deduplication object services that are responsible for those similarity groups. In a step 1130, the access object service then issues read-ahead IOs to the identified deduplication object services according to the assignment mapping.

Consider, as an example, that access object service 1010 (FIG. 10) has loaded a first L1 reference corresponding to a first similarity group. The access object service consults the assignment mapping of similarity groups to deduplication object services. The access object service identifies first deduplication object service 1015A from the mapping as having responsibility for the first similarity group. The access object service then issues a first read-ahead IO 1025A to the first deduplication object service to fetch 1030A from the storage layer L0 level segments or chunks (e.g., actual file data) referenced by the first L1 reference. The fetched L0 level chunks referenced by the first L1 reference are then stored in read-ahead buffer 1005 at the access object service.

Consider, in continuing with the example above, that access object service 1010 (FIG. 10) has loaded a second L1 reference corresponding to a second similarity group. The access object service consults the assignment mapping of similarity groups to deduplication object services. The access object service identifies second deduplication object service 1015B from the mapping as having responsibility for the second similarity group. The access object service then issues a second read-ahead IO 1025B to the second deduplication object service to fetch 1030B from the storage layer L0 level segments or chunks (e.g., actual file data) referenced by the second L1 reference. The fetched L0 level chunks referenced by the second L1 reference are then stored in read-ahead buffer 1005 at the access object service.

Consider, in continuing with the example above, that access object service 1010 (FIG. 10) has loaded a third L1 reference corresponding to a third similarity group. The access object service consults the assignment mapping of similarity groups to deduplication object services. The access object service identifies third deduplication object service 1015C from the mapping as having responsibility for the third similarity group. The access object service then issues a third read-ahead IO 1025C to the third deduplication object service to fetch 1030C from the storage layer L0 level segments or chunks (e.g., actual file data) referenced by the third L1 reference. The fetched L0 level chunks referenced by the third L1 reference are then stored in read-ahead buffer 1005 at the access object service.

Figure 12:
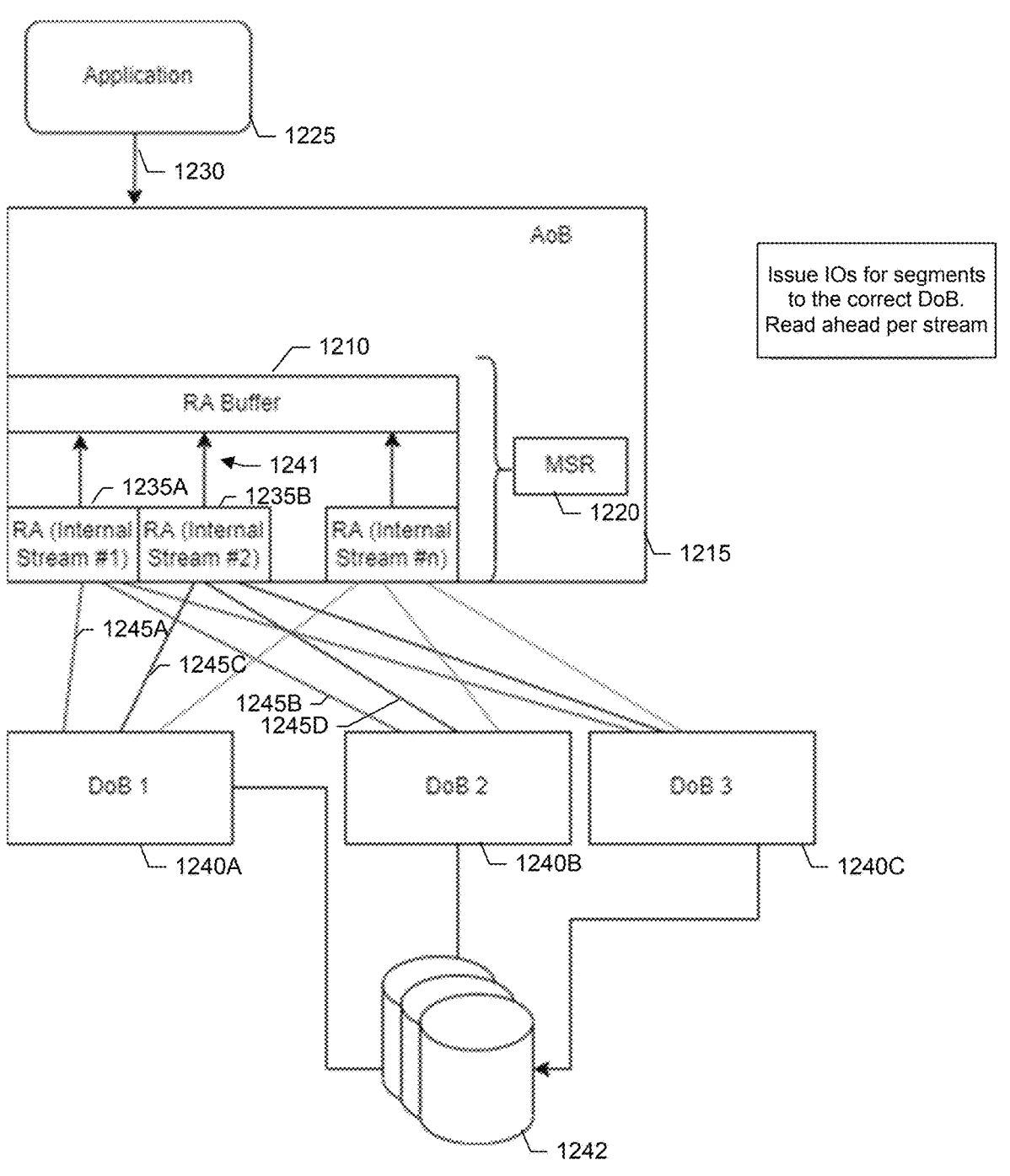
FIG. 12 shows a block diagram of a multi-stream restore, according to one or more embodiments.

FIG. 12 shows a block diagram of populating a read-ahead buffer 1210 at an access object service 1215 using a technique that may be referred to as multi-stream restore (MSR) 1220, according to one or more embodiments. In this embodiment, MSR is completely transparent to a requesting client application 1225. A restoration of a file may be initiated when the application opens a restore stream 1230 for the file. MSR internally opens up multiple streams 1235A-N for the same file. These streams are then directed to issue IO at different offsets in the file to deduplication object services 1240A-C to fill 1241 a read-ahead (RA) buffer, which is to be consumed by the application requests. An MSR engine monitors conditions such as system resource usage and file access pattern to determine whether to tear down.

FIG. 13 shows an overall flow of populating a read-ahead buffer or cache at an access object service using a multi-stream restore. In brief, in a step 1310, access object and deduplication object services of a deduplication filesystem are provisioned across a cluster of nodes. In a step 1315, an access object service receives a client request to open a restore stream for a file managed by the filesystem, the file being divided into chunks and the chunks being assigned to similarity groups.

In a step 1320, the access object service consults a table mapping the similarity groups to the deduplication object services. Each deduplication object service is responsible for reading a chunk of an assigned similarity group from a storage layer of the filesystem.

In a step 1325, multiple internal read-ahead streams from the access object service to the deduplication object services are opened. An internal read-ahead stream prefetches chunks read by the deduplication object services to populate a read-ahead cache or buffer maintained at the access object service.

Referring back now to FIG. 12, consider, as an example, first and second internal read-ahead streams have been opened at the access object service to populate the read-ahead buffer with data of a file for which a restoration stream has been opened by the application. The access object service loads from storage a tree organizing a structure of the file and, in particular, L1 level segments, chunks, or references. The access object service further retrieves mapping information that maps similarity groups, to which the L1 level references belong, to the deduplication object services.

The first internal read-ahead stream may determine from the mapping that a first similarity group, to which a first L1 level reference belongs, is owned by a first deduplication object service 1240A. Thus, the first internal read-ahead stream may issue a first read-ahead IO 1245A to the first deduplication object service to fetch from storage 1242 L0 level chunks referenced by the first L1 level reference.

The first internal read-ahead stream may determine from the mapping that a second similarity group, to which a second L1 level reference belongs, is owned by a second deduplication object service 1240B. Thus, the first internal read-ahead stream may issue a second read-ahead IO 1245B to the second deduplication object service to fetch from storage 1242 L0 level chunks referenced by the second L1 level reference.

The second internal read-ahead stream may determine from the mapping that a third similarity group, to which a third L1 level reference belongs, is owned by the first deduplication object service. Thus, the second internal read-ahead stream may issue a third read-ahead IO 1245C to the first deduplication object service to fetch from storage 1242 L0 level chunks referenced by the third L1 level reference.

The second internal read-ahead stream may determine from the mapping that a fourth similarity group, to which a fourth L1 level reference belongs, is owned by the second deduplication object service. Thus, the second internal read-ahead stream may issue a fourth read-ahead IO 1245D to the second deduplication object service to fetch from storage 1242 L0 level chunks referenced by the fourth L1 level reference, and so forth. A further discussion of MSR is provided in U.S. Pat. No. 11,644,993, issued May 9, 2023 and U.S. Pat. No. 11,150,826, issued Oct. 19, 2021, and are incorporated by reference along with all other references cited.

In an embodiment, the access object service iterates, in parallel or concurrently, over the L1 level reference associated with the file to populate the read-ahead cache maintained at the access object service. For example, a first L1 level reference may be processed in parallel or concurrently with a second L1 level reference. The iteration continues until the read-ahead cache is full. The process may then pause to let the read-ahead cache empty or reclaim space as reads associated with the restoration of the file requested by the client are serviced from the read-ahead cache. Once sufficient space becomes available in the read-ahead cache, the repopulating of the read-ahead cache restarts.

This cycle of populating the read-ahead cache via the multiple internal read-ahead streams and servicing the read requests from the read-ahead cache can continue until restoration of the file is complete (or the internal read-ahead streams are closed). Specifically, one or more internal read-ahead streams may be closed automatically based on a monitoring system determining that system load has increased beyond a threshold level. Alternatively, the one or more internal read-ahead streams may be closed in response to an on-demand request. When the one or more internal read-ahead streams are closed, restoration of the file may continue with a reduced number of internal read-ahead streams. In some cases, the number of internal read streams may be reduced to a single internal read stream that is used to respond to the external read requests for restoration of the file. While this may lengthen the time needed to restore the file, system resources that were previously dedicated to maintaining the now-closed internal read-ahead streams can be shifted to other higher priority tasks. One or more internal read-ahead streams may be reopened when system load falls below the threshold level or in response to an on-demand request. Thus, the number of internal read threads servicing external or client application read requests for restoration of a file may dynamically change throughout the restoration process of the file.

The technique shown in FIGS. 12 and 13 achieves parallelism with access to the DOBs. There are parallel network accesses, and parallel reads to various parts of the same file, and therefore, any serializations in the filesystem software stack are avoided. A performance advantage of a larger read-ahead horizon, and parallel access with MSR is provided. The size of the read-ahead cache, however, is limited by the size of the AOB, and the number of streams active on the AOB. For example, if there is just one stream active on the system, the read-ahead cache cannot be bigger than the memory allocated on a single AOB. If there are multiple streams, but the other AOBs have memory, this scheme does not allow any sharing. Further, the access to the read-ahead cache goes through to a single AOB. This reduces the possible parallelism between the application and the AOB. In other words, during a restore, the size of the read-ahead cache is limited by the AOB serving the restore.

In another embodiment, systems and techniques for prefetching leverage memory and compute resources that may be available on other AOBs, rather than relying only on the read-ahead cache that is local to the AOB serving the restore. This facilitates scaling up the restore performance for sequential restores.

In an embodiment, systems and techniques are provided to prefetch and cache data by leveraging multiple AOBs (e.g., two or more AOBs), thus converting the per-stream local cache into a per-stream distributed cache. This overcomes the limitations of cache size and cache eviction pressure. The caches on different AOBs host distinct parts of the file. This set of methods may be referred to as Concurrent Read-aheads across AOBs (CORA).

In an embodiment, the client-side deduplication library, e.g., Boost client, orchestrates the prefetch across multiple AOBs, enabling it to read data from multiple AOBs in parallel. The Boost client dynamically adjusts the prefetching mechanism in the event of one or more AOBs coming up or going down.

Various embodiments include novel ways of distributing and organizing the read-ahead cache across the AOBs, each unique in its own aspect. They are termed CORA for short, where CORA stands for COncurrent Read-aheads across AOBs. One particular technique may be referred to as Vanilla CORA. Vanilla CORA includes the dynamic management of a distributed read-ahead cache. Another technique may be referred to as Bandwidth-Optimized CORA. Bandwidth-optimized CORA reduces the data traffic between nodes. Another technique may be referred to as Protocol-Agnostic CORA. Protocol-agnostic CORA caters to non-Boost or non-proprietary or public protocols such as NFS and CIFS. Another technique may be referred to as Global CORA. Global CORA eliminates the limitations of a per-stream quota and enables a per-stream cache to grow much larger if required. Another technique may be referred to as Compressed CORA. Compressed CORA increases the effective size of the read-ahead cache. It should be appreciated that principles and aspects of a particular technique may be applicable to another technique. For example, Compressed CORA may be applicable to Vanilla CORA, Bandwidth-Optimized CORA, Protocol-Agnostic CORA, and Global CORA.

When designing the behavior of a distributed read-ahead cache, the following two scenarios are addressed. A first scenario includes operation in steady state or, more particularly, distributing and managing the per-stream read-ahead cache across the AOBs when the number of AOBs is assumed to be known and constant.

A second scenario includes operation when state changes or, more particularly, dynamically adjusting to events such as a new AOB joining the cluster or an existing AOB leaving the cluster. The first scenario (operation in steady state) is explained in detail for each of the following methods. The second scenario (operation when state changes) is explained in detail for Vanilla CORA. However, since the actions to be taken in case of a state change remain the same or similar irrespective of the specific technique involved, the description of the second scenario is skipped for subsequent techniques to avoid repetition.

Figure 14:
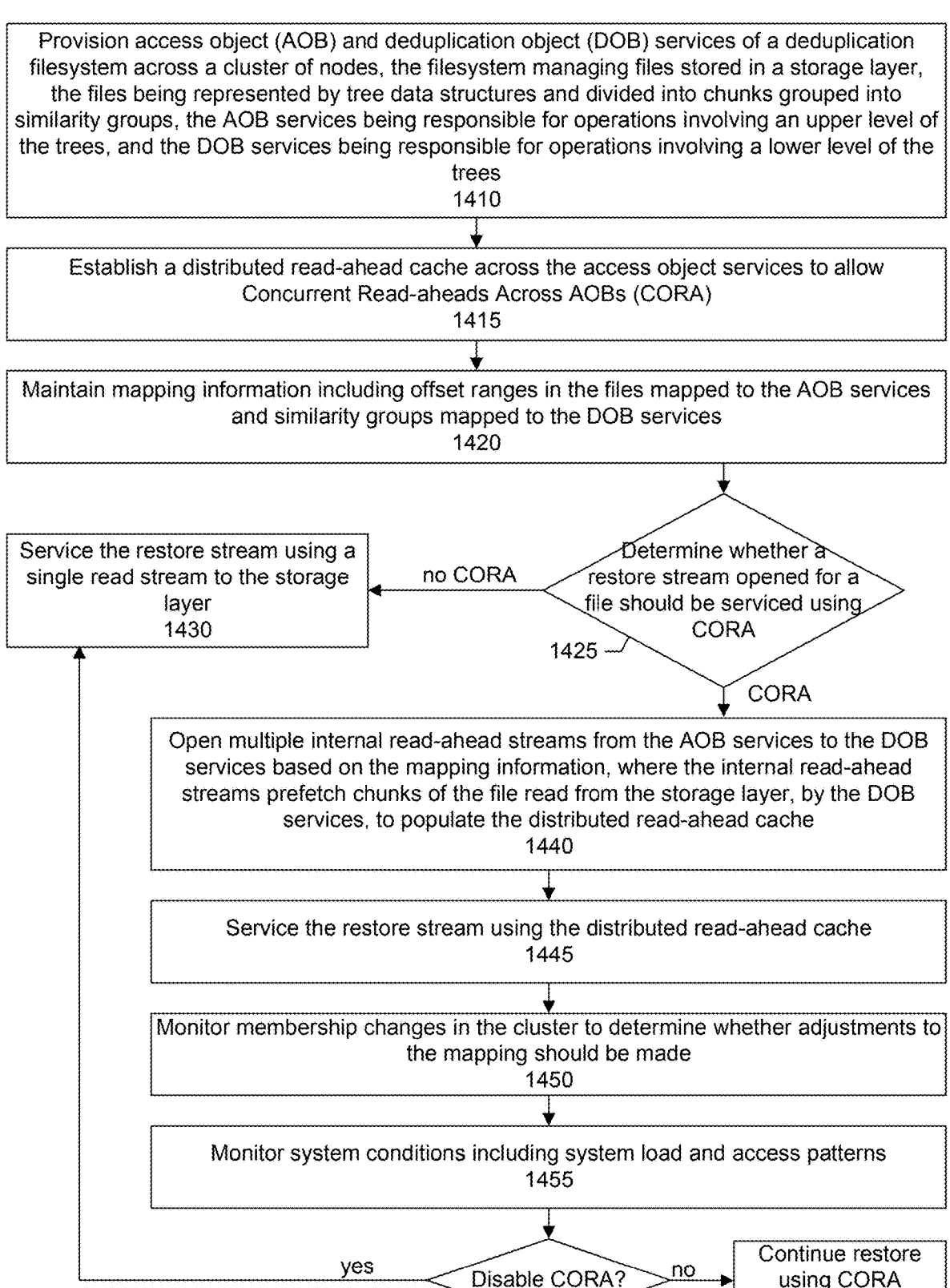
FIG. 14 shows a flow for a distributed read-ahead cache, according to one or more embodiments.

FIG. 14 shows an overall flow for COncurrent Read-aheads across AOBs (CORA), according to one or more embodiments. In a step 1410, access object and deduplication object services of a deduplication filesystem are provisioned across a cluster of nodes. The filesystem manages files stored in a storage layer. The files are represented by tree data structures and divided into chunks. The chunks are grouped into similarity groups. The access object services are responsible for operations involving an upper level of the trees. The deduplication object services are responsible for operations involving a lower level of the trees.

In a step 1415, a distributed read-ahead cache is established across the access object services. The distributed read-ahead cache allows concurrent read-aheads across the access object services. The technique may be referred to as CORA. Each read-ahead cache on a respective access object service maps to a particular range of offsets corresponding to the file to be restored. Populating a read-ahead cache at an access object service involves determining or identifying a similarity group to which chunks corresponding to that particular offset range belong. Once the similarity group has been identified, a prefetch request or read-ahead IO can be issued to a deduplication object service having responsibility for that similarity group.

More particularly, in a step 1420, mapping assignment information is maintained. The mapping assignment information maps offset ranges in the files to the access object services, and similarity groups to the deduplication object services. In an embodiment, a granularity or size of the file offset ranges assigned to the access object services may be determined based on a number of the access object services that are available in the cluster to participate in the restoration of the file. In another embodiment, a size of the file offset ranges is a fixed number. For example, the size may be fixed at 64 MB. Thus, in this embodiment, a single file offset range may include chunks belonging to multiple different similarity groups. The size, however, is configurable and may vary depending on factors such as expected sizes of files to be restored, number of nodes in the cluster, compute resources of the cluster, other factors, or combinations of these.

In other embodiments, the size of the file offset range is smaller or more granular. In an embodiment, a size of the file offset range corresponds to a level at which similarity groups are formed. For example, rather than forming file offset ranges of such a size in which there may be multiple similarity groups, file offset ranges may be formed of such a size or granularity that there is a one to one mapping between a file offset range and similarity group (see, e.g., discussion of Bandwidth-Optimized CORA below).

The number of access object services allowed to participate in a particular restoration of a file may likewise be fixed. Thus, the number of access object services allowed to participate in a particular restoration of a file may be less than a total number of access object services in the cluster. Having an excess number of access object services participating in the restoration of a single file can lead to an undesirably high level of overhead that may reduce overall filesystem performance. In another embodiment, all access object services are employed to conduct a restoration.

In a step 1425, a determination is made as to whether a restore stream opened for a file should be serviced using CORA. The determination may be based on factors such as a current number of other CORA streams operating in the cluster, size of the file being restored, file access pattern, system load, other factors, or combinations of these. For example, the cluster may be configured to support a threshold number of CORA streams. When a current number of CORA streams has reached the threshold number of CORA streams, a new CORA stream may be blocked from being established. CORA may require a minimum file size for establishment. CORA may not be enabled for a file to be restored that falls below the minimum size threshold. CORA may not be enabled for a file access pattern that is determined to be not sequential. A CORA stream consumes system resources. CORA may not be enabled when current system load exceeds a threshold system load.

If the determination is that CORA should not be enabled for the restore stream of the file, the restore stream is serviced using a single read stream to the storage layer (step 1430).

In a step 1440, however, if the determination is that CORA should be enabled, multiple internal read-ahead streams are opened from the access object services to the deduplication object services based on the mapping information. The internal read-ahead streams prefetch chunks of the file read from the storage layer, by the deduplication object services, to populate the distributed read-ahead cache. More specifically, in an embodiment, each access object service is provided with an engine that includes logic for opening an internal read-ahead stream, identifying offsets to read, determining which deduplication object service should be tasked with reading the offset, and monitoring system load so that read-ahead streams can be torn down during periods of high load (or established during periods of low load). These operations are transparent to the application.

In an embodiment, the number of internal read-ahead streams opened is a fixed number. For example, an external restore stream may result in the opening of 8 internal read-ahead streams. The number, however, can vary depending on factors such as available compute resources. Limiting the number of internal read-ahead streams to a fixed number helps to ensure that filesystem resources will be available for other tasks. In another embodiment, the number of internal read-ahead streams may vary based on system load up to a predefined maximum number. For example, periods of high system load may result in fewer internal read-ahead streams as compared to periods of low system load where there may be a greater number of internal read-ahead streams.

In a step 1445, the restore stream is serviced using the distributed read-ahead cache.

In a step 1450, membership changes in the cluster are monitored to determine whether adjustments to the mapping should be made. In a step 1455, system conditions including system load and access patterns are monitored during the restoration of the file to determine whether CORA should be disabled (step 1460). If, for example, system load exceeds a threshold level, an access pattern changes from sequential to non-sequential, or both, CORA may be disabled (e.g., torn down) and replaced with a single restore stream (step 1430). Otherwise, the restoration of the file may continue using CORA (step 1465).

Figure 15:
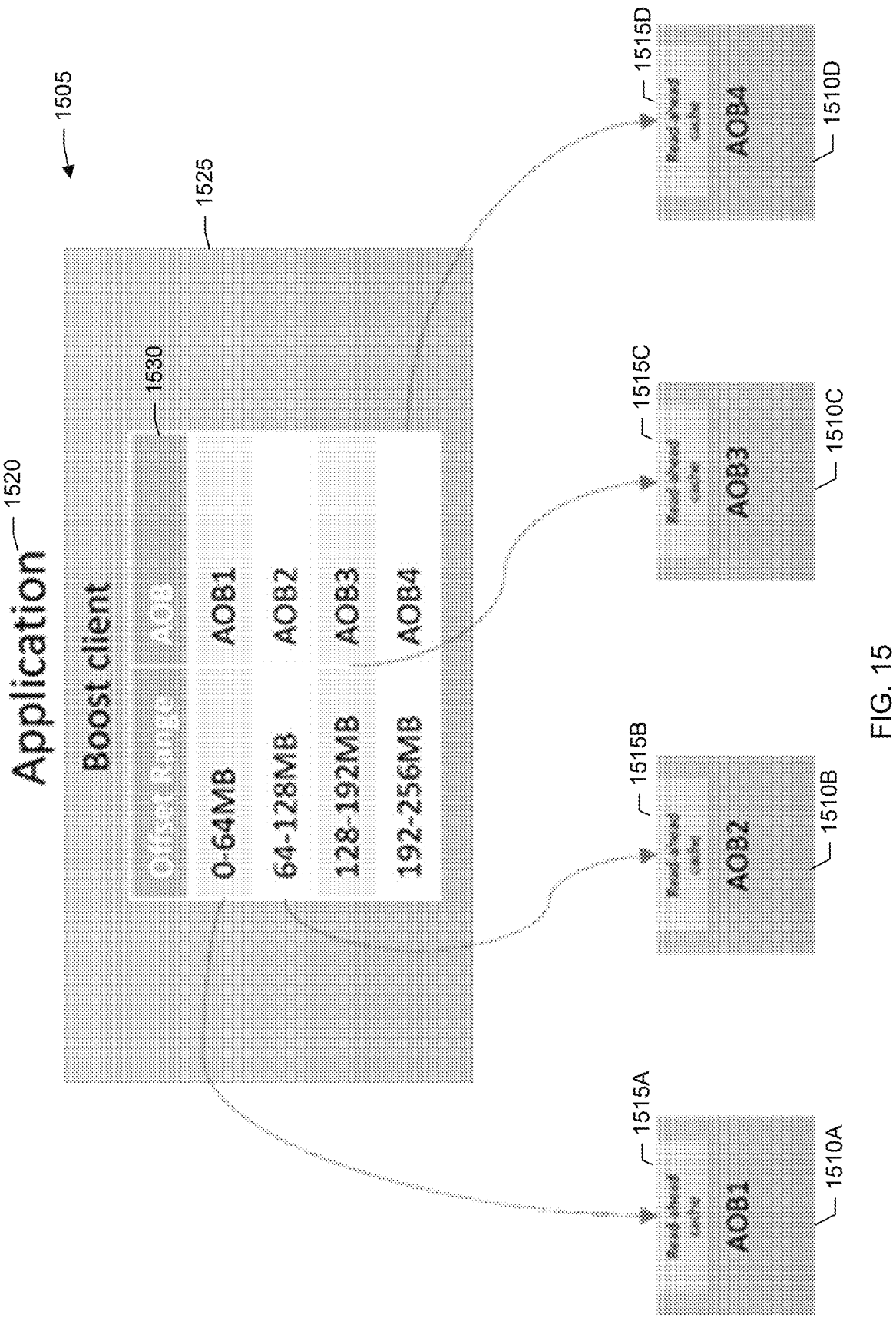
FIG. 15 shows a block diagram for spreading a read-ahead cache across access object services, according to one or more embodiments.

FIG. 15 shows block diagram of a technique that may be referred to as Vanilla CORA. As shown in the example of FIG. 15, there is a client 1505 and a set of access object services 1510A-D. The access object services include read-ahead caches 1515A-D, respectively, which can be collectively referred to as a distributed read-ahead cache. The client includes an application 1520 and a client-side library 1525, e.g., Boost client.

In an embodiment, the distributed read-ahead cache is organized by maintaining mappings at two levels. A first level is at the client-side library, e.g., Boost client. A second level is at the access object services. On the Boost client, an AOB hash table 1530 maps where the chunk of the file is, i.e., which AOB hosts the chunk. In other words, the AOB hash table maps ranges of file offsets to their corresponding AOBs.

Figure 16:
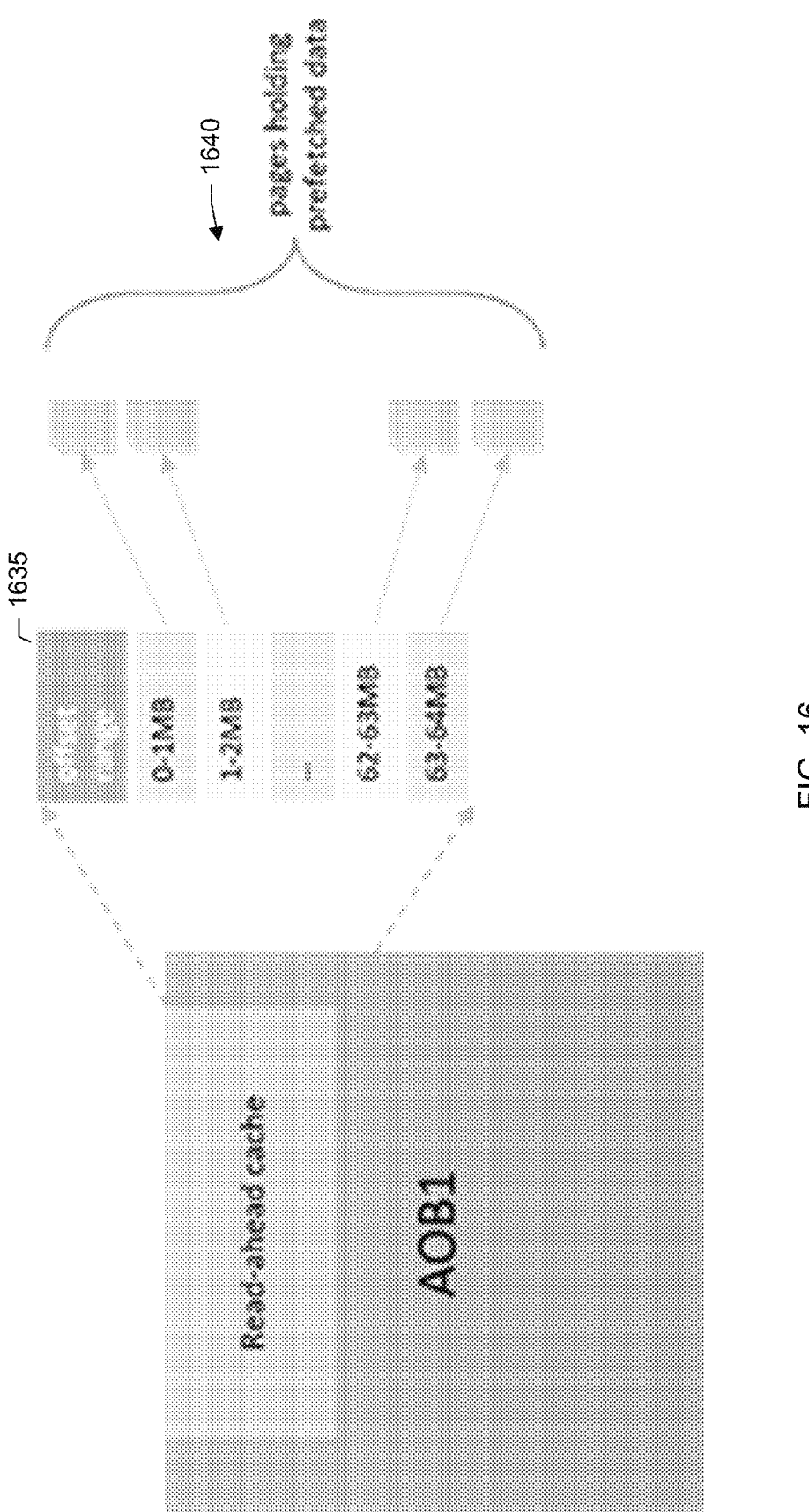
FIG. 16 shows a mapping of offset ranges to memory pages holding read-ahead data, according to one or more embodiments.

FIG. 16 shows a block diagram of a particular access object service from FIG. 15. On an AOB, a read-ahead cache tracks a mapping 1635 of file offsets to the in-memory pages holding the corresponding data.

Referring back now to FIG. 15, in a first step, the Boost client retrieves the list of AOBs from the filesystem redirection and proxy service (FSRP). Then, it spreads read-ahead cache across the AOBs, maintaining a mapping of file offset ranges to corresponding AOBs. The mapping identifies an offset range in a file and an AOB assigned to that offset range.

For example, in an embodiment, the file to be restored is partitioned so that different parts of the file may be processed in parallel to reduce the time needed to complete the restoration. Specifically, the file is divided or partitioned into a set of offset ranges. A size of an offset range may vary depending on factors such as expected sizes of files that may be restored, number of nodes or access object service instances in a cluster, available resources, other factors, or combinations of these.

In an embodiment, a size of an offset range to assign to an AOB is a fixed value, e.g., 64 MB. For example, a first offset range may be from 0-64 MB. A second offset range may be from 64 MB-128 MB. A third offset range may be from 128 MB-192 MB. A fourth offset range may be from 192 MB-256 MB, and so forth. Offset ranges may be assigned to the access object services according to a round robin algorithm. For example, the first offset range may be assigned to the first access object service for processing. The first offset range may be assigned to the first access object service for processing. The second offset range may be assigned to the second access object service for processing. The third offset range may be assigned to the third access object service for processing. The fourth offset range may be assigned to the fourth access object service for processing, and so forth. Once the access object services have been assigned offset ranges, the assignment cycle may be repeated or iterated until each offset range has been assigned to an access object service.

Referring now to FIG. 16, on an AOB, the read-ahead cache maps the offset ranges hosted by that AOB to the corresponding memory pages 1640 holding the data. Offset ranges are mapped to data buffers or pages. FIG. 16 shows an example of an organization or maintenance of the read-ahead cache on an AOB. In this example, the page size is 1 MB and the AOB read-ahead cache size is 64 MB. When the client library (e.g., DDBoost client) receives a read request from the application, the DDBoost client consults table 1530 (FIG. 15), to identify the AOB to which the read request should be sent based on the offset range requested. The DDBoost client sends the read request to the identified AOB.

The AOB, upon receiving the read request, examines its read-ahead cache and based on the offset, fetches the requested data from the corresponding page. The data is returned to the DDBoost client which, in turn, serves the data to the application. Presumably, the read-ahead cache at the AOB will have been first populated by the issuance of read-ahead or prefetch requests that, in an embodiment, are orchestrated by the DDBoost client. Thus, in an embodiment, the client library (e.g., DDBoost client) orchestrates both the prefetches or read-aheads to the AOBs (which, in turn, prefetch the data from the DOBs) and also redirects the application reads to the appropriate AOBs. Any AOB can access a file and any AOB can communicate with any DOB.

Figure 17:
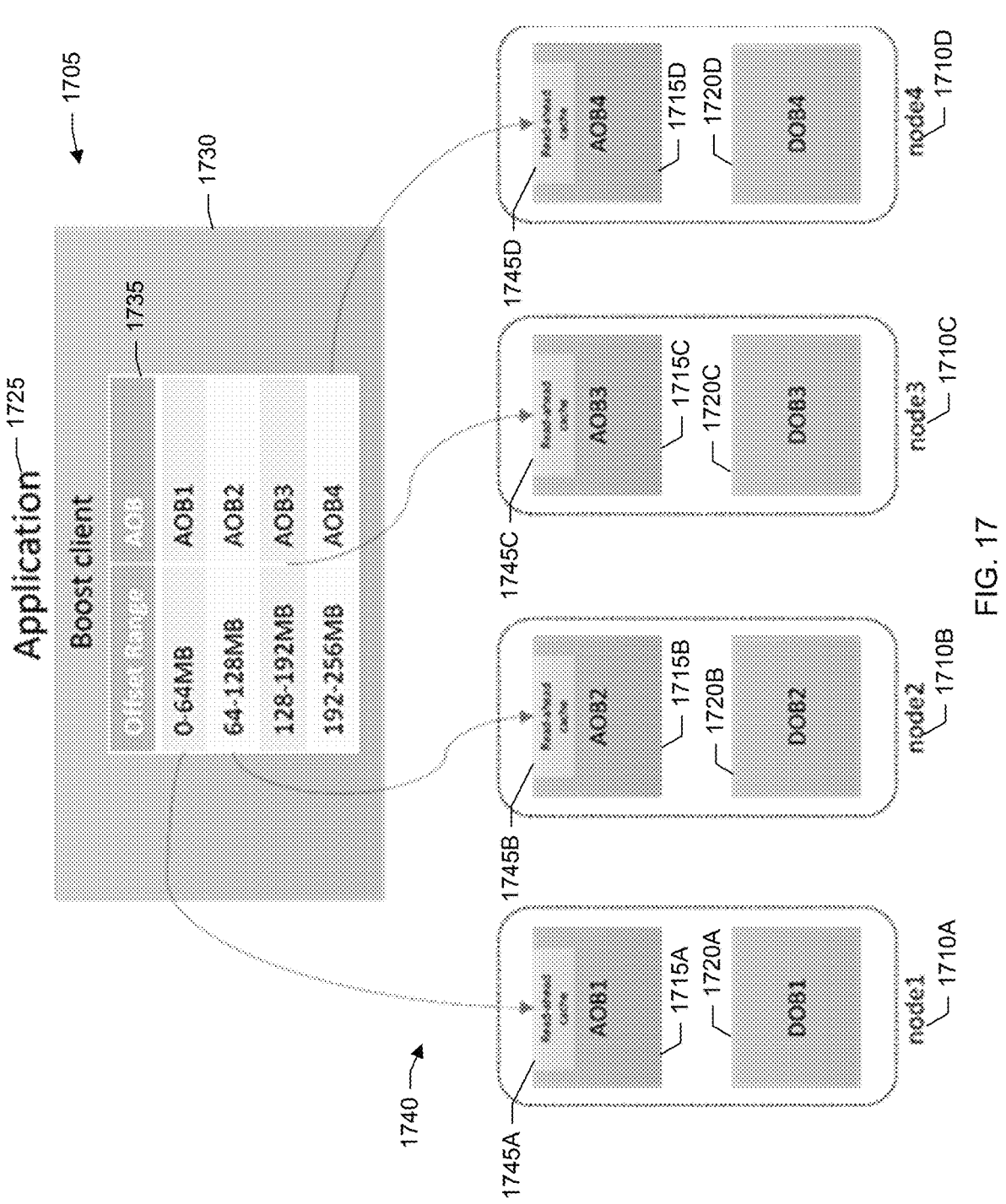
FIG. 17 shows a block diagram of issuing prefetch requests, according to one or more embodiments.

The mappings shown in FIGS. 15 and 16 are maintained at the Boost client level and AOB level. Thus, the application is transparent to or unaware of this mechanism and changes do not have to be made to the application. FIG. 17 shows an overall architecture of the arrangement. As shown in the example of FIG. 17, there is a client 1705 and set of nodes 1710A-D. The nodes host a set of access object services 1715A-D and a set of deduplication object services 1720A-D. The client includes a client application 1725 and a client-side library 1730 (e.g., Boost client).

When a file is opened for restore on the Boost client, the Boost client communicates with FSRP to obtain a list of the currently available AOBs in the cluster. Based on a configurable chunk size, the offset ranges are mapped to the available AOBs and tracked in an AOB hash table 1735. The Boost client issues out prefetches 1740 for those offsets to the corresponding AOBs.

When an AOB (e.g., first AOB 1715A) executes the prefetching requests, a read-ahead cache (e.g., first read-ahead cache 1745A) is populated with the requested data. As the application read requests arrive at the Boost client, the Boost client consults the AOB hash table to redirect the read requests to the corresponding AOB.

As reads progress along the file, prefetching requests for further offsets are issued to the AOBs, thus updating the AOB hash table with the latest mappings.

Figures 18, 19:
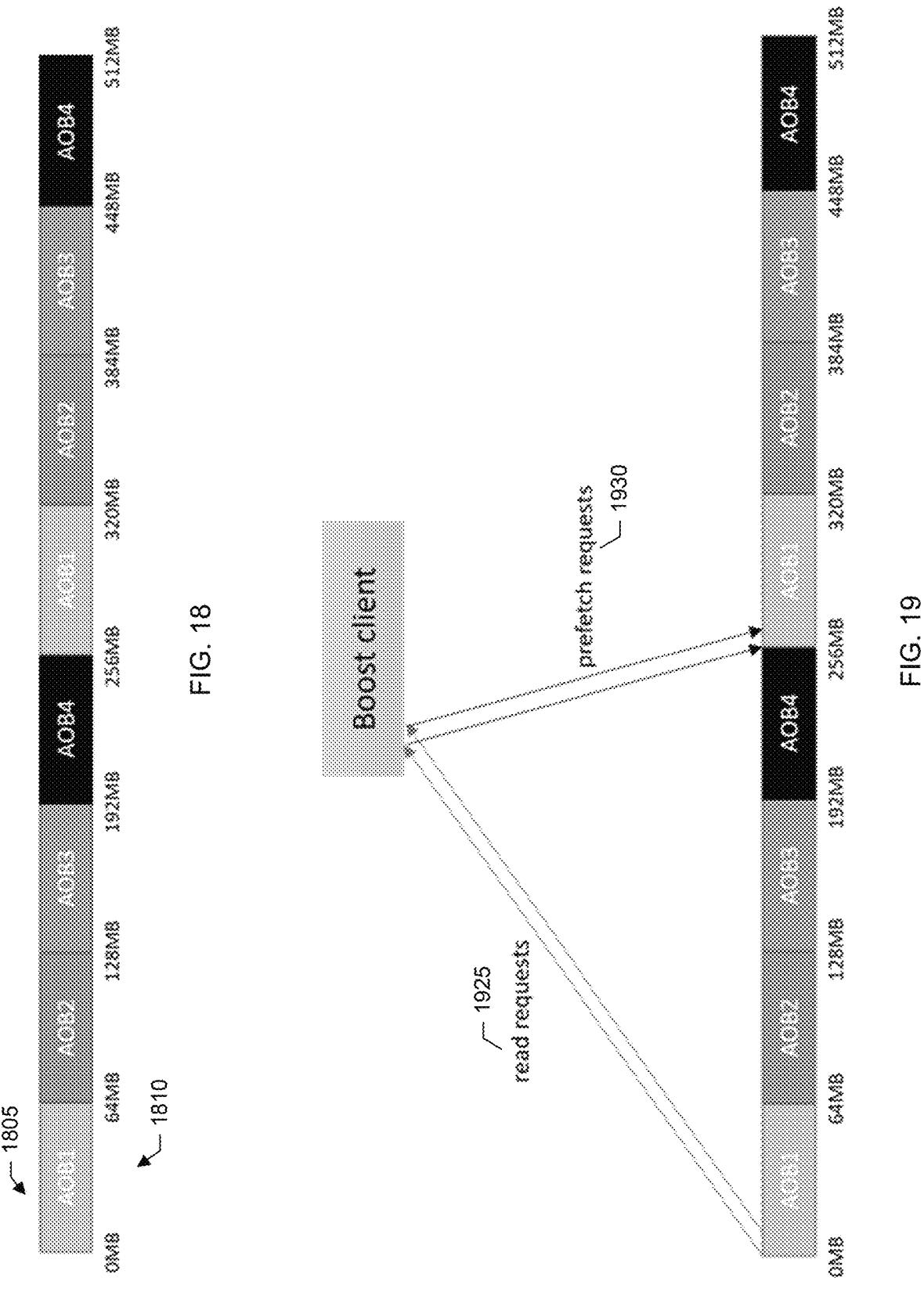
FIG. 18 shows a file having been divided into offset ranges and the offset ranges assigned to access object services, according to one or more embodiments.
FIG. 19 shows an operation of issuing prefetch requests based on the offset range assignments, according to one or more embodiments.

FIG. 18 shows an example of a file 1805 having been divided into offset ranges 1810. The offset ranges are assigned to the access object services for processing. For example, suppose there are four AOBs. Then, the read-ahead cache is distributed across the AOBs such that a first AOB1 handles a first offset range (e.g., 0-64 MB), a second AOB2 handles a second offset range (e.g., 64-128 MB), a third AOB3 handles a third offset range (e.g., 128-192 MB), and a fourth AOB4 handles a fourth offset range (e.g., 192-256 MB). Distribution of read-ahead cache across the AOBs occurs in chunks. Thus, a next chunk that first AOB1 is supposed to handle is a fifth offset range (e.g., 256-320 MB), and so on.

As read requests start arriving at the Boost client starting from offset OMB, these requests are redirected to the first AOB1. As read requests are serviced by the first AOB1, its cache gets freed up. As or when the cache gets freed up on the first AOB1, the Boost client issues further prefetching requests to the first AOB1 for the next 64 MB chunk that will be handled by first AOB1, which is the 64 MB chunk starting from offset 256 MB. This process is depicted in FIG. 19.

In the example of FIG. 19, first AOB1 has a read-ahead cache and is handling, during a first time period, a file offset range of OMB-64 MB. Corresponding chunks have been fetched by a deduplication object service to populate the read-ahead cache. As first AOB1 services read requests 1925 from the Boost client using the read-ahead cache, the read-ahead cache begins to empty which makes space for new file chunks. Thus, during a second time period, after the first time period, first AOB1 which has been assigned another offset range (e.g., offset range 256 MB-320 MB), begins receiving prefetch requests 1930 issued by the Boost client to fetch another set of corresponding chunks. The Boost client can track the decreasing sizes of each read-ahead cache as application read IOs are serviced to determine when to start issuing additional prefetch requests. For example, consider that 10 read requests, each having a size of 1 MB, have been serviced from a read-ahead cache on AOB1. The Boost client tracks the servicing of the read requests and can deduce that 10 MB worth of space is now available in the read-ahead cache on AOB1. Accordingly, the Boost client can then issue another set of 10 prefetch requests to repopulate the read-ahead cache.

This cycle of prefetching chunks to populate the read-ahead cache, servicing read requests from the read-ahead cache, and repopulating the read-ahead cache can be imagined as a window sliding across the file offsets and may continue until the end of the file has been reached (or a decision has been made to disable CORA to reduce system load or otherwise). As shown in the example of FIG. 19, memory of the different nodes hosting the AOBs across the cluster is utilized to help expand the size of the read-ahead cache.

To summarize, as read requests are serviced by an AOB, its cache is freed up. As the cache on an AOB is freed up, the Boost client continues to issue prefetch requests at the next offsets that the AOB will handle. This process may continue until restoration of the entire file is complete.

In an embodiment, a method of restoring a file includes: receiving a list of access object services presently available in a cluster; identifying a plurality of offset ranges in the file, the file having been divided into chunks; iterating over the plurality of offset ranges to assign each offset range to an access object service to handle; populating read-ahead caches maintained at the access object services with chunks corresponding to the offset ranges; servicing read requests for the chunks of the file using the read-ahead caches; and repopulating the read-ahead caches as the read-ahead caches empty with the servicing of the read requests.

FIG. 20 shows a flow for allowing concurrent read-ahead across access object services, according to one or more embodiments. In a step 2010, a client-side library receives a request from a client application restore a file, the file having been divided into chunks and the chunks having been assigned to similarity groups.

In a step 2015, the client-side library obtains a listing of access object services currently present in the filesystem cluster.

In a step 2020, the client-side library creates a first table mapping offset ranges in the file to the access object services that are currently present in the filesystem cluster. A size of the offset range may be a predetermined value, e.g., 64 MB. This size of an offset range may include chunks belonging to different similarity groups. In another embodiment, a size of the offset range is configured to a much smaller value, e.g., 4 MB, such that chunks in the offset range belong to a single similarity group. Further discussion is provided below.

In an embodiment, there is a maximum threshold number of access object services or nodes that may participate in a single restore. The assignment of offset ranges to the access object services may continue in a round robin manner until the maximum threshold number of access object services or nodes has been reached. The assignment process may then be repeated with the remaining offset ranges of the file until each offset range has been assigned to an access object service. Thus, an access object service may be assigned responsibility for multiple offset ranges such as in cases where the number of offset ranges is greater than the number of access object services or nodes allowed to participate in a restoration.

In a step 2025, prefetch requests are issued from the client-side library to the access object services, according to the first table, for chunks of the file corresponding to the offset ranges.

In a step 2030, upon the access object services receiving the prefetch requests, the access object services identify the similarity groups into which chunks corresponding to the offset ranges have been grouped. The access object services then consult a second table mapping and listing the similarity groups and deduplication object services to which the similarity groups have been assigned. As discussed, the deduplication object services are responsible for reading chunks of their assigned similarity groups from a storage layer of the filesystem.

In a step 2035, multiple internal read-ahead streams are opened from the access object services to the deduplication object services according to the mapping assignments. The internal read-ahead streams operate to prefetch the chunks read by the deduplication object services to populate read-ahead caches maintained at the access object services.

In a step 2040, the restoration request of the file is serviced using the read-ahead caches at the access object services.

Figure 21:
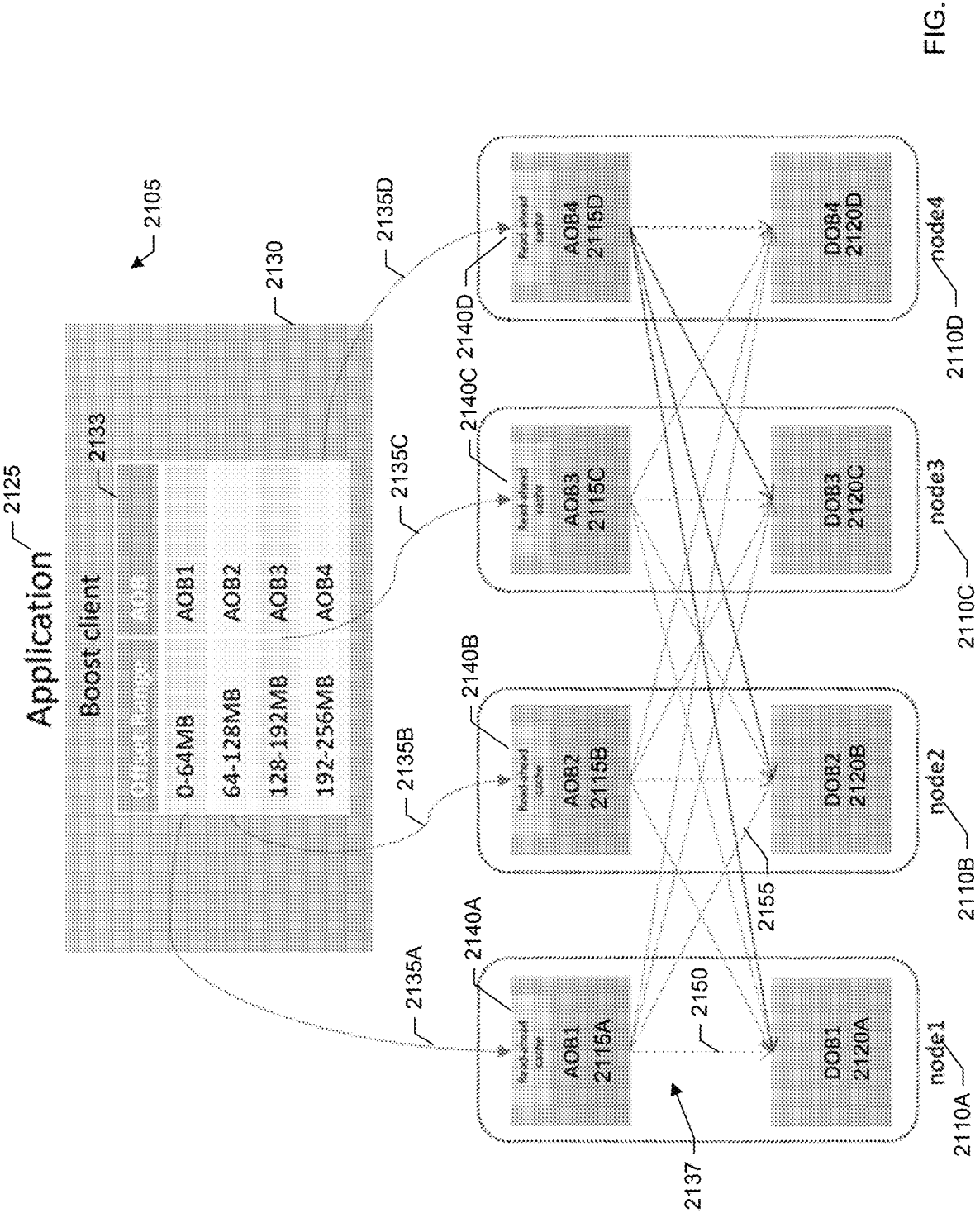
FIG. 21 shows a block diagram for concurrent read-aheads across access object services, according to one or more embodiments.

FIG. 21 shows a block diagram of the operations shown in FIG. 20. The example shown in FIG. 21 includes a client 2105, nodes 2110A-D hosting access object services 2115A-D and deduplication object services 2120A-D. The client includes a client application 2125 and a client-side library 2130 (e.g., Boost client).

Upon the application making a request to open a restore stream for a file, the client-side library obtains a listing of access object services present in the cluster from the filesystem redirection and proxy service (step 2015, FIG. 20). In this example, the available access object services are access object services 2115A-D.

The client-side library identifies offset ranges in the file. In this example, the offset ranges include first offset range 0-64 MB, second offset range 64 MB-128 MB, third offset range 128 MB-192 MB, and fourth offset range 192 MB-256 MB. The client-side library creates a table 2133 mapping the offset ranges to the access object services (step 2020, FIG. 20). The client-side library issues prefetch requests 2135A-D to the access object services, according to the table, for chunks of the file corresponding to the offset range (step 2024, FIG. 20).

Thus, according to the table, first prefetch request 2135A for first offset range 0-64 MB is issued to the first access object service. Second prefetch request 2135B for second offset range 64 MB-128 MB is issued to the second access object service. Third prefetch request 2135C for third offset range 128 MB-192 MB is issued to the third access object service. Fourth prefetch request 2135C for fourth offset range 192 MB-256 MB is issued to the fourth access object service.

As the access object services receive and continue to receive the prefetch requests specifying different offset ranges in the file throughout the restoration operation, the access object services identify and communicate with the appropriate deduplication object services to fetch the requested file chunks. In particular, the access object services consult mapping information that maps the offset ranges to the similarity groups and the similarity groups to the deduplication object services (step 2030, FIG. 20).

Based on the mapping information, the access object services open multiple internal read-ahead streams 2137 to the deduplication object services. The internal read-ahead streams prefetch chunks read by the deduplication object services to populate read-ahead caches 2140A-D maintained at the access object services (step 2035, FIG. 20).

For example, a first access object service hosted by a first node may receive a first prefetch request specifying retrieval of chunks corresponding to a first offset range. The first access object service may determine that the first offset range is mapped to a first similarity group and that the first similarity group is owned by a first deduplication object service hosted on the first node. Based on the determination, the first access object service opens a first internal read-ahead stream 2150 to the first deduplication object service. Read-ahead stream 2150 is shown in FIG. 21 using a broken line to indicate that the read-ahead stream is a local stream as both AOB1 and DOB1 are hosted on a same node.

Following the first prefetch request, the first access object service may receive a second prefetch request specifying retrieval of chunks corresponding to a second offset range. The first access object service may determine that the second offset range is mapped to a second similarity group and that the second similarity group is owned by a second deduplication object service hosted on a second node. Based on the determination, the first access object service opens a second internal read-ahead stream 2155 to the second deduplication object service. Read-ahead stream 2155 is shown in FIG. 21 using a solid line to indicate that the read-ahead stream is an inter-nodal stream as first access object service and second deduplication object service are hosted on different nodes.

Referring back now to FIG. 14, in step 1450, the cluster is monitored for state changes to determine whether adjustments to the mappings need to be made. State change events may include an instance of an access object service failing, crashing, or leaving the cluster, or an instance of an access object service joining the cluster. In an embodiment, periodically, the client-side library (e.g., Boost client) communicates with FSRP to track AOB membership changes if any. If the membership has not changed, prefetching and reads continue to operate as usual. However, if either an AOB joins the cluster or leaves the cluster, CORA takes appropriate actions.

For example, consider that an access object service joins the cluster. CORA detects that a new AOB has joined the cluster. In an embodiment, there is a maximum limit on the number of nodes that are involved in a single restore. For example, in a 1000-node cluster, it may not be beneficial to involve all the 1000 nodes for a single restore operation.

If the number of AOBs currently involved in the restore is beyond a certain maximum limit, no action is taken. On the other hand, if there is scope or capacity for involving the new AOB in the current restore, CORA expands the AOB hash table to involve the new AOB by mapping a new range of file offsets to it and issuing prefetches. Effectively, the chunking logic in CORA now maps chunks to n+1 AOBs instead of n AOBs.

As an example, consider that a file has been divided into first, second, third, fourth, and fifth offset ranges and there are two AOBs in the cluster at an initial time. In this example, first offset range may be assigned to AOB1, second offset range may be assigned to AOB2, third offset range may be assigned to AOB1, fourth offset range may be assigned to AOB2, and fifth offset range may be assigned to AOB1. After the initial time, a third AOB3 joins the cluster. The offset assignments may be updated to include third AOB3 such that one or more offset ranges previously assigned to an AOB before the joining of third AOB3 are reassigned to the new AOB. For example, the fifth offset range previously assigned to second AOB2 may be reassigned to third AOB3.

In an embodiment, a method may include: creating a table mapping offset ranges in a file to be restored to access object services, the file being divided into chunks and the chunks being assigned to similarity groups; issuing prefetch requests to the access object services according to the table for chunks of the file corresponding to the offset ranges; detecting that a new access object service has joined; updating the table to include an entry comprising the new access object service and an offset range, that has yet to be processed, assigned to the new access object service; and issuing a prefetch request to the new access object service according to the updated table.

As another example, consider that an access object service leaves the cluster. CORA detects that an AOB has left the cluster. The AOB could have been shut off gracefully or it could have crashed. In either case, the read-ahead cache hosted on the dead AOB is no longer available for CORA.

The number of AOBs participating in CORA is reduced by 1, and new prefetches and reads are distributed across the remaining AOBs accordingly. In particular, there is a need to handle the current range of offsets that disappeared along with the dead AOB. There are two options. A first option is to do nothing. In this option, the portion of the read-ahead cache that was lost with the AOB is gone, and the reads are serviced off the storage only for that portion. This is a temporary hiccup affecting only the offset range that disappeared. In the context of the full restore, this cost may be acceptable.

In an embodiment, a method may include: detecting that a particular access object service has left, the particular access object service having been assigned responsibility for populating a particular read-ahead cache at the particular access object service with chunks of a file corresponding to a particular offset range; not changing offset range assignments of other access object services regarding populating read-ahead caches at the other access object services; servicing a portion of restoration of the file using the read-ahead caches at the other access object services; and servicing another portion of the restoration of the file using a storage layer underlying the access object services and not the particular read-ahead cache because the particular access object service having the particular read-ahead cache is no longer available, the other portion of the restoration thereby being the chunks of the file corresponding to the particular offset range.

A second option includes redistributing the lost cache to a different AOB chosen from the set of remaining AOBs. The AOB hash table is updated to reflect this change. Application reads falling in the affected offset range are redirected to the new AOB. Depending on how much of the lost read-ahead cache is populated by the new AOB so far, some reads may be serviced off the cache while others may be serviced off the lower layers and storage media. This is a temporary hiccup affecting only the offset range that disappeared.

In an embodiment, a method may include detecting that a particular access object service has left, the particular access object service having been assigned responsibility for populating a particular read-ahead cache at the particular access object service with chunks of a file corresponding to a particular offset range; and reassigning the particular offset range to a different access object service that still remains in the cluster.

Systems and techniques are provided for the initialization and teardown of CORA streams. In an embodiment, there is a fixed number of CORA streams supported on the cluster. In this embodiment, CORA can be enabled for a restore stream only if the number of CORA-enabled streams has not exceeded the threshold. This threshold is determined based on the amount of cache available on the AOBs and the number of CORA-enabled streams that can be safely supported without overwhelming the cluster. The number of CORA streams is proportional to sizes of the read-ahead caches on the access object services.

In an embodiment, CORA is triggered or kicks in dynamically based on a set of heuristics. Firstly, the file size needs to be sufficiently large to warrant CORA. Secondly, the access pattern of the file being restored is tracked, and CORA kicks in only if the access pattern is sequential. Finally, the system load is also checked to ensure that enabling CORA for a stream will not overwhelm the cluster.

If the system conditions change while CORA is operational, CORA may disable itself and close one or more internal MSR streams, while the external stream is maintained. One such condition is system load. If the system load increases beyond a tolerable limit, CORA starts closing the internal MSR streams. This ensures that the system is not overly loaded due to CORA.

Another condition is the change in access pattern. The access pattern may change from sequential to a non-sequential pattern. This triggers CORA to turn itself off for that stream.

In an embodiment, a method may include: servicing a restore stream for a file using multiple internal read-ahead streams extending between a plurality of access object services and a plurality of deduplication object services, the multiple internal read-ahead streams operating to prefetch chunks of the file from a storage layer by the deduplication object services to populate read-ahead caches maintained at the access object services; during the servicing, detecting that one or more of a plurality of conditions has been satisfied, the plurality of conditions comprising a first condition comprising a current system load has exceeded a threshold system load, and a second condition comprising an access pattern of the file has changed from sequential to non-sequential; upon the detecting, tearing down the multiple internal read-ahead streams and replacing the multiple internal read-ahead streams with a single internal read stream to the storage layer, wherein read IOs for the file are issued to the single internal read stream as the read IOs are requested by a client application.

Referring back now to FIG. 21, the technique creates a distributed scalable read-ahead cache for restores. However, an AOB may need to read data from multiple DOBs located on different nodes of the cluster thereby resulting in east-west traffic between the AOBs and the DOBs. The east-west traffic may not be a bottleneck when the number of concurrent restores is relatively small but may emerge as a bottleneck as the number of concurrent restore streams increases.

More particularly, in an embodiment, there can be a network switch connecting the node cluster and through which the nodes can be reached such as by the client. This network switch may be referred to as a north-south network switch. There can be another network switch interconnecting the nodes to each other. This network switch may be referred to as an east-west network switch.

For example, the arrows extending from the AOBs, such as arrow 2155 from the first access object service to the second deduplication object service, depict the east-west traffic. Note that traffic between an AOB and DOB pair on the same node is not east-west traffic as it is not going out on the network. Thus, arrow 2150 from the first access object service to the first deduplication object service is not considered east-west traffic because both the first access object service and the first deduplication object service are hosted on the same node, e.g., first node 2110A.

More particularly, consider, as an example, that an offset range of 0 to 64 MB has been assigned to the first AOB to prefetch. Further consider that similarity groups, which as discussed may be used to spread data across the DOBs, are formed using 4 MB sized chunks. Since the size of the offset range is greater than a size of a chunk assigned to the similarity group, it is quite possible that different similarity groups may be associated with that offset range and one or more of the different similarity groups may be assigned to different DOBs. As a result, an AOB may establish internal read-ahead streams with any number of different DOBs in order to prefetch chunks corresponding to a particular offset range that the AOB has been assigned.

For example, within the offset range of 0 to 64 MB assigned to an AOB, there can be first and second chunks. The first chunk may belong to a first similarity group. The first similarity group may be assigned to a first DOB. The first DOB may be hosted on a first node. The second chunk may belong to a second similarity group. The second similarity group may be assigned to a second DOB. The second DOB may be hosted on a second node, different from the first node. An internal read-ahead stream, along with its accompanying prefetch read IOs, extending from an AOB on a node to a DOB on another node may be referred to as east-west traffic. A significant amount of east-west traffic can lead to latency, higher loads on the switches, and a degradation in overall performance of the filesystem.

To alleviate the east-west traffic and prevent it from becoming a bottleneck in restore performance, systems and techniques provide a method that may be referred to as Bandwidth-Optimized CORA. As opposed to CORA that distributes contiguous file ranges across AOBs, Bandwidth-Optimized CORA uses a similarity group (simgrp)-aware mechanism for distributing smaller file ranges across the AOBs. This allows for an AOB hosted on a node to be reading data from a DOB that is also hosted on the same node. This can be referred to as a local read. Local reads can reduce the amount of east-west traffic or internode communication.

In this embodiment, before triggering the CORA workflow, the client-side library (e.g., Boost client) fetches a similarity group (simgrp) ownership mapping. The ownership mapping may be fetched from an AOB as each AOB may include a copy of the ownership mapping. The table can be used by an AOB to identify a responsible DOB of a similarity group.

Figures 22, 23, 24:
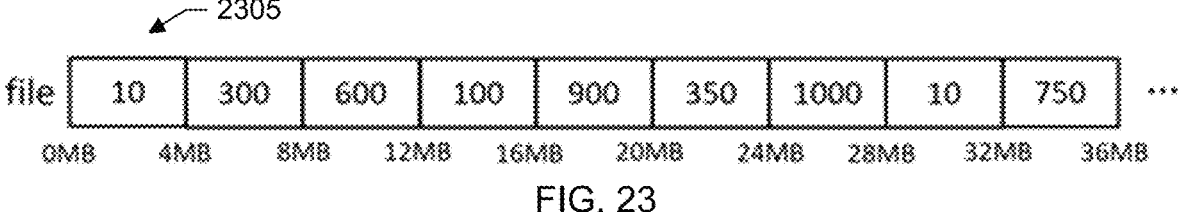
FIG. 22 shows a table mapping similarity groups to deduplication object services, according to one or more embodiments.
FIG. 23 shows a file divided into offset ranges, according to one or more embodiments.
FIG. 24 shows a table mapping offset ranges corresponding to chunks of a file to similarity groups, according to one or more embodiments.

FIG. 22 shows an example of a similarity group ownership mapping 2210. The mapping includes a table depicting a sample distribution of simgrps across the DOBs. This mapping instructs the client-side library (e.g., Boost client) on how the simgrp ownership is distributed across DOBs. For example, DOB1 may host, own, or have responsibility for simgrps 0-255, while DOB2 hosts, owns, or has responsibility for simgrps 256-512, and so on. In an embodiment, once a simgrp is identified, the table can be consulted to identify or cross-reference a DOB responsible for the simgrp.

Then, the client-side library (e.g., Boost client) retrieves a file offset to similarity group (simgrp) mapping from one of the AOBs. This mapping specifies how the file offsets map to simgrps. For example, offset range 0-4 MB may belong to simgrp 10, while offset range 4-8 MB may belong to simgrp 300. FIG. 23 shows a sample mapping in a file-offset form 2305. FIG. 24 shows the mapping in a tabular form 2405.

The range of file offsets is then divided such that an AOB is assigned a file offset range corresponding to the simgrps owned by that AOB/DOB pair sitting on the same node. When an AOB populates its read-ahead cache for those simgrps, the data is read from the local DOB and data does not travel over the east-west wire. For example, if DOB1 owns simgrps [0, 256), then if AOB1 is assigned prefetching corresponding to the file chunks having these simgrps, then AOB1 fetches data locally from DOB1.

Figures 25, 26:
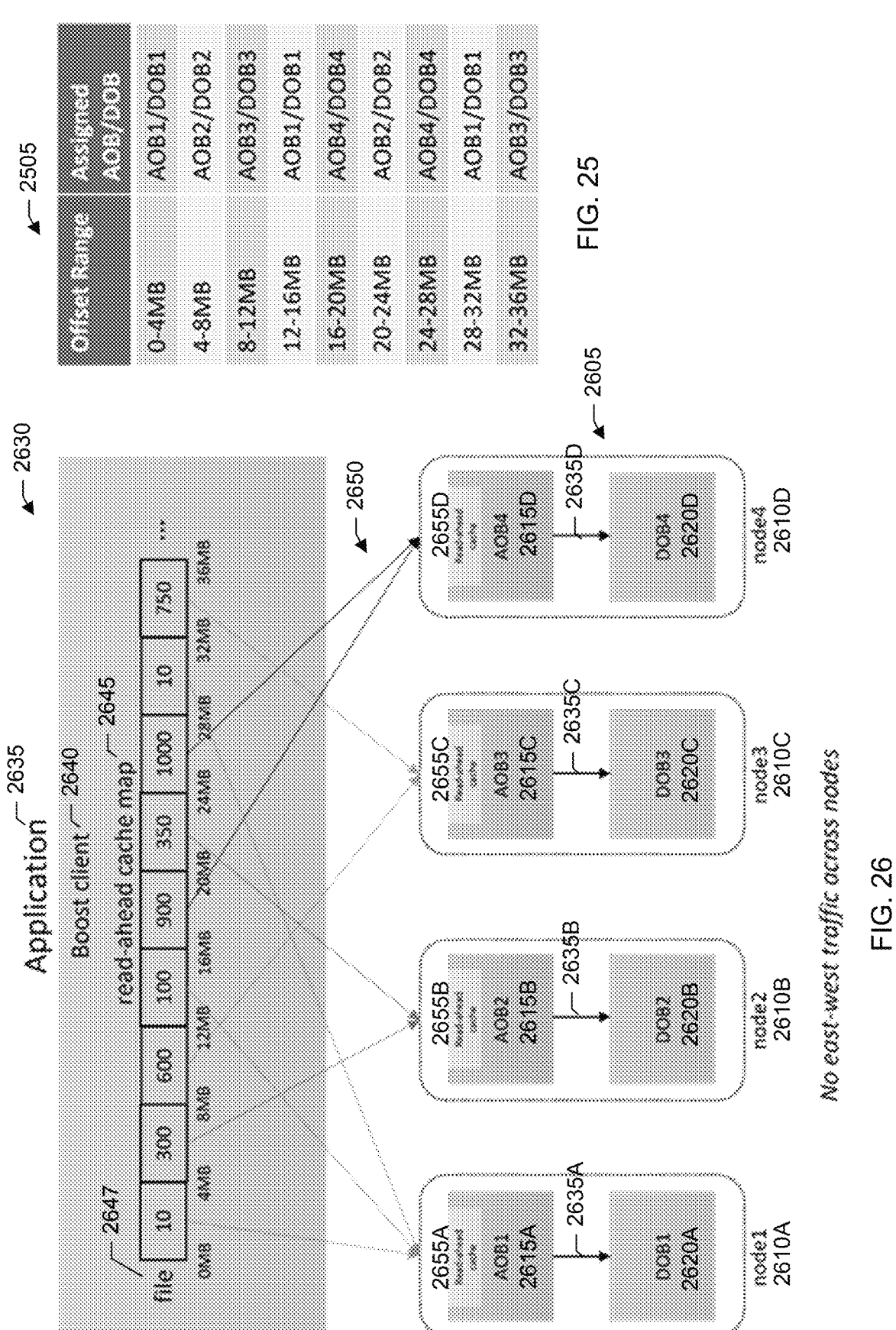
FIG. 25 shows a table mapping offset ranges based on similarity group ownership, according to one or more embodiments.
FIG. 26 shows a block diagram of using offset ranges based on similarity group ownership to restore a file, according to one or more embodiments.

FIG. 25 shows a distribution table 2505 of file offset ranges to the corresponding AOBs based on simgrp ownership information. FIG. 26 shows a block diagram of using the distribution shown in FIG. 25 to issue prefetch requests to the AOBs for chunks corresponding to the offset ranges. The AOBs, in turn, identify the similarity groups into which chunks corresponding to the offset ranges have been grouped. The AOBs identify the DOBs having responsibility for those similarity groups and open internal read-ahead streams to the identified DOBs. Since the initial distribution of file offset ranges, as shown in FIG. 25, takes into account similarity group ownership information, the internal read-ahead streams from the AOBs to the DOBs are local to each AOB and DOB pair as each AOB and DOB pair are hosted by the same node.

For example, referring now to FIG. 25, a table 2505 generated by the client-side library takes into account the similarity group ownership mapping (see, e.g., FIG. 22) and file offset to similarity group mapping (see, e.g., FIG. 24) to distribute file offset ranges such that an offset range assigned to a particular AOB has chunks corresponding to a similarity group that is assigned to a particular DOB that also happens to be hosted on the same node as the particular AOB. The file offset ranges have been sized such that chunks corresponding to a file offset range map to a single similarity group. Compare, for example, the sizes of the file offset ranges assigned to the access object services in table 2133 of FIG. 21 with the smaller or more granular sizes of the file offset ranges assigned to the access object services in table 2505 of FIG. 25.

More particularly, as shown in the example of FIG. 26, a node cluster 2605 includes nodes 2610A-D. First node 2610A hosts a first pair of access object and deduplication object services including first access object service 2615A and first deduplication object service 2620A. Second node 2610B hosts a second pair of access object and deduplication object services including second access object service 2615B and second deduplication object service 2620B. Third node 2610C hosts a third pair of access object and deduplication object services including third access object service 2615C and third deduplication object service 2620C. Fourth node 2610D hosts a fourth pair of access object and deduplication object services including fourth access object service 2615D and fourth deduplication object service 2620D.

A client 2630 includes an application 2635, seeking to restore a file, and a client-side library (e.g., Boost client)

2640 installed on the client. In an embodiment, the client-side library generates and maintains at the client a read-ahead cache map 2645 of a file 2647 to track various prefetch requests 2650 issued to the access object services for chunks of the file offset ranges. In this embodiment, the read-ahead cache map resides at the client. In another embodiment, the read-ahead cache map resides at an access object service (see discussion below).

Referring now to FIG. 25, file offset ranges are distributed to pairs of access object and deduplication object services where an access object service and a deduplication object service of a pair are hosted by the same node. For example, an offset range 0-4 MB is assigned to first AOB1 because the offset range maps to a similarity group that is owned by a DOB, e.g., first DOB1, hosted by the same node hosting first AOB1.

An offset range 4-8 MB is assigned to second AOB2 because the offset range maps to a similarity group that is owned by a DOB, e.g., second DOB2, hosted by the same node hosting second AOB2.

An offset range 8-12 MB is assigned to third AOB3 because the offset range maps to a similarity group that is owned by a DOB, e.g., third DOB3, hosted by the same node hosting third AOB3.

An offset range 12-16 MB is assigned to first AOB1 because the offset range maps to a similarity group that is owned by a DOB, e.g., first DOB1, hosted by the same node hosting first AOB1. And so forth. This technique of distributing file offset ranges reduces the amount of east-west traffic as communications between an AOB and a DOB concerning prefetching chunks associated with the offset ranges and populating a read-ahead cache are local communications due to the AOB and DOB being hosted on the same node.

Referring now to FIG. 26, the read-ahead cache map is shown with a file-offset form of the file offset to similarity group mapping. Offset ranges of the file are mapped to access object and deduplication object services based on similarity group ownership.

Specifically, offset range 0-4 MB includes chunks grouped into similarity group 10. Similarity group 10 happens to be assigned to first DOB1. Thus, the client-side library issues a prefetch request for offset range 0-4 MB to first AOB1 because first AOB1 resides on the same node as first DOB1. As a result, an internal read-ahead stream 2653A opened by first AOB1 to populate a read-ahead cache 2655A with chunks corresponding to the offset range will be to a DOB that resides on the same node as first AOB1, e.g., first DOB1.

Offset range 4-8 MB includes chunks grouped into similarity group 300. Similarity group 300 happens to be assigned to second DOB2. Thus, the client-side library issues a prefetch request for offset range 4-8 MB to second AOB2 because second AOB2 resides on the same node as second DOB2. As a result, an internal read-ahead stream 2653B opened by second AOB2 to populate a read-ahead cache 2655B with chunks corresponding to the offset range will be to a DOB that resides on the same node as second AOB2, e.g., second DOB2.

Offset range 8-12 MB includes chunks grouped into similarity group 600. Similarity group 600 happens to be assigned to third DOB3. Thus, the client-side library issues a prefetch request for offset range 8-12 MB to third AOB3 because third AOB3 resides on the same node as third DOB3. As a result, an internal read-ahead stream 2653C opened by third AOB3 to populate a read-ahead cache

2655C with chunks corresponding to the offset range will be to a DOB that resides on the same node as third AOB3, e.g., third DOB3.

Offset range 12-16 MB includes chunks grouped into similarity group 100. Similarity group 100 happens to be assigned to first DOB1. Thus, the client-side library issues a prefetch request for offset range 12-16 MB to first AOB1 because first AOB1 resides on the same node as first DOB1, and so forth. As a result, an internal read-ahead stream 2653A opened by first AOB1 to populate read-ahead cache 2655A with chunks corresponding to the offset range will be to a DOB that resides on the same node as first AOB1, e.g., first DOB1.

In an embodiment, a method includes: provisioning nodes of a cluster with pairs of services of a deduplication filesystem, the pairs of services comprising access object (AOB) services and deduplication object (DOB) services; establishing a restore stream between an application and a client-side library to restore a file from the filesystem, the file being divided into chunks, the chunks being grouped into similarity groups; retrieving a first mapping cross-referencing subsets of similarity groups to the deduplication object services of the filesystem; retrieving a second mapping cross-referencing offset ranges in the file to the similarity groups; and iterating over the offset ranges in the file to prefetch chunks corresponding to the offset ranges, the iterating comprising: based on the second mapping, identifying a similarity group of an offset range; based on the first mapping, identifying a DOB having responsibility for the similarity group; identifying a node hosting the DOB; and issuing, to an AOB that is also hosted on the same node as the DOB, a prefetch request for chunks of the file corresponding to the offset range, the prefetched chunks to be stored in a read-ahead cache at the AOB, wherein the AOB upon receiving the prefetch request communicates with the DOB to prefetch the chunks of the file corresponding to the offset range, the communications thereby being local because the AOB and DOB are on the same node.

This mechanism scales up extremely well as the number of concurrent restores in the cluster increases since there is practically no east-west traffic related to reads between the nodes that could potentially become a bottleneck.

FIG. 27 shows a flow for reducing east-west traffic across nodes, according to one or more embodiments. In a step 2710, access object and deduplication object services of a deduplication filesystem are distributed across a cluster of nodes, each node having a pair of services including an access object service and a deduplication object service.

In a step 2715, a client-side library receives a request to restore a file, the file being divided into chunks, the chunks being grouped into similarity groups, and the deduplication object services owning subsets of the similarity groups.

In a step 2720, the client-side library fetches a mapping of similarity groups to the deduplication object services owning the similarity groups.

In a step 2725, the client-side library fetches a mapping of offset ranges in the file to the similarity groups.

In a step 2730, the client-side library assigns the offset ranges in the file to the access object services such that each offset range assigned to an access object service hosted on a node corresponds to chunks of a similarity group owned by a deduplication object service that is also hosted on the node.

In a step 2735, the client-side library issues prefetch requests to the access object services according to the assigned offset ranges.

In a step 2740, multiple internal read-ahead streams are opened in response to the prefetch requests from the access object to deduplication object services. The internal read-ahead streams prefetch chunks read by the deduplication object service to populate read-ahead caches maintained at the access object services, each prefetch from a particular access object service to a particular deduplication object service thereby being a local operation because of the offset range assignments.

In a step 2745, the request is serviced using the read-ahead caches at the access object services.

FIG. 28 shows a block diagram of an architecture that may be referred to as Protocol-Agnostic CORA. Some embodiments, as discussed, include a client-side library (e.g., Boost client) installed at the client that integrates with the client application to orchestrate the reads and read-aheads across the AOBs. The client-side library uses proprietary protocols to communicate with, send data to, and receive data from the deduplication filesystem. It is desirable, however, provide the benefits of CORA and its flavors if the application is restoring via NFS or CIFS mounts. FIG. 28 shows an architecture that allows enabling the CORA benefit for non-integrated applications. This architecture includes an AOB leader-follower based method that may be referred to as Protocol-Agnostic CORA.

The architecture shown in FIG. 28 is similar to the architecture shown in FIG. 26. For example, a node cluster 2805 includes nodes 2810A-D. First node hosts a first pair of access object and deduplication object services including first access object service and first deduplication object service. Second node hosts a second pair of access object and deduplication object services including second access object service and second deduplication object service. Third node hosts a third pair of access object and deduplication object services including third access object service and third deduplication object service. Fourth node hosts a fourth pair of access object and deduplication object services including fourth access object service and fourth deduplication object service. Read-ahead caches are established across the access object services. A client includes an application 2835 seeking to restore a file.

The example of FIG. 28, however, does not include a client-side library installed at the client through which the application can use to request a restore. Rather, in this embodiment, the application initiates a restoration directly with the filesystem. When a restore of a file is initiated, one of the AOBs is assigned to it. The assignment of the file to the AOB may be based on a file handle or other property of the file mapping the file to the responsible AOB. This AOB acts as a leader 2837, and treats the other AOBs as followers, orchestrating the reads and read-aheads across the AOBs. The leader AOB behaves like a client-side library (e.g., Boost client) spreading a read-ahead cache across itself and the other AOBs. The read-ahead cache resides on the AOB designated as the leader.

The leader AOB reading from follower AOBs involves RPCs 2845A-C between the leader and followers. Each AOB itself prefetches data by reading across the DOBs. In comparison to vanilla CORA, this approach results in a greater number RPCs. However, the bandwidth optimization or reduction technique, in which internal read-ahead streams between an AOB and DOB remain local because both services are on the same node, can be used to reduce the number of RPCs. For example, the leader AOB generates an offset range distribution table 2805 for the file such that each offset range assigned to an AOB corresponds to chunks belonging to a similarity group assigned to a DOB that is hosted on a same node as the AOB.

Consider, as an example, that first AOB1 is acting as a leader for a particular restore initiated by the application. AOB1 retrieves all the required mappings and spreads out the distributed cache across the AOBs including itself. This distribution uses the same or similar mechanism as used by Bandwidth-optimized CORA, such that each AOB reads data from its local DOB. AOB1 receives all the application read requests, and services these read requests by reading off from the read-ahead cache hosted by the AOBs.

FIG. 29 shows a flow for Protocol-Agnostic CORA, according to one or more embodiments. In a step 2910, an access object service from among a set of other access object services is designated a leader of a request to restore a file, the file being divided into chunks, the chunks being assigned to similarity groups, and the similarity groups being assigned to deduplication object services. In an embodiment, the leader may be designated by FSRP upon receipt of the restoration request for the file. The designation may be based on a hash of a file handle or other property associated with the file. For example, in an embodiment, files are distributed across the access object services based on their file handles, other properties, or combinations of these. A mapping may be maintained, by FSRP, of files and their corresponding access object services. Thus, while any access object service may access a file, each file is also associated with or anchored to a particular access object service.

The leader provides a mount or endpoint IP address to the filesystem for the client application. This allows a connection to be made between the client application and filesystem via a public protocol, such as NFS or CIFS. Specifically, public protocols such as NFS or CIFS do not allow for distributing traffic over multiple mounts or destination IP addresses. Relocating orchestration of the prefetch distribution mechanism or logic, as shown in FIG. 27 and described in the accompanying discussions, from the client-side library to an access object service allows the benefits of the prefetch distribution mechanism to be realized even when public protocols are used.

In other words, the client application can connect to a single endpoint, e.g., leader access object service, thereby satisfying requirements of the public protocols. The leader access object service, in turn, handles distribution and management of the prefetch requests including, for example, generating the cache map of offset ranges, issuing prefetch requests and instructions to the appropriate access object services, tracking the populating of the read-ahead caches, and servicing application read IOs using the read-ahead caches at itself or fetching from the other read-ahead caches at the other non-leader access object services.

In a step 2915, the leader fetches a mapping of similarity groups to the deduplication object services.

In a step 2920, the leader fetches a mapping of offset ranges in the file to the similarity groups.

In a step 2025, the leader assigns the offset ranges in the file to the access object services, including itself (the leader access object service), such that each offset range assigned to an access object service hosted on a node corresponds to chunks of a similarity group assigned to a deduplication object service that is also hosted on the node.

In a step 2930, the leader issues prefetch requests to the access object services according to the assigned offset ranges.

In a step 2935, in response to the prefetch requests, multiple internal read-ahead streams are opened from the access object services to the deduplication object services. The internal read-ahead streams prefetch the chunks read by the deduplication object services to populate read-ahead caches maintained at the access object services, each internal read-ahead stream from a particular access object service to a particular deduplication object service is a local operation or local stream because of the offset range assignments.

In a step 2940, the restoration request is serviced using the read-ahead caches. For example, in an embodiment, when the leader receives an application read IO, the leader determines whether data responsive to the read IO is found in a read-ahead cache maintained at the leader or in a read-ahead cache maintained at a follower. If the data is found in the read-ahead cache maintained at the leader, the leader retrieves the data from its own cache and returns the data to the requesting application. If the data is at the follower, the leader communicates with the follower (e.g., via RPC) to obtain the data from the follower and then return the data to the application.

In an embodiment, a method includes: provisioning access object (AOB) and deduplication object (DOB) services of a deduplication filesystem across a cluster of nodes; identifying an AOB service as a leader for a request to restore a file, the file being divided into chunks, the chunks being grouped into similarity groups, and the DOB services owning subsets of similarity groups; assigning, by the leader, offset ranges of the file to the AOB services, including the leader, such that each offset range assigned to an AOB service hosted on a node corresponds to chunks of a similarity group owned by a DOB service that is also hosted on the node; issuing prefetch requests to the AOB services according to the assigned offset ranges; opening multiple internal read-ahead streams from the AOB services to the DOB services, wherein the internal read-ahead streams prefetch the chunks read by the DOB services to populate read-ahead caches maintained at the AOB services, each prefetch from a particular AOB service to a particular DOB service thereby being a local operation because of the offset range assignments; receiving, at the leader AOB, a read IO from an application seeking to restore the file; determining, by the leader AOB, whether the read IO can be serviced using a read-ahead cache residing at the leader AOB or a different read-ahead cache maintained at a different AOB; if the read IO is to be serviced using the read-ahead cache residing at leader AOB, retrieving data responsive to the read IO from the read-ahead cache residing at the leader AOB and returning, by the leader AOB, the data to the application; and if the read IO is to be serviced using the read-ahead cache residing at the different AOB, communicating with the different AOB to retrieve the data from the read-ahead cache residing at the different AOB and returning, by the leader AOB, the data to the application.

The techniques described above include a common limitation. In a limited stream restore (say a single stream restore), only a portion of the read-ahead pool may be used. This is because the read-ahead horizon for the stream is fixed. This horizon is then "striped" over the different AOBs depending on the locality of the file chunk.

The technique described below disassociates the read-ahead horizon from the stream, therefore allowing for the usage of the entire read-ahead memory.

Figure 30:
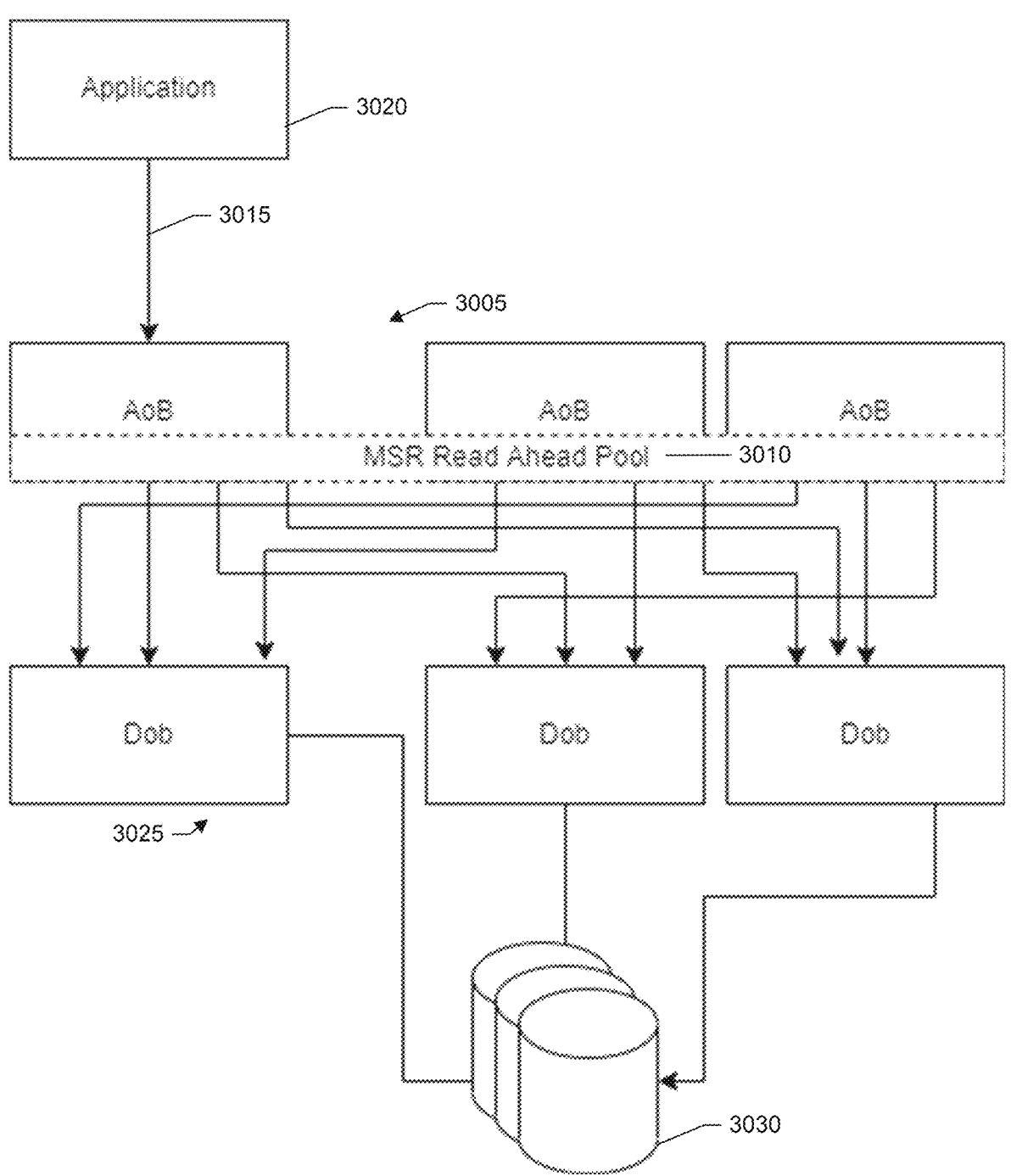
FIG. 30 shows a block diagram of a read-ahead pool, according to one or more embodiments.

As an example, consider the read-ahead pool to be an aggregation of the read-ahead pool from all the AOBs. With this virtual entity, a map can be created which allows for the request to be hosted at some index in the read-ahead pool. FIG. 30 shows a block diagram of read-ahead caches at access object services 3005 of a filesystem cluster grouped to form a read-ahead pool 3010. A restore stream 3015 has been opened from an application 3020 to the cluster. The cluster includes deduplication object services 3025 and storage 3030. Internal read-ahead streams are opened between the access object and deduplication object services to prefetch chunks of a file to restore from storage and populate the read-ahead pool.

Figure 31:
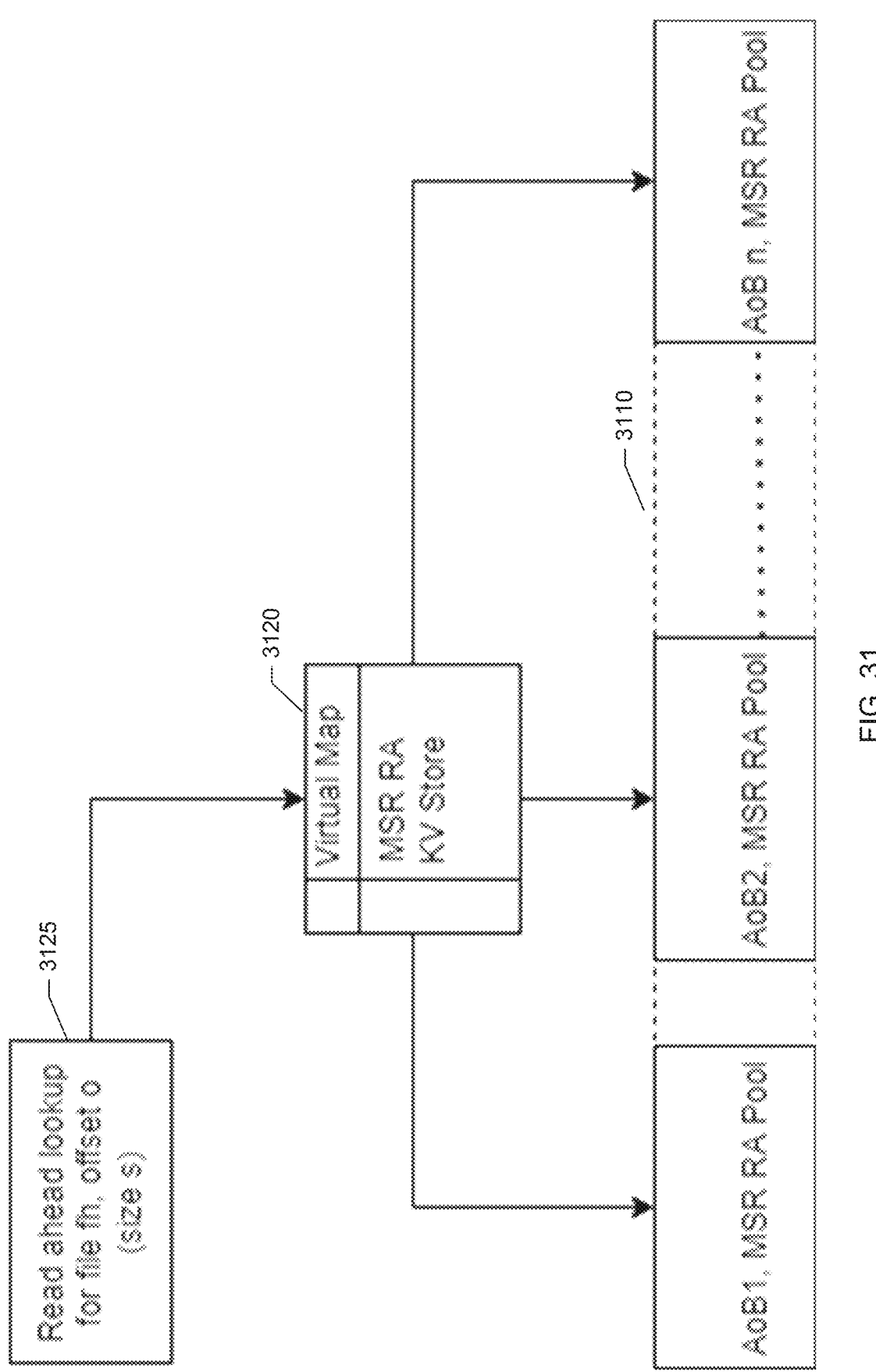
FIG. 31 shows a block diagram illustrating operation of a virtual map, according to one or more embodiments.

FIG. 31 shows further detail of establishing the read-ahead pool shown in FIG. 30. In this embodiment, the read-ahead response buffer is stored at some place in a read-ahead pool 3110. The storage location is maintained in an in-memory key value store 3115. The key value store is used to support a virtual map 3120 that facilitates access to the read-ahead pool A read request 3125 to the filesystem includes a file handle, offset and size of the buffer to read. When such a request comes in, a lookup to the key value store points to the location of the buffer to the appropriate AOB.

The key benefit of this approach is that unlike a read-ahead technique where the read-ahead horizon is defined by the system—with this technique the read-ahead horizon is defined by the read-ahead pool and the number of active streams in the system. For example, if the system has just one read stream, the entire read-ahead pool can be utilized by the stream.

The efficacy of any cache is dependent on its eviction protocol. An eviction protocol is especially important for a global cache. In an embodiment, the global read-ahead cache supports two types of eviction policies. In this embodiment, the first eviction policy is "evict-on-read" wherein the data pages are evicted when read. However, it may happen that some prefetched data pages may not be read at all. To address this scenario, the cache may also supports a time-based, such as a least recently used (LRU)-based eviction policy.

The virtual map shown in FIG. 31 may be retrieved by the application to directly communicate with the AOBs hosting the data. This avoids communication between the AOBs for retrieval of data.

Figure 32:
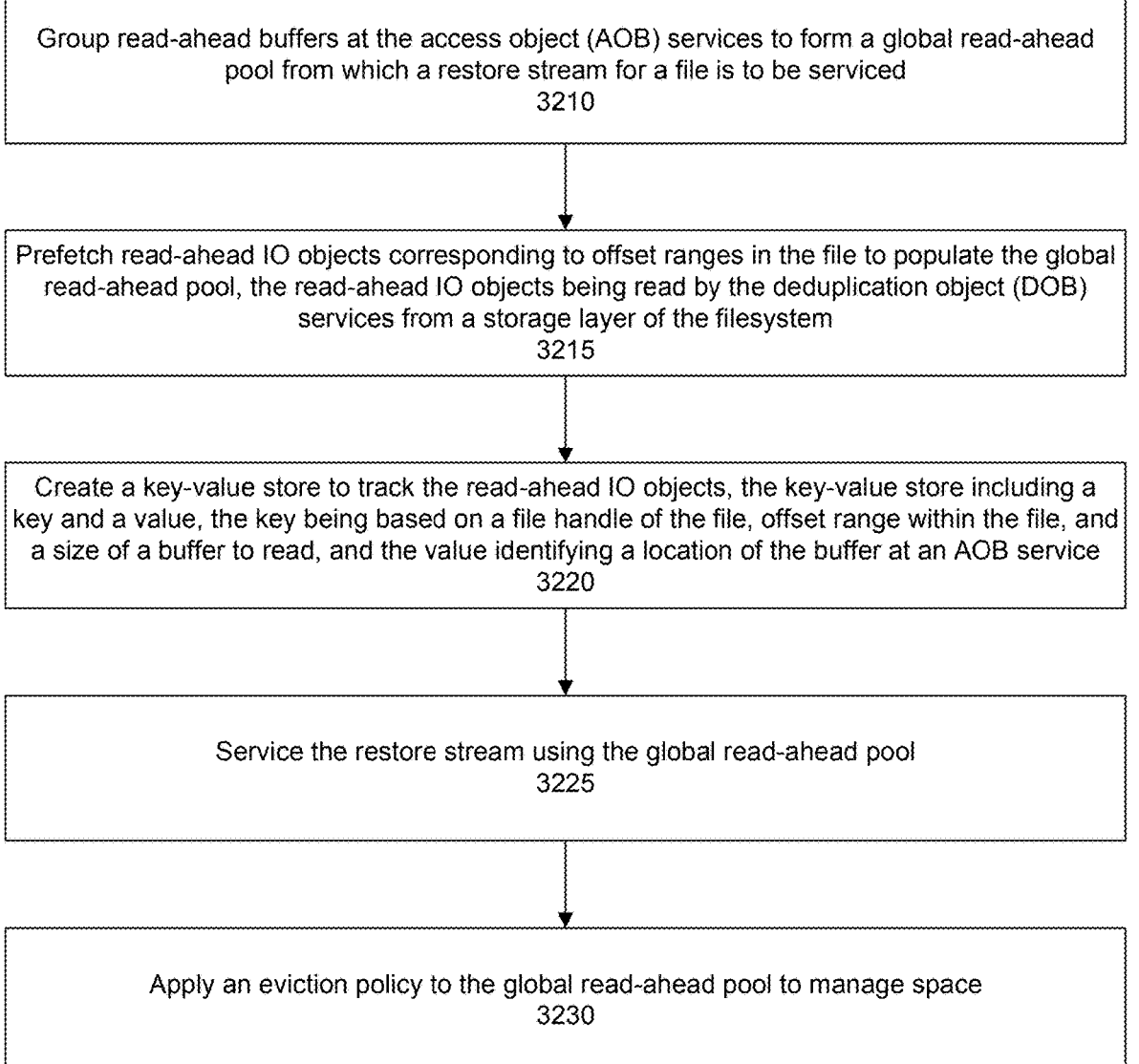
FIG. 32 shows a flow for a global read-ahead pool, according to one or more embodiments.

FIG. 32 shows a flow for Global CORA, according to one or more embodiments. In a step 3210, read-ahead buffers at a set of access object services are grouped to form a global read-ahead pool from which a restore stream for a file is to be serviced.

In a step 3215, read-ahead IO objects corresponding to offset ranges in the file are prefetched to populate the global read-ahead pool. Deduplication object services are responsible for reading the read-ahead IO objects from a storage layer of the filesystem.

In a step 3220, a key-value store is created to track the read-ahead IO objects. The key-value store includes a key and a value. The key is based on a file handle of the file, offset range within the file, and a size of a buffer to read. The value identifies a location of the buffer at an access object service.

In a step 3225, the restore stream is serviced using the global read-ahead pool.

In a step 3230, an eviction policy to applied to the global read-ahead pool to manage space.

The Global CORA technique allows for reducing or eliminating restrictions on sizing the amount of memory associated with a particular restoration. Rather than forming the read-ahead cache as a per file entity, a read-ahead pool is instead created that spans the cluster. The read-ahead pool may be referred to as a virtual read-ahead cache or distributed memory pool. A page can be requested from the memory pool and whatever chunk of data that is read can be placed somewhere in the memory pool and tracked. Thus, even with a single stream, the entire memory of the read-ahead pool can be leveraged to more quickly complete the restoration of a file.

More particularly, in an embodiment, a read-ahead cache for each file is fixed. For example, a size of the read-ahead cache may be set at 256 MB. Thus, in a 4 node cluster, each node is limited to 64 MB of read-ahead cache that may be dedicated to a particular file, e.g., 256 MB divided by 4 nodes equals 64 MB per node.

The read-ahead pool, however, allows for dramatically increasing the size of the read-ahead cache. In particular, the read-ahead cache can function as another level of redirection to access a read-ahead IO object using the virtual map provided by the key value store.

Eviction policies may be applied to the cache to allow segments or pages that have been read (or old segments or pages that have not been read) to be evicted so that new pages may be inserted.

Embodiments may use raw data buffers as they are returned from the DOBs and the storage layers. For example, FIG. 33 shows a block diagram of responding to an NFS read request 3305 that may be issued by a client application to the deduplication filesystem. In this example, the read request has a size or buffer size of 1 MB and the read-ahead cache includes pages 3310 having a page size of 32 KB. Thus, a read request of 1 MB can require 32 pages to service each request, e.g., 1 MB/32 KB=32 pages.

In another embodiment, however, the buffers are compressed in the read-ahead data structures and are maintained in the read-ahead cache in a compressed format. Given that compression techniques like LZ can compress up to 2×, the effective size of the read-ahead memory can increase by 2×. Thus, the same 32 KB page can store up to 64 KB of data. In turn, to serve a 1 MB read request, 16 pages can be required rather than 32 pages, e.g., 1 MB/64 KB=16 pages. This can result in a read-ahead of about twice the amount as compared to not using compression and increases a length of the read highway.

FIG. 34 shows a block diagram of responding to an NFS read request 3405 in which buffers or pages 3410 in the read-ahead cache have been compressed. Using compression, a 32 KB page can be compressed into about a 16 KB page. In order to respond to read request using a public protocol such as NFS, the buffers are decompressed 3415 to fill the read request. This is because an NFS (or CIFS) client is not able to recognize that compressed pages being served. For example, if there is a read request for a 1 MB buffer, and each read-ahead page is 32 KB, 32 of these pages are used to respond to the read request. Assuming 2× logical compression, using this technique, each of the 32 pages would use 16 KB each. Thus, in an embodiment, buffers storing read-ahead IOs are compressed, stored in the read-ahead cache, and maintained in the read-ahead cache in a compressed format until an application issues read IOs for the data. The buffers are decompressed at the access object service before transmitting to the application in response to the read IOs.

FIG. 35 shows a block diagram of responding to a read-request from a client-side library (e.g., DDBoost). In this example, a DDBoost read request 3505 has a size or buffer size of 256 KB. For advanced protocols like DDBoost, the read response can be a set of compressed read buffers 3510, which can be decompressed at the client. Compressed buffers can be packed 3515 into the response to the read request. Since the protocol can be designed to handle and recognize compressed pages, the client-side library can decompress the buffers before returning to the client application that is linked with the client-side library. Being able to send the read buffers in a compressed format can help reduce network traffic as well as providing an effective increase in the size of the read-ahead memory. Thus, in an embodiment, buffers storing read-ahead IOs are compressed, stored in the read-ahead cache, and maintained in the read-ahead cache in a compressed format. When the client-side library issues read IOs for the data, the buffers responsive to the read IOs are transmitted from the access object service to the client-side library in their compressed format.

In an embodiment, a read request size for a sequential restore is 256 KB for a proprietary protocol (e.g., DDBoost protocol) and 1 MB for a public protocol such as NFS. It should be appreciated, however, that these buffer sizes can be changed. Further, LZ compression is merely an example of a compression algorithm that may be used. In other embodiments, other compression algorithms may instead or additionally be used. For example, a compression algorithm such as GZFAST can provide compression up to 2.7×. Furthermore, there can be hardware enabled compression where the CPU cost for the compression/decompression is very little, e.g., near zero.

FIG. 36 shows a flow for compressed CORA, according to one or more embodiments. In a step 3610, a request is received to open a restore stream for a file, the file being divided into chunks, and the chunks being grouped into similarity groups. In a step 3615, mapping information is accessed. The mapping information includes offset ranges in the file mapped to access object services and similarity groups mapped to deduplication object services.

In a step 3620, multiple internal read-ahead streams are opened from the access object services to the deduplication object services, according to the mapping information. The internal read-ahead streams prefetch the chunks read from a storage layer of the filesystem, by the deduplication object services, to populate read-ahead caches at the access object services.

In a step 3625, buffers into which the chunks have been read are compressed and the compressed buffers are stored in the read-ahead caches at the access object services.

In a step 3630, a read IO associated with the restore stream is received. In a step 3635, a determination is made as to whether the read IO is made according to a public protocol (e.g., NFS protocol or CIFS protocol) or a proprietary protocol (e.g., DDBoost).

In a step 3640, when the read IO is made according to the public protocol (e.g., NFS or CIFS), pages of the read-ahead cache are decompressed before sending the pages to the client in response to the read IO. That is, the pages are transmitted in an uncompressed format.

In a step 3645, when the read IO is made according to the proprietary protocol (e.g., DDBoost), the pages are sent to the client-side library in a compressed format in response to the read IO. The pages may then be decompressed at the client by the client-side library before the client-side library ultimately returns content of the pages to the requesting client application.

Various embodiments include methods to improve sequential restore performance in a scale out deduplication filesystem; a multi-stream read for a scale-out filesystem; dynamically scale a distributed read-ahead cache across nodes to improve restore performance; dynamically manage a distributed read-ahead cache across nodes to improve restore performance by eliminating the inter-node data traffic; dynamically manage a distributed read-ahead cache across nodes to improve restore performance by eliminating the inter-node data traffic, in a manner that is completely transparent to the application; and using compressed buffers in a read-ahead cache.

The various techniques to handle file restorations that have been discussed can be used in combination with other techniques. For example, techniques of compressing buffers can be used in combination with a multi-stream restore (MSR), Vanilla CORA, Bandwidth-Optimized CORA, Protocol-Agnostic CORA, or Global CORA.

In an embodiment, a method includes: receiving, at an access object (AOB) service, a restore stream from a client for a file managed by a deduplication filesystem, the file being represented by a segment tree comprising segments in an upper level referencing chunks of the file, the upper level segments being grouped into similarity groups, and the similarity groups being assigned to deduplication object (DOB) services; iterating over the upper level segments to open multiple internal read-ahead streams from the AOB service to the DOB services to populate a read-ahead cache maintained at the AOB service, the iterating comprising: loading an upper level segment of the file; identifying a similarity group into which the upper level segment has been grouped; identifying a DOB service having responsibility for the similarity group; and issuing a prefetch request from the AOB service to the DOB service for the DOB service to retrieve chunks of the file referenced by the upper level segment and populate the read-ahead cache with the retrieved chunks; and servicing the restore stream using the read-ahead cache.

In an embodiment, first and second iterations occur in parallel with each other.

In an embodiment, the first iteration comprises: loading a first upper level segment of the file; determining that the first upper level segment belongs to a first similarity group; determining that the first similarity group has been assigned to a first DOB service; and issuing a first prefetch request from the AOB service to the first DOB service for the first DOB service to retrieve first chunks of the file referenced by the first upper level segment and populate the read-ahead cache with the first chunks; and the second iteration comprises: loading a second upper level segment of the file; determining that the second upper level segment belongs to a second similarity group; determining that the second similarity group has been assigned to a second DOB service; and issuing a second prefetch request from the AOB service to the second DOB service for the second DOB service to retrieve second chunks of the file referenced by the second upper level segment and populate the read-ahead cache with the second chunks, wherein the AOB service and the first DOB service are hosted on a first node, and the second DOB service is hosted on a second node, different from the first node.

In another embodiment, the first iteration comprises: loading a first upper level segment of the file; determining that the first upper level segment belongs to a first similarity group; determining that the first similarity group has been assigned to a first DOB service; and issuing a first prefetch request from the AOB service to the first DOB service for the first DOB service to retrieve first chunks of the file referenced by the first upper level segment and populate the read-ahead cache with the first chunks; and the second iteration comprises: loading a second upper level segment of the file; determining that the second upper level segment belongs to a second similarity group; determining that the second similarity group has been assigned to the first DOB service; and issuing a second prefetch request from the AOB service to the first DOB service for the first DOB service to retrieve second chunks of the file referenced by the second upper level segment and populate the read-ahead cache with the second chunks, wherein the AOB service and the first DOB service are hosted on a first node.

In an embodiment, the read-ahead cache for the file is a single read-ahead cache maintained on a single AOB service. The method may further include: while restoration of the file is in progress, closing one or more multiple internal read-ahead streams based on detecting that system load has exceeded a threshold level; and after the closing the one or more multiple internal read-ahead streams, servicing the restore stream using a reduced number of internal read-ahead streams.

In another embodiment, there is a system comprising: a processor; and memory configured to store one or more sequences of instructions which, when executed by the processor, cause the processor to carry out the steps of: receiving, at an access object (AOB) service, a restore stream from a client for a file managed by a deduplication filesystem, the file being represented by a segment tree comprising segments in an upper level referencing chunks of the file, the upper level segments being grouped into similarity groups, and the similarity groups being assigned to deduplication object (DOB) services; iterating over the upper level segments to open multiple internal read-ahead streams from the AOB service to the DOB services to populate a read-ahead cache maintained at the AOB service, the iterating comprising: loading an upper level segment of the file; identifying a similarity group into which the upper level segment has been grouped; identifying a DOB service having responsibility for the similarity group; and issuing a prefetch request from the AOB service to the DOB service for the DOB service to retrieve chunks of the file referenced by the upper level segment and populate the read-ahead cache with the retrieved chunks; and servicing the restore stream using the read-ahead cache.

In another embodiment, there is a computer program product, comprising a non-transitory computer-readable medium having a computer-readable program code embodied therein, the computer-readable program code adapted to be executed by one or more processors to implement a method comprising: receiving, at an access object (AOB) service, a restore stream from a client for a file managed by a deduplication filesystem, the file being represented by a segment tree comprising segments in an upper level referencing chunks of the file, the upper level segments being grouped into similarity groups, and the similarity groups being assigned to deduplication object (DOB) services; iterating over the upper level segments to open multiple internal read-ahead streams from the AOB service to the DOB services to populate a read-ahead cache maintained at the AOB service, the iterating comprising: loading an upper level segment of the file; identifying a similarity group into which the upper level segment has been grouped; identifying a DOB service having responsibility for the similarity group; and issuing a prefetch request from the AOB service to the DOB service for the DOB service to retrieve chunks of the file referenced by the upper level segment and populate the read-ahead cache with the retrieved chunks; and servicing the restore stream using the read-ahead cache.

In an embodiment, a method includes: provisioning access object (AOB) and deduplication object (DOB) services of a deduplication filesystem across a cluster of nodes; receiving, at a client-side library, a request to restore a file, the file being divided into chunks, the chunks being grouped into similarity groups, and the similarity groups being assigned to the DOB services; creating a first table mapping offset ranges in the file to the AOB services; issuing prefetch requests to the AOB services, according to the first table, for chunks of the file corresponding to the offset ranges; upon the AOB services receiving the prefetch requests, identifying the similarity groups into which chunks in the offset ranges have been grouped; consulting a second table mapping the similarity groups to the DOB services, each DOB service being responsible for reading a chunk of an assigned similarity group from a storage layer of the filesystem; opening multiple internal read-ahead streams from the AOB services to the DOB services based on the similarity group assignments to the DOB services, wherein the internal read-ahead streams prefetch the chunks read by the DOB services to populate read-ahead caches maintained at the AOB services; and servicing the request using the read-ahead caches.

The method may include: identifying, at a first AOB service hosted on a first node, a first chunk in a first offset range as belonging to a first similarity group assigned to a first DOB service, the first DOB service being hosted on the first node; opening a first internal read-ahead stream from the first AOB service to the first DOB service; identifying, at the first AOB service, a second chunk in the first offset range as belonging to a second similarity group assigned to a second DOB service, the second DOB service being hosted on a second node; and opening a second internal read-ahead stream from the first AOB service to the second DOB service.

The method may include: hosting at each node a pair of services comprising an AOB service and a DOB service; and distributing the offset ranges in the file across the AOB services such that each offset range distributed to a particular AOB service hosted on a particular node corresponds to chunks of a similarity group assigned to a particular DOB service that is also hosted on the same particular node.

The method may include: compressing buffers into which the chunks have been read by the DOB services; and storing the compressed buffers into the read-ahead caches.

The method may include: while servicing the request, detecting that a new AOB service has joined the cluster; determining that a number of nodes hosting the AOB services and participating in the restoration of the file has reached a threshold limit; and continuing to service the request without involving the new AOB service.

The method may include: while servicing the request, detecting that a new AOB service has joined the cluster; determining that a number of nodes hosting the AOB services and participating in the restoration of the file has not reached a threshold limit; updating the first table by reassigning one or more offset ranges in the file to the new AOB service; and issuing the prefetch requests to the AOB services, including the new AOB service, according to the updated first table.

In another embodiment, there is a system comprising: a processor; and memory configured to store one or more sequences of instructions which, when executed by the processor, cause the processor to carry out the steps of: provisioning access object (AOB) and deduplication object (DOB) services of a deduplication filesystem across a cluster of nodes; receiving, at a client-side library, a request to restore a file, the file being divided into chunks, the chunks being grouped into similarity groups, and the similarity groups being assigned to the DOB services; creating a first table mapping offset ranges in the file to the AOB services; issuing prefetch requests to the AOB services, according to the first table, for chunks of the file corresponding to the offset ranges; upon the AOB services receiving the prefetch requests, identifying the similarity groups into which chunks in the offset ranges have been grouped; consulting a second table mapping the similarity groups to the DOB services, each DOB service being responsible for reading a chunk of an assigned similarity group from a storage layer of the filesystem; opening multiple internal read-ahead streams from the AOB services to the DOB services based on the similarity group assignments to the DOB services, wherein the internal read-ahead streams prefetch the chunks read by the DOB services to populate read-ahead caches maintained at the AOB services; and servicing the request using the read-ahead caches.

In another embodiment, there is a computer program product, comprising a non-transitory computer-readable medium having a computer-readable program code embodied therein, the computer-readable program code adapted to be executed by one or more processors to implement a method comprising: provisioning access object (AOB) and deduplication object (DOB) services of a deduplication filesystem across a cluster of nodes; receiving, at a client-side library, a request to restore a file, the file being divided into chunks, the chunks being grouped into similarity groups, and the similarity groups being assigned to the DOB services; creating a first table mapping offset ranges in the file to the AOB services; issuing prefetch requests to the AOB services, according to the first table, for chunks of the file corresponding to the offset ranges; upon the AOB services receiving the prefetch requests, identifying the similarity groups into which chunks in the offset ranges have been grouped; consulting a second table mapping the similarity groups to the DOB services, each DOB service being responsible for reading a chunk of an assigned similarity group from a storage layer of the filesystem; opening multiple internal read-ahead streams from the AOB services to the DOB services based on the similarity group assignments to the DOB services, wherein the internal read-ahead streams prefetch the chunks read by the DOB services to populate read-ahead caches maintained at the AOB services; and servicing the request using the read-ahead caches.

In another embodiment, there is a method comprising: receiving a restore stream from a client for a file managed by a deduplication filesystem, the file being divided into chunks, the chunks being assigned to similarity groups, and the filesystem comprising a plurality of access object (AOB) services and a plurality of deduplication object (DOB) services; consulting, at an AOB service, a table comprising a mapping of the similarity groups to the DOB services, each DOB service being responsible for reading a chunk of an assigned similarity group from a storage layer of the filesystem; opening multiple internal read-ahead streams from the AOB service to the DOB services, according to the mapping, wherein the internal read-ahead streams prefetch chunks read by the DOB services to populate a read-ahead cache maintained at the AOB service; and servicing the restore stream using the read-ahead cache.

In another embodiment, there is a method comprising: provisioning access object (AOB) and deduplication object (DOB) services of a deduplication filesystem across a cluster of nodes; receiving, at a client-side library, a request to restore a file, the file being divided into chunks and the chunks being assigned to similarity groups; creating a first table mapping offset ranges in the file to the AOB services; issuing prefetch requests to the AOB services, according to the first table, for chunks of the file corresponding to the offset ranges; upon the AOB services receiving the prefetch requests, consulting a second table mapping the similarity groups to the DOB services, each DOB service being responsible for reading a chunk of an assigned similarity group from a storage layer of the filesystem; opening multiple internal read-ahead streams from the AOB services to the DOB services according to the second table, wherein the internal read-ahead streams prefetch the chunks read by the DOB services to populate read-ahead caches maintained at the AOB services; and servicing the request using the read-ahead caches.

In another embodiment, there is a method comprising: provisioning access object (AOB) and deduplication object (DOB) services of a deduplication filesystem across a cluster of nodes; receiving, at a client-side library, a request to restore a file, the file being divided into chunks, the chunks being grouped into similarity groups, and the DOB services owning subsets of the similarity groups; assigning, by the client-side library, offset ranges of the file to the AOB services such that each offset range assigned to an AOB service hosted on a node corresponds to chunks of a similarity group owned by a DOB service that is also hosted on the node; issuing prefetch requests to the AOB services according to the assigned offset ranges; opening multiple internal read-ahead streams from the AOB services to the DOB services, wherein the internal read-ahead streams prefetch the chunks read by the DOB services to populate read-ahead caches maintained at the AOB services, each prefetch from a particular AOB service to a particular DOB service thereby being a local operation because of the offset range assignments; and servicing the request using the read-ahead caches.

In another embodiment, there is a method comprising: provisioning access object (AOB) and deduplication object (DOB) services of a deduplication filesystem across a cluster of nodes; identifying an AOB service as a leader for a request to restore a file, the file being divided into chunks, the chunks being grouped into similarity groups, and the DOB services owning subsets of similarity groups; assigning, by the leader, offset ranges of the file to the AOB services, including the leader, such that each offset range assigned to an AOB service hosted on a node corresponds to chunks of a similarity group owned by a DOB service that is also hosted on the node; issuing prefetch requests to the AOB services according to the assigned offset ranges; opening multiple internal read-ahead streams from the AOB services to the DOB services, wherein the internal read-ahead streams prefetch the chunks read by the DOB services to populate read-ahead caches maintained at the AOB services, each prefetch from a particular AOB service to a particular DOB service thereby being a local operation because of the offset range assignments; and servicing the request using the read-ahead caches.

In another embodiment, there is a method comprising: provisioning access object (AOB) and deduplication object (DOB) services of a deduplication filesystem across a cluster of nodes; receiving, at a client-side library, a request to restore a file; grouping read-ahead buffers at the AOB services to form a global read-ahead pool; prefetching read-ahead IO objects corresponding to offset ranges in the file to populate the global read-ahead pool, the read-ahead IO objects being read by the DOB services from a storage layer of the deduplication filesystem; creating a key-value store to track the read-ahead IO objects, the key-value store comprising a key and a value, the key being based on a file handle of the file, offset within the file, and a size of a buffer to read, and the value identifying a location of the buffer at an AOB service; servicing the request using the global read-ahead pool; and applying an eviction policy to the global read-ahead pool to manage space.

In another embodiment, there is a method comprising: receiving a request to restore a file managed by a duplication filesystem to a client, the file being divided into chunks, the chunks being grouped into similarity groups, and the filesystem comprising a plurality of access object (AOB) and deduplication object (DOB) services; accessing mapping information comprising offset ranges in the file mapped to the AOB services, and similarity groups mapped to the DOB services; opening multiple internal read-ahead streams from the AOB services to the DOB services, according to the mapping information, wherein the internal read-ahead streams prefetch the chunks read from a storage layer of the filesystem, by the DOB services, to populate read-ahead caches at the AOB services; compressing buffers into which the chunks have been read and storing the compressed buffers into the read-ahead caches; receiving a read IO from the client for restoration of the file; determining whether the read IO is made according to a Network File System (NFS) protocol, a Common Internet File System (CIFS) protocol, or a proprietary protocol; when the read IO is made according to the NFS or CIFS protocol, decompressing pages of the read-ahead caches before sending the pages to the client in response to the read IO; and when the read IO is made according to the proprietary protocol, sending the pages to the client in a compressed format in response to the read IO, wherein the pages are then decompressed at the client.

Referring back now to FIG. 1, the clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

In an embodiment, the clients may be referred to as backup clients. In this embodiment, the filesystem provides a backup target for data generated by the clients. The backups are secondary copies that can be used in the event that primary file copies on the clients become unavailable due to, for example, data corruption, accidental deletion, natural disaster, data breaches, hacks, or other data loss event. The backups may be stored in a format such as a compressed format, deduplicated format, or encrypted format that is different from the native source format. In an embodiment, the filesystem is hosted by a cluster of nodes (e.g., two or more nodes). Depending on demand, cluster nodes or services may be dynamically scaled up or down. Thus, the cluster may be referred to as a scale out cluster. For example, as part of on-going operations, new nodes or new instances of a service may be added to the cluster or existing nodes or instances of a service may be removed from the cluster.

Figure 37:
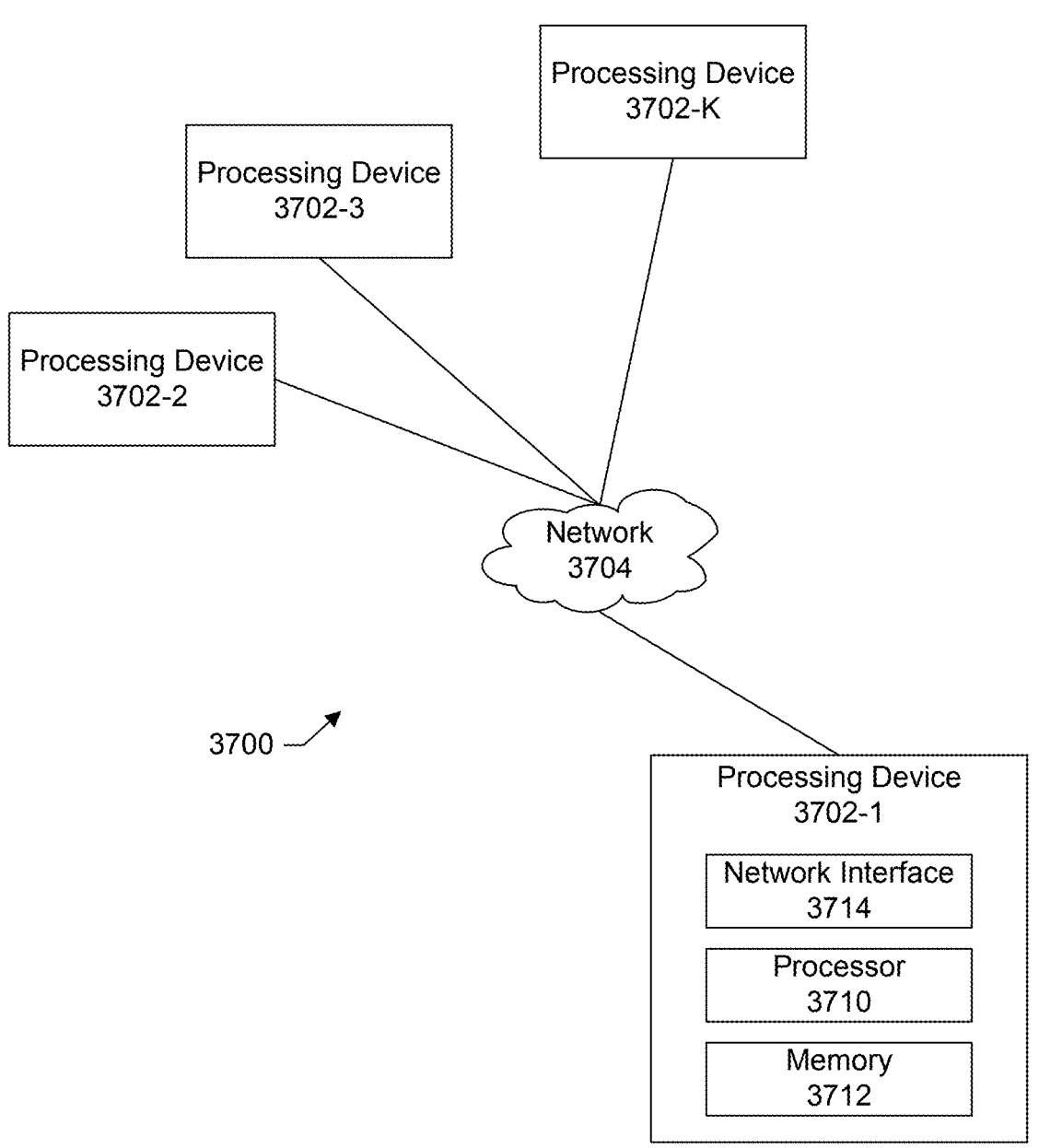
FIG. 37 shows a block diagram of a processing platform that may be utilized to implement at least a portion of an information processing system, according to one or more embodiments.

FIG. 37 shows an example of a processing platform 3700 that may include at least a portion of the information handling system shown in FIG. 1. The example shown in FIG. 37 includes a plurality of processing devices, denoted 3702-1, 3702-2, 3702-3, . . . 3702-K, which communicate with one another over a network 3704.

The network 3704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 3702-1 in the processing platform 3700 comprises a processor 3710 coupled to a memory 3712.

The processor 3710 may comprise a microprocessor, a microcontroller, an application-specific integrated circuit (ASIC), a field-programmable gate array (FPGA) or other type of processing circuitry, as well as portions or combinations of such circuitry elements.

The memory 3712 may comprise random access memory (RAM), read-only memory (ROM) or other types of memory, in any combination. The memory 3712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 3702-1 is network interface circuitry 3714, which is used to interface the processing device with the network 3704 and other system components, and may comprise conventional transceivers.

The other processing devices 3702 of the processing platform 3700 are assumed to be configured in a manner similar to that shown for processing device 3702-1 in the figure.

Again, the particular processing platform 3700 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 38:
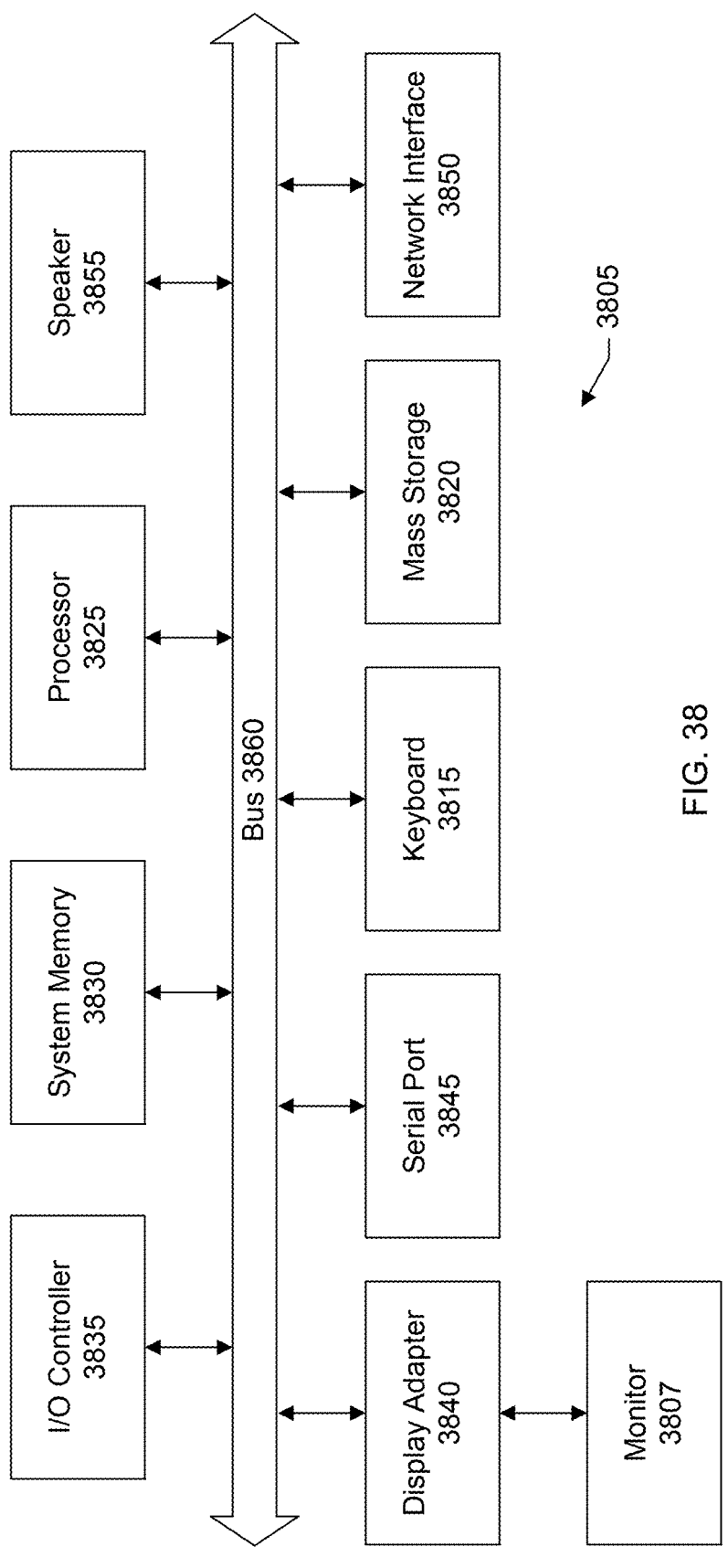
FIG. 38 shows a block diagram of a computer system suitable for use with the system, according to one or more embodiments.

FIG. 38 shows a system block diagram of a computer system 3805 used to execute the software of the present system described herein. The computer system includes a monitor 3807, keyboard 3815, and mass storage devices 3820. Computer system 3805 further includes subsystems such as central processor 3825, system memory 3830, input/output (I/O) controller 3835, display adapter 3840, serial or universal serial bus (USB) port 3845, network interface 3850, and speaker 3855. The system may also be used with computer systems with additional or fewer subsystems. For example, a computer system could include more than one processor 3825 (i.e., a multiprocessor system) or a system may include a cache memory.

Arrows such as 3860 represent the system bus architecture of computer system 3805. However, these arrows are illustrative of any interconnection scheme serving to link the subsystems. For example, speaker 3855 could be connected to the other subsystems through a port or have an internal direct connection to central processor 3825. The processor may include multiple processors or a multicore processor, which may permit parallel processing of information. Computer system 3805 shown in FIG. 38 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:

receiving, at an access object (AOB) service, a restore stream from a client for a file managed by a deduplication filesystem, the file being represented by a segment tree comprising segments in an upper level referencing chunks of the file, the upper level segments being grouped into similarity groups, and the similarity groups being assigned to deduplication object (DOB) services;

iterating over the upper level segments to open multiple internal read-ahead streams from the AOB service to the DOB services to populate a read-ahead cache maintained at the AOB service, the iterating comprising:

loading an upper level segment of the file;

identifying a similarity group into which the upper level segment has been grouped;

identifying a DOB service having responsibility for the similarity group; and issuing a prefetch request from the AOB service to the DOB service for the DOB service to retrieve chunks of the file referenced by the upper level segment and populate the read-ahead cache with the retrieved chunks; and servicing the restore stream using the read-ahead cache, wherein the method further comprises first and second iterations occurring in parallel with each other, the first iteration comprises:

loading a first upper level segment of the file;

determining that the first upper level segment belongs to a first similarity group;

determining that the first similarity group has been assigned to a first DOB service; and issuing a first prefetch request from the AOB service to the first DOB service for the first DOB service to retrieve first chunks of the file referenced by the first upper level segment and populate the read-ahead cache with the first chunks; and the second iteration comprises:

loading a second upper level segment of the file;

determining that the second upper level segment belongs to a second similarity group;

determining that the second similarity group has been assigned to a second DOB service; and issuing a second prefetch request from the AOB service to the second DOB service for the second DOB service to retrieve second chunks of the file referenced by the second upper level segment and populate the read-ahead cache with the second chunks, wherein the AOB service and the first DOB service are hosted on a first node, and the second DOB service is hosted on a second node.

2. The method of claim 1 wherein the read-ahead cache for the file is a single read-ahead cache maintained on a single AOB service.

3. The method of claim 1 further comprising:

while restoration of the file is in progress, closing one or more multiple internal read-ahead streams based on detecting that system load has exceeded a threshold level; and after the closing the one or more multiple internal read-ahead streams, servicing the restore stream using a reduced number of internal read-ahead streams.

4. A system comprising: a processor; and memory configured to store one or more sequences of instructions which, when executed by the processor, cause the processor to carry out the steps of:

receiving, at an access object (AOB) service, a restore stream from a client for a file managed by a deduplication filesystem, the file being represented by a segment tree comprising segments in an upper level referencing chunks of the file, the upper level segments being grouped into similarity groups, and the similarity groups being assigned to deduplication object (DOB) services;

iterating over the upper level segments to open multiple internal read-ahead streams from the AOB service to the DOB services to populate a read-ahead cache maintained at the AOB service, the iterating comprising:

loading an upper level segment of the file;

49 identifying a similarity group into which the upper level segment has been grouped;

identifying a DOB service having responsibility for the similarity group; and issuing a prefetch request from the AOB service to the DOB service for the DOB service to retrieve chunks of the file referenced by the upper level segment and populate the read-ahead cache with the retrieved chunks; and servicing the restore stream using the read-ahead cache, wherein the system further comprises first and second iterations occurring in parallel with each other, the first iteration comprises:

loading a first upper level segment of the file;

determining that the first upper level segment belongs to a first similarity group;

determining that the first similarity group has been assigned to a first DOB service; and issuing a first prefetch request from the AOB service to the first DOB service for the first DOB service to retrieve first chunks of the file referenced by the first upper level segment and populate the read-ahead cache with the first chunks; and the second iteration comprises:

loading a second upper level segment of the file;

determining that the second upper level segment belongs to a second similarity group;

determining that the second similarity group has been assigned to the first DOB service; and issuing a second prefetch request from the AOB service to the first DOB service for the first DOB service to retrieve second chunks of the file referenced by the second upper level segment and populate the read-ahead cache with the second chunks, wherein the AOB service and the first DOB service are hosted on a first node.

5. The system of claim 4 wherein the read-ahead cache for the file is a single read-ahead cache maintained on a single AOB service.

6. The system of claim 4 wherein the processor further carries out the step of:

while restoration of the file is in progress, closing one or more multiple internal read-ahead streams based on detecting that system load has exceeded a threshold level; and after the closing the one or more multiple internal read-ahead streams, servicing the restore stream using a reduced number of internal read-ahead streams.

7. A computer program product, comprising a non-transitory computer-readable medium having a computer-readable program code embodied therein, the computer-readable program code adapted to be executed by one or more processors to implement a method comprising:

receiving, at an access object (AOB) service, a restore stream from a client for a file managed by a deduplication filesystem, the file being represented by a segment tree comprising segments in an upper level referencing chunks of the file, the upper level segments being grouped into similarity groups, and the similarity groups being assigned to deduplication object (DOB) services;

iterating over the upper level segments to open multiple internal read-ahead streams from the AOB service to the DOB services to populate a read-ahead cache maintained at the AOB service, the iterating comprising:

loading an upper level segment of the file;

identifying a similarity group into which the upper level segment has been grouped;

identifying a DOB service having responsibility for the similarity group; and issuing a prefetch request from the AOB service to the DOB service for the DOB service to retrieve chunks of the file referenced by the upper level segment and populate the read-ahead cache with the retrieved chunks; and servicing the restore stream using the read-ahead cache, wherein the method further comprises first and second iterations occurring in parallel with each other, the first iteration comprises:

loading a first upper level segment of the file;

determining that the first upper level segment belongs to a first similarity group;

determining that the first similarity group has been assigned to a first DOB service; and issuing a first prefetch request from the AOB service to the first DOB service for the first DOB service to retrieve first chunks of the file referenced by the first upper level segment and populate the read-ahead cache with the first chunks; and the second iteration comprises:

loading a second upper level segment of the file;

determining that the second upper level segment belongs to a second similarity group;

determining that the second similarity group has been assigned to the first DOB service; and issuing a second prefetch request from the AOB service to the first DOB service for the first DOB service to retrieve second chunks of the file referenced by the second upper level segment and populate the read-ahead cache with the second chunks, wherein the AOB service and the first DOB service are hosted on a first node.

8. The computer program product of claim 7 wherein the read-ahead cache for the file is a single read-ahead cache maintained on a single AOB service.

9. The computer program product of claim 7 wherein the method further comprises:

while restoration of the file is in progress, closing one or more multiple internal read-ahead streams based on detecting that system load has exceeded a threshold level; and after the closing the one or more multiple internal read-ahead streams, servicing the restore stream using a reduced number of internal read-ahead streams.

* * * * *